(12) United States Patent
Kato et al.

(10) Patent No.: US 11,969,977 B2
(45) Date of Patent: Apr. 30, 2024

(54) LIQUID-REPELLENT STRUCTURE, PRODUCTION METHOD THEREOF, WRAPPING MATERIAL, AND SEPARATION SHEET

(71) Applicant: TOPPAN PRINTING CO., LTD., Tokyo (JP)

(72) Inventors: Ryoji Kato, Tokyo (JP); Kosuke Kinoshita, Tokyo (JP); Masayoshi Suzuta, Tokyo (JP); Mina Sekikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 513 days.

(21) Appl. No.: 17/122,747

(22) Filed: Dec. 15, 2020

(65) Prior Publication Data

US 2021/0129508 A1 May 6, 2021

Related U.S. Application Data

(63) Continuation of application No. PCT/JP2019/023362, filed on Jun. 12, 2019.

(30) Foreign Application Priority Data

| Jun. 20, 2018 | (JP) | 2018-117094 |
| Sep. 18, 2018 | (JP) | 2018-173407 |
| Feb. 5, 2019 | (JP) | 2019-018919 |
| Feb. 5, 2019 | (JP) | 2019-018922 |
| Mar. 28, 2019 | (JP) | 2019-064067 |

(51) Int. Cl.
| B32B 27/20 | (2006.01) |
| B32B 5/16 | (2006.01) |
| B32B 27/08 | (2006.01) |
| B32B 27/26 | (2006.01) |
| B32B 27/30 | (2006.01) |
| B32B 37/24 | (2006.01) |
| C08K 7/00 | (2006.01) |
| C09D 7/40 | (2018.01) |
| C09D 127/12 | (2006.01) |
| C09D 133/00 | (2006.01) |

(52) U.S. Cl.
CPC .......... *B32B 27/20* (2013.01); *B32B 5/16* (2013.01); *B32B 27/08* (2013.01); *B32B 27/26* (2013.01); *B32B 27/308* (2013.01); *B32B 37/24* (2013.01); *C08K 7/00* (2013.01); *C09D 7/67* (2018.01); *C09D 7/68* (2018.01); *C09D 7/69* (2018.01); *C09D 127/12* (2013.01); *C09D 133/00* (2013.01); *B32B 2037/243* (2013.01); *B32B 2264/301* (2020.08); *B32B 2264/302* (2020.08); *B32B 2274/00* (2013.01); *B32B 2305/72* (2013.01); *B32B 2307/73* (2013.01); *B32B 2333/00* (2013.01); *B32B 2439/60* (2013.01); *C08K 2201/005* (2013.01)

(58) Field of Classification Search
None
See application file for complete search history.

(56) References Cited

U.S. PATENT DOCUMENTS

| 5,972,494 | A | 10/1999 | Janssens |
| 2014/0165263 | A1 | 6/2014 | Pham et al. |
| 2015/0176200 | A1 | 6/2015 | Jariwala et al. |
| 2015/0337156 | A1 | 11/2015 | Izutani et al. |

FOREIGN PATENT DOCUMENTS

| EP | 1 416 024 A1 | 5/2004 |
| EP | 3 342 806 A1 | 7/2018 |
| JP | 2008-007680 A | 1/2008 |
| JP | 2015-209493 A | 11/2015 |
| JP | 2017-074778 A | 4/2017 |
| JP | 2017-132055 A | 8/2017 |
| JP | 2017-155183 A | 9/2017 |
| WO | WO-2009/028385 A1 | 3/2009 |
| WO | WO-2014/106922 A1 | 7/2014 |
| WO | WO-2017/159654 A1 | 9/2017 |
| WO | WO-2017/204258 A1 | 11/2017 |

OTHER PUBLICATIONS

Yamamoto et al., JP 2015209493, Nov. 24, 2015 (machine translation) (Year: 2015).*
Extended European Search Report issued in corresponding European Patent Application No. 22183506.9, dated Apr. 4, 2023.
Office Action issued in corresponding Japanese Patent Application No. 2020-525634, dated Jun. 6, 2023.
International Searching Authority, "International Search Report," issued in connection with International Patent Application No. PCT/JP2019/023362, dated Sep. 17, 2019.
International Searching Authority, "Written Opinion," issued in connection with International Patent Application No. PCT/JP2019/023362, dated Sep. 17, 2019.
European Extended Search Report, dated Nov. 16, 2021, issued in corresponding European Patent Application No. 19821661.6, (7 pages).

\* cited by examiner

*Primary Examiner* — Cheng Yuan Huang
(74) *Attorney, Agent, or Firm* — Foley & Lardner LLP

(57) ABSTRACT

The liquid-repellent structure comprises a major surface to which liquid repellency is imparted, and a liquid-repellent layer formed on the major surface; wherein the liquid-repellent layer contains a scale-like filler having an average particle size of 0.1 to 6 μm, inclusive, a thermoplastic resin, and a fluorine compound, and has aggregates containing the scale-like filler; and the ratio $W_{S1}/(W_P+W_{FC})$ of the mass $W_{S1}$ of the scale-like filler contained in the liquid-repellent layer to the sum $(W_P+W_{FC})$ of the mass $W_P$ of the thermoplastic resin and the mass $W_{FC}$ of the fluorine compound contained in the liquid-repellent layer is 0.1 to 10 inclusive.

24 Claims, 16 Drawing Sheets

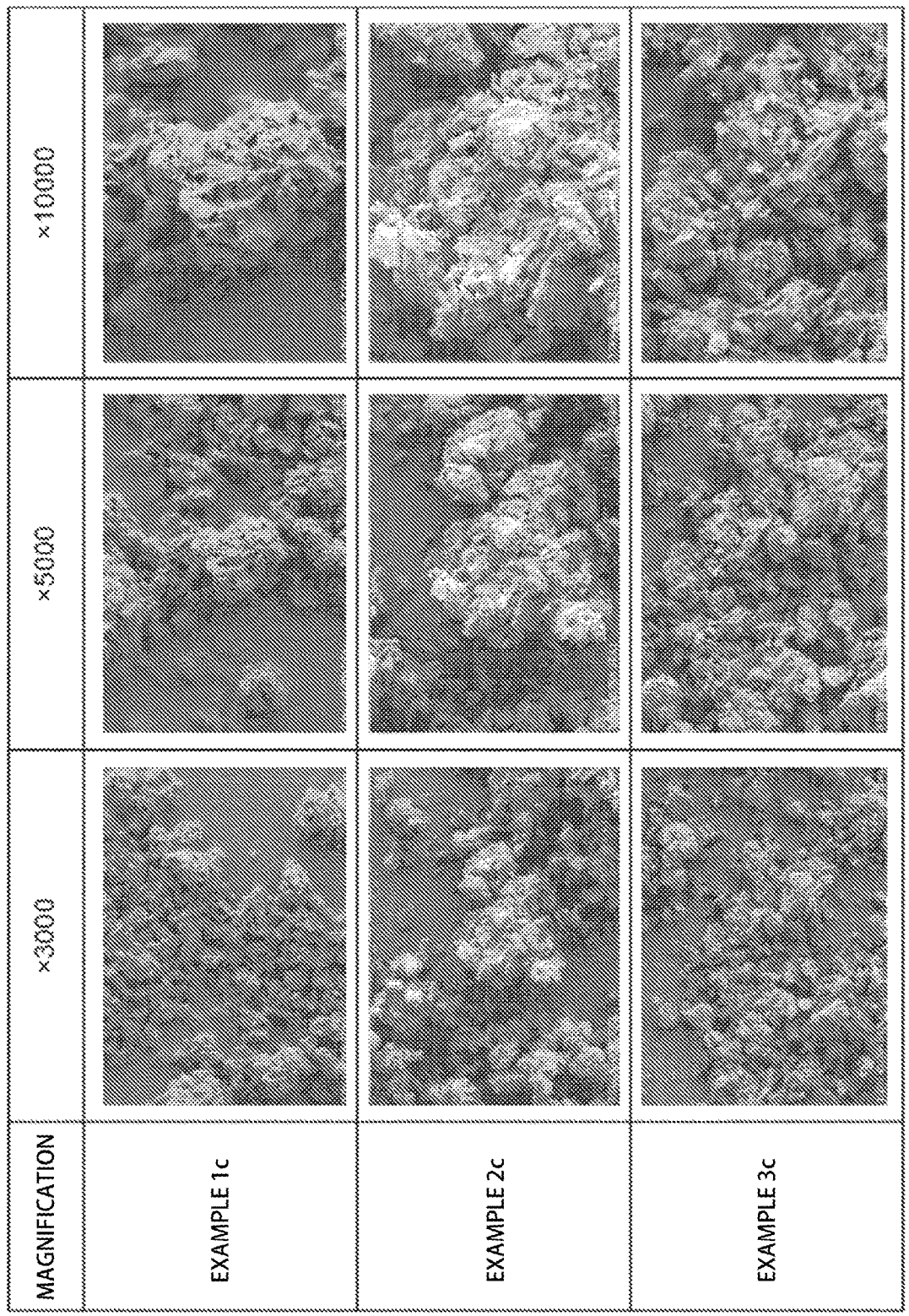

LIQUID-REPELLENT STRUCTURE, PRODUCTION METHOD THEREOF, WRAPPING MATERIAL, AND SEPARATION SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/023362, filed on Jun. 12, 2019, which is based upon and claims the benefit of priority to Japanese Patent Application Nos. 2018-117094, filed on Jun. 20, 2018, 2018-173407, filed on Sep. 18, 2018, 2019-018919 and 2019-018922, both filed on Feb. 5, 2019, and 2019-064067, filed on Mar. 28, 2019. The disclosures of which are all incorporated herein by reference in their entireties.

TECHNICAL FIELD

The present disclosure relates to a liquid-repellent structure and a method for producing the same, as well as a wrapping material and a separation sheet, both of which have the liquid-repellent structure on the side in contact with a substance.

BACKGROUND ART

Various modes are known for structures having water repellency. For example, PTL 1 discloses a water-repellent structure comprising a fine particle layer having scale-like inorganic fine particles fixed by a binder on the surface of a substrate part, and a water-repellent film layer covering the surface of the fine particle layer. PTL 2 discloses a single-layer water-repellent heat seal film comprising a thermoplastic resin and hydrophobic particles. PTL 3 discloses a water-repellent laminate for cover materials, comprising a base and a thermal bonding layer arranged on the base, wherein the thermal bonding layer contains a thermoplastic resin, water-repellent fine particles, and bead particles having a larger average particle diameter than the water-repellent fine particles.

CITATION LIST

[Patent Literature] PTL 1: JP 2017-132055 A; PTL 2: JP 2017-155183 A; PTL 3: WO 2017/204258 A1.

SUMMARY OF THE INVENTION

Technical Problem

In the inventions disclosed in PTL 1 to PTL 3, the water repellency is evaluated by the contact angle with water droplets. In the inventions disclosed in PTL 2 and PTL 3, yogurt repellency (adhesion of yogurt) is also evaluated. However, in the inventions disclosed in these documents, the liquid repellency to liquids containing oil (e.g., curry, fresh cream) is not examined.

The present disclosure provides a liquid-repellent structure having improved or even excellent liquid repellency to water and also improved or even excellent liquid repellency to oil or oil-containing liquids etc., and a method for producing the same. Further, the present disclosure also provides a wrapping material and a separation sheet, both of which have the liquid-repellent structure on the side in contact with a substance.

Solution to Problem

The liquid-repellent structure according to a first aspect of the present disclosure comprises a major surface to which liquid repellency is imparted (hereinafter, sometimes referred to as the "treatment surface"), and a liquid-repellent layer formed on the treatment surface; wherein the liquid-repellent layer contains a scale-like filler having an average particle size of 0.1 to 6 µm, inclusive, a thermoplastic resin, and a fluorine compound (e.g., a fluororesin), and has aggregates containing the scale-like filler; and the ratio $W_{S1}/(W_P+W_{FC})$ of the mass $W_{S1}$ of the scale-like filler contained in the liquid-repellent layer to the sum $(W_P+W_{FC})$ of the mass $W_P$ of the thermoplastic resin and the mass $W_{FC}$ of the fluorine compound contained in the liquid-repellent layer is 0.1 to 10 inclusive.

The liquid-repellent layer has improved or even excellent liquid repellency to water and yogurt, and also has improved or even excellent liquid repellency to oil or oil-containing liquids etc. (e.g., curry, fresh cream). The present inventors found that when the ratio of the mass $W_{S1}$ of the scale-like filler contained in the liquid-repellent layer to the sum $(W_P+W_{FC})$ of the mass $W_P$ of the thermoplastic resin and the mass $W_{FC}$ of the fluorine compound contained in the liquid-repellent layer is set to a predetermined range $(0.1 \leq W_{S1}/(W_P+W_{FC}) \leq 10)$, aggregates containing the scale-like filler, specifically aggregates that are a combination of many pieces of the scale-like filler, the thermoplastic resin, and the fluorine compound, and that contribute to improved or even excellent liquid repellency, can be formed on the surface of the liquid-repellent layer in the process of forming the liquid-repellent layer.

Since the aggregates present on the liquid-repellent layer are composed of many pieces of the scale-like filler, asperities or voids due to the scale-like filler having a complex and fine shape are formed on the surface of the liquid-repellent layer (see the SEM images of FIGS. 4 and 5). As a result, even if the liquid-repellent layer is in contact with a liquid, the contact area with the liquid can be reduced, thereby exhibiting liquid repellency. In addition, due to the presence of the aggregates containing a fluorine compound on the surface of the liquid-repellent layer, liquid repellency due to the fluorine compound is also exhibited. Moreover, since the aggregates containing a scale-like filler contain a thermoplastic resin, the strength of the aggregates is increased, and the aggregates can be prevented from detaching from the liquid-repellent layer.

The value of the ratio $W_{S1}/(W_P+W_Fc)$ is set to the range of 0.1 to 10 inclusive, based on the following findings of the present inventors who performed various evaluation tests. That is, if this value is less than 0.1, due to the content of the scale-like filler being excessively low relative to the content of binder resin (thermoplastic resin and fluorine compound), asperities are not sufficiently formed on the surface of the liquid-repellent layer, and the liquid repellency tends to be insufficient. In addition, the complex and fine shape of the scale-like filler is covered with the binder resin, and the expression of liquid repellency due to this shape of the scale-like filler tends to be insufficient. On the other hand, if this value exceeds 10, the scale-like filler easily detaches from the liquid-repellent layer due to the content of the scale-like filler being excessively high relative to the content of the binder resin. In addition, the scale-like filler easily settles in the coating liquid used to form the liquid-repellent layer, and it tends to be difficult to stably form the liquid-repellent layer by coating.

When the liquid-repellent structure according to the first aspect is compared with the liquid-repellent structure disclosed in PTL 1 mentioned above, there is at least a clear difference in that in the former, the liquid-repellent layer containing a scale-like filler comes into contact with a liquid, whereas in the latter, the fine particle layer containing a scale-like filler is covered with a water-repellent film layer, and the water-repellent film layer, not the fine particle layer, comes into contact with water. Further, when the liquid-repellent structure according to the first aspect is compared with the liquid-repellent structures disclosed in PTL 2 and PTL 3 mentioned above, there is a clear difference at least in that in the former, the filler contained in the liquid-repellent layer is a scale-like filler, which is not required to be hydrophobic, whereas in the latter, the particles used are considered to be spherical and required to be hydrophobic (water-repellent).

The liquid-repellent layer of the present disclosure may further contain a second filler having an average particle size of 5 to 1000 nm, inclusive. When a filler of this size is mixed in a coating liquid for forming the liquid-repellent layer, the filler can be interposed between the primary particles of the scale-like filler. This can prevent the formation of excessively large aggregates due to excessive stacking (aggregation) of the primary particles of the scale-like filler. In addition, nm-order asperities are formed more efficiently.

The liquid-repellent layer of the present disclosure may further contain a third filler having an average particle size of 10 to 100 μm, inclusive (hereinafter, sometimes referred to as the "coarse filler"). With the liquid-repellent layer containing a filler of this size, asperities rougher than the asperities due to the aggregates composed of the scale-like filler can be formed on the surface of the liquid-repellent layer. As a result, the liquid-repellent layer can exhibit particularly improved or even excellent liquid repellency to highly viscous liquids containing surfactants etc. (e.g., hand soap, body soap, shampoo, rinse, creams, and cosmetics).

In the liquid-repellent layer of the present disclosure, when the mass of the scale-like filler contained in the liquid-repellent layer is $W_{S1}$ and the mass of the third filler is $W_{S3}$, the ratio $W_{S3}/W_{S1}$ can be set to 1.0 to 20.0 inclusive. The formation of μm-order asperities differs depending on the ratio of the mass $W_{S1}$ of the scale-like filler to the mass $W_{S3}$ of the third filler. That is, when the value of $W_{S3}/W_{S1}$ is 1.0 or more, the third filler sufficiently forms μm-order asperities, and improved or even excellent liquid repellency is obtained. When the value of $W_{S3}/W_{S1}$ is 20.0 or less, the scale-like filler sufficiently forms nm-order asperities, and improved or even excellent liquid repellency is obtained.

In the liquid-repellent layer of the present disclosure, the ratio $(W_{S1}+W_{S3})/(W_P+W_{FC})$ of the sum $(W_{S1}+W_{S3})$ of the mass $W_{S1}$ of the scale-like filler and the mass $W_{S3}$ of the third filler contained in the liquid-repellent layer to the sum $(W_P+W_{FC})$ of the mass $W_P$ of the thermoplastic resin and the mass $W_{FC}$ of the fluorine compound contained in the liquid-repellent layer can be set to 0.1 to 10 inclusive. If this ratio is less than 0.1, the complex and fine shape of the scale-like filler is covered with the binder resin (thermoplastic resin and fluorine compound), and the expression of liquid repellency due to this shape of the scale-like filler tends to be insufficient. On the other hand, if this value exceeds 10, due to the contents of the scale-like filler and the coarse filler being excessively high relative to the content of the binder resin, the scale-like filler and the coarse filler easily detach from the liquid-repellent layer. In addition, the content of the fluorine compound in the coating liquid used to form the liquid-repellent layer is excessively low relative to the contents of the scale-like filler and the coarse filler, and liquid repellency tends to be unstable.

The fluorine compound contained in the liquid-repellent layer of the present disclosure may or may not contain a structural unit derived from pyrrolidone nor a derivative thereof (hereinafter, sometimes referred to as "pyrrolidones"). Further, the liquid-repellent layer as a whole may or may not contain structural units derived from pyrrolidones. Structural units derived from pyrrolidones are sometimes contained in fluorine compounds (fluorine additives) in order to improve the adhesion between the fluorine compounds and their underlying layers (e.g., paper) in oil-resistant paper etc., which require improved or even excellent oil resistance, and to stabilize the dispersion of the fluorine compounds in water. However, the present inventors found that in the case of coming into contact with highly viscous liquids containing surfactants etc., the liquid repellency was reduced in some cases due to the interaction between the surfactants etc. and the structural units derived from pyrrolidones. Some fluorine compounds contain structural units derived from pyrrolidones, and when such a fluorine compound is used, the effect of improving liquid repellency may not be sufficient for highly viscous liquids containing surfactants etc. In contrast, when the fluorine compound, and further the entire liquid-repellent layer, does not contain structural units derived from pyrrolidones, particularly improved or even excellent liquid repellency to highly viscous liquids containing surfactants etc. can be achieved.

The liquid-repellent structure according to a second aspect of the present disclosure comprises a treatment surface, and a liquid-repellent layer formed on the treatment surface; wherein the liquid-repellent layer contains a scale-like filler having an average particle size of 0.1 to 6 μm, inclusive, a third filler (coarse filler) having an average particle size of 10 to 100 inclusive, a thermoplastic resin, and a fluorine compound, and has aggregates containing the scale-like filler; and when the liquid-repellent layer is viewed perpendicular to the treatment surface, the ratio of the area occupied by the third filler to the area of the liquid-repellent layer is 0.25 to 0.95 inclusive.

Such a liquid-repellent layer has improved or even excellent liquid repellency to water and yogurt, and also has improved or even excellent liquid repellency to oil or oil-containing liquids (e.g., curry, fresh cream), and liquids containing surfactants (e.g., hand soap, body soap, shampoo, rinse, creams, and cosmetics). That is, the present inventors found that the above configuration makes it possible to form a liquid-repellent layer having improved or even excellent liquid repellency to oil or oil-containing liquids, and to highly viscous liquids containing surfactants etc. in the process of forming the liquid-repellent layer, in which nm-scale asperities due to the aggregates composed of the scale-like filler, μm-scale rough asperities due to the coarse filler that occupies a predetermined area of the liquid-repellent layer, the thermoplastic resin, and the fluorine compound are integrated.

Since the aggregates present on the liquid-repellent layer are composed of many pieces of the scale-like filler, nm-order asperities due to the scale-like filler having a complex and fine shape are formed on the surface of the liquid-repellent layer (see FIG. 10). As a result, even if the liquid-repellent layer is in contact with a liquid, the contact area with the liquid can be reduced, thereby exhibiting liquid repellency. If the average particle size of the scale-like filler is larger than 6 large asperities are formed, and nm-order asperities required to improve the liquid repellency are not sufficiently formed.

Further, μm-order rough asperities due to the coarse filler present in the liquid-repellent layer with a certain occupancy are formed on the surface of the liquid-repellent layer (see FIG. 10). As a result, voids are formed between the liquid-repellent layer and the liquid in contact with the liquid-repellent layer, and liquid repellency is exhibited. When the average particle size of the coarse filler is 10 μm or more, sufficient voids are easily formed between the liquid-repellent layer and the liquid droplets. On the other hand, when the average particle size of the coarse filler is 100 μm or less, the detaching of the coarse filler from the liquid-repellent layer can be sufficiently prevented.

In addition, due to the presence of the aggregates containing a fluorine compound on the surface of the liquid-repellent layer, liquid repellency due to the fluorine compound is also exhibited. Moreover, since a thermoplastic resin is contained, the strength of the aggregates containing the scale-like filler is increased, and the aggregates of the scale-like filler and the coarse filler can be prevented from detaching from the liquid-repellent layer.

The ratio of the area occupied by the coarse filler to the area of the liquid-repellent layer when the liquid-repellent layer is viewed perpendicular to the treatment surface is set to the range of 0.25 to 0.95 inclusive, based on the following findings of the present inventors who performed various evaluation tests. That is, when the area occupied by the coarse filler (third filler) is $A_3$, the area of the liquid-repellent layer is A, and the ratio $A_3/A$ is 0.25 or more, μm-order rough asperities are sufficiently formed, droplets of the liquid can be sufficiently retained, and improved or even excellent liquid repellency is exhibited. When the ratio $A_3/A$ is 0.95 or less, the liquid-repellent layer can be prevented from being completely filled and smoothed by the coarse filler, and sufficient voids are formed to retain the droplets, resulting in improved or even excellent liquid repellency.

When the liquid-repellent structure according to the second aspect is compared with the liquid-repellent structure disclosed in PTL 1 mentioned above, there is a clear difference at least in that in the former, the liquid-repellent layer containing a scale-like filler and a coarse filler comes into contact with a liquid, whereas in the latter, the fine particle layer containing a scale-like filler is covered with a water-repellent film layer, and the water-repellent film layer, not the fine particle layer, comes into contact with water. Further, when the liquid-repellent structure according to the second aspect is compared with the liquid-repellent structures disclosed in PTL 2 and PTL 3 mentioned above, there is a clear difference at least in that in the former, the liquid-repellent layer contains both a scale-like filler and a coarse filler, and the scale-like filler, which is a fine filler, is not required to be hydrophobic, whereas in the latter, the fine particles used are considered to be spherical and required to be hydrophobic (water-repellent).

The liquid-repellent structure according to a third aspect of the present disclosure comprises a treatment surface, and a liquid-repellent layer formed on the treatment surface; wherein the liquid-repellent layer contains a cured product of a liquid-repellent layer-forming composition containing a filler, a fluorine compound, and a crosslinking agent having a functional group that reacts with the fluorine compound.

The liquid-repellent layer has improved or even excellent liquid repellency to water and yogurt, and also has improved or even excellent liquid repellency to oil or oil-containing liquids etc. (e.g., curry, fresh cream). Further, the liquid-repellent layer provided in the liquid-repellent structure can maintain liquid repellency even if it is in contact with water and yogurt, as well as oil or oil-containing liquids etc. (hereinafter, these may be sometimes collectively referred to as "liquids") for a long period of time. The present inventors consider the reason why the above effect is obtained to be as follows. In the liquid-repellent layer containing a cured product of the liquid-repellent layer-forming composition, the fluorine compound bleeds out on the surface and lowers the surface free energy, and asperities are formed on the surface due to the filler, whereby even if the liquid-repellent layer is in contact with a liquid, the contact area with the liquid can be reduced, and improved or even excellent liquid repellency can be obtained. The fluorine compound is contained in the liquid-repellent layer-forming composition together with the filler to form a liquid-repellent layer; thus, compared with when asperities are formed with the filler, and then a layer of the fluorine compound is laminated thereon, the asperities can be prevented from being buried in the fluorine compound, and improved or even excellent liquid repellency is likely to be exhibited.

Further, when the liquid-repellent layer-forming composition contains a crosslinking agent having a functional group that reacts with the fluorine compound, the crosslinking agent can react with the fluorine compound to form a crosslinked structure in the liquid-repellent layer, and the filler can be prevented from detaching from the liquid-repellent layer. Moreover, when the crosslinking agent reacts with the fluorine compound, the reaction sites (functional groups, such as hydroxyl groups) of the fluorine compound can be reduced in number, and it is possible to reduce the affinity between the liquid-repellent layer and liquids due to the above reaction sites. In addition, it is considered that the fluorine compound and the crosslinking agent form a crosslinked structure, which makes it possible to make the orientation of fluorine-containing groups, such as perfluoroalkyl groups (Rf groups), of the fluorine compound rigid, and that the liquid repellency can be prevented from being lowered by disordering of the orientation of the fluorine-containing groups when the liquid-repellent layer is in contact with a liquid for a long period of time. Due to these effects resulting from the addition of the crosslinking agent, the liquid-repellent layer provided in the liquid-repellent structure can maintain improved or even excellent liquid repellency even if it is in contact with a liquid for a long period of time. In the present specification, the property of maintaining liquid repellency even after contact with a liquid for a long period time is sometimes referred to as "durability."

From the viewpoint of more sufficiently obtaining the above effects resulting from the addition of the crosslinking agent, the crosslinking agent may have at least one group selected from the group consisting of an aziridine group, an isocyanate group, and a carbodiimide group, as the functional group. These groups have improved or even excellent reactivity with the fluorine compound and a thermoplastic resin described later.

The liquid-repellent layer-forming composition may further contain a thermoplastic resin. It is thereby possible to more sufficiently prevent the filler from detaching from the liquid-repellent layer, and to further improve the liquid repellency and durability of the liquid-repellent layer. When the liquid-repellent layer-forming composition contains a thermoplastic resin, the crosslinking agent may also react with the thermoplastic resin to form a crosslinked structure together with the fluorine compound.

In the liquid-repellent structures according to the third aspect and a fourth aspect described later, the average particle size of the filler is, for example, 5 nm to 30 μm, inclusive. From the viewpoint of forming asperities on the surface of the liquid-repellent layer to facilitate further improvement of liquid repellency, the filler may contain at least one filler selected from the group consisting of a scale-like filler having an average particle size of 0.1 to 6 μm, inclusive, a second filler having an average particle size of 5 to 1000 nm, inclusive, and a third filler having an average particle size of 10 to 100 μm, inclusive. When the filler contains a scale-like filler, the liquid-repellent layer may also contain aggregates of the scale-like filler. Preferable examples of the combination of fillers include a combination of the scale-like filler and the second filler, a combination of the scale-like filler and the third filler, and a combination of the scale-like filler, the second filler, and the third filler.

The ratio $W_S/(W_{FC}+W_C)$ of the mass $W_S$ of the filler contained in the liquid-repellent layer-forming composition to the sum $(W_{FC}+W_C)$ of the mass $W_{FC}$ of the fluorine compound and the mass $W_C$ of the crosslinking agent contained in the liquid-repellent layer-forming composition, or the ratio $W_S/(W_P+W_{FC}+W_C)$ of the mass $W_S$ to the sum $(W_P+W_{FC}+W_C)$ of the mass $W_P$ of the thermoplastic resin, the mass $W_{FC}$ of the fluorine compound, and the mass $W_C$ of the crosslinking agent contained in the liquid-repellent layer-forming composition, may be 0.3 to 10 inclusive. When the ratio $W_S/(W_{FC}+W_C)$ or the ratio $W_S/(W_P+W_{FC}+W_C)$ is within the above range, asperities that contribute to the improvement of liquid repellency can be easily formed on the surface of the liquid-repellent layer, and even if the liquid-repellent layer is in contact with a liquid, the contact area with the liquid can be reduced, so that high liquid repellency is likely to be exhibited.

The liquid-repellent structure according to the fourth aspect of the present disclosure comprises a treatment surface, and a liquid-repellent layer formed on the treatment surface; wherein the liquid-repellent layer contains a binder resin containing a fluorine-containing resin, and a filler dispersed in the binder resin; and the ratio $W_F/W_S$ of the mass $W_F$ of fluorine contained in the fluorine-containing resin to the mass $W_S$ of the filler is 0.06 to 0.90 inclusive.

The liquid-repellent layer has improved or even excellent liquid repellency to water, and also has improved or even excellent liquid repellency to oil or oil-containing liquids etc. (e.g., curry, fresh cream). The present inventors consider the reason why the above effect is obtained to be as follows. In the liquid-repellent layer, the ratio $W_F/W_S$ of the mass $W_F$ of fluorine contained in the fluorine-containing resin to the mass $W_S$ of the filler is 0.06 to 0.90 inclusive, whereby fluorine can be efficiently arranged on the surface of the filler. As a result, the surface free energy of the liquid-repellent layer can be efficiently lowered, and the liquid-repellent layer can obtain improved or even excellent liquid repellency. Further, if the ratio $W_F/W_S$ is 0.06 to 0.90, asperities are efficiently formed on the surface of the liquid-repellent layer due to the filler. Even if the liquid-repellent layer is in contact with a liquid (water, and oil or oil-containing liquids etc.), the contact area with the liquid can be reduced, and improved or even excellent liquid repellency can be obtained. The fluorine-containing resin forms a liquid-repellent layer together with the filler; thus, compared with when asperities are formed with the filler, and then a layer of the fluorine-containing resin is laminated thereon, the asperities can be prevented from being buried in the fluorine-containing resin, and improved or even excellent liquid repellency is likely to be exhibited.

In the liquid-repellent structure, the fluorine-containing resin may contain a fluorine-acrylic copolymer. Due to the inclusion of a fluorine-acrylic copolymer, the liquid-repellent layer is likely to exhibit more improved or even excellent liquid repellency to water, and oil or oil-containing liquids etc.

In the liquid-repellent structure, the liquid-repellent layer may further contain a thermoplastic resin. It is thereby possible to more sufficiently prevent the filler from detaching from the liquid-repellent layer, and to further improve the liquid repellency and durability of the liquid-repellent layer.

In the liquid-repellent structure, the liquid-repellent layer may further contain a crosslinking agent. When the liquid-repellent layer contains a crosslinking agent, for example, the fluorine-containing resin reacts with the crosslinking agent to form a crosslinked structure in the liquid-repellent layer, which can further prevent the filler from detaching from the liquid-repellent layer. When the liquid-repellent layer contains a thermoplastic resin, the crosslinking agent may also react with the thermoplastic resin to form a crosslinked structure together with the fluorine-containing resin. Moreover, when the crosslinking agent reacts with the fluorine-containing resin, the reaction sites (functional groups, such as hydroxyl groups) of the fluorine-containing resin can be reduced in number, and it is possible to reduce the affinity between the liquid-repellent layer and liquids (water, and oil or oil-containing liquids etc.) due to the above reaction sites. In addition, it is considered that the fluorine-containing resin and the crosslinking agent form a crosslinked structure, which makes it possible to make the orientation of fluorine-containing groups, such as perfluoroalkyl groups (Rf groups), of the fluorine-containing resin rigid, and that the liquid repellency can be prevented from being lowered by disordering of the orientation of the fluorine-containing groups when the liquid-repellent layer is in contact with a liquid for a long period of time. Due to these effects resulting from the addition of the crosslinking agent, the liquid-repellent layer provided in the liquid-repellent structure can maintain improved or even excellent liquid repellency even if it is in contact with a liquid for a long period of time.

From the viewpoint of more sufficiently obtaining the above effects resulting from the addition of the crosslinking agent, the crosslinking agent may have at least one group selected from the group consisting of an aziridine group, an isocyanate group, and a carbodiimide group, as the functional group. These groups have improved or even excellent reactivity with the fluorine-containing resin and the thermoplastic resin.

The liquid-repellent structure according to the present disclosure may further comprise a foundation layer containing a thermoplastic resin, arranged between the treatment surface and the liquid-repellent layer. This foundation layer may further contain a fifth filler having an average primary particle size of 10 to 100 μm, inclusive. By providing such a foundation layer, the adhesion between the treatment surface and the liquid-repellent layer can be improved, and liquid repellency to highly viscous liquids containing surfactants etc. (e.g., hand soap, body soap, shampoo, rinse, creams, and cosmetics) can be further improved. The improvement of liquid repellency to highly viscous liquids containing surfactants etc. is attributable to the improved adhesion between the treatment surface and the liquid-repellent layer, which can prevent the detaching of the liquid-repellent layer when the highly viscous liquid separates. In other words, it is possible to prevent the detaching of the liquid-repellent layer due to the highly viscous liquid, which improves the liquid repellency to highly viscous liquids containing surfactants etc. Further, when the foundation layer contains the fifth filler, asperities can be formed on the surface of the foundation layer that are rougher than the asperities due to the aggregates composed of the scale-like filler on the liquid-repellent layer, and a liquid-repellent layer can be provided thereon, whereby rougher and more complex asperities can be formed on the surface of the liquid-repellent layer. As a result, the liquid repellency to highly viscous liquids containing surfactants etc. can be further improved. The average primary particle size of the fifth filler may be 5 to 30 µm, inclusive or 10 to 20 µm, inclusive, from the viewpoint of obtaining improved or even excellent liquid repellency.

The present disclosure provides a wrapping material and a separation sheet, both of which have the liquid-repellent structure on the side in contact with a substance. As described above, the liquid-repellent layer of the liquid-repellent structure has improved or even excellent liquid repellency to water and also improved or even excellent liquid repellency to oil or oil-containing liquids etc. Therefore, the wrapping material and the separation sheet can be applied to substances containing water (e.g., water, beverages, and yogurt) and substances containing oil (e.g., curry, fresh cream). The wrapping material and the separation sheet can also be applied to a substance that is one member selected from the group consisting of hand soap, body soap, shampoo, rinse, creams, and cosmetics.

The present disclosure provides a method for producing the liquid-repellent structure described above. The method for producing the liquid-repellent structure comprises the steps of: preparing a coating liquid for forming a liquid-repellent layer; forming a coating film of the coating liquid on a surface to which liquid repellency is to be imparted; and drying the coating film. The method for producing the liquid-repellent structure comprising a foundation layer comprises the steps of: forming the foundation layer on a surface to which liquid repellency is to be imparted; preparing a coating liquid for forming a liquid-repellent layer; forming a coating film of the coating liquid on the foundation layer; and drying the coating film.

Advantageous Effects of the Invention

The present disclosure provides a liquid-repellent structure having improved or even excellent liquid repellency to water and also improved or even excellent liquid repellency to oil or oil-containing liquids etc., and a method for producing the same. Further, the present disclosure also provides a wrapping material and a separation sheet, both of which have the liquid-repellent structure on the side in contact with a substance.

BRIEF DESCRIPTION OF THE DRAWINGS

FIG. 16 is a table showing SEM images of the surfaces of liquid-repellent layers produced in Examples 1c to 3c taken at different magnifications.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Embodiment

<Liquid-Repellent Structure>

Figure 1:
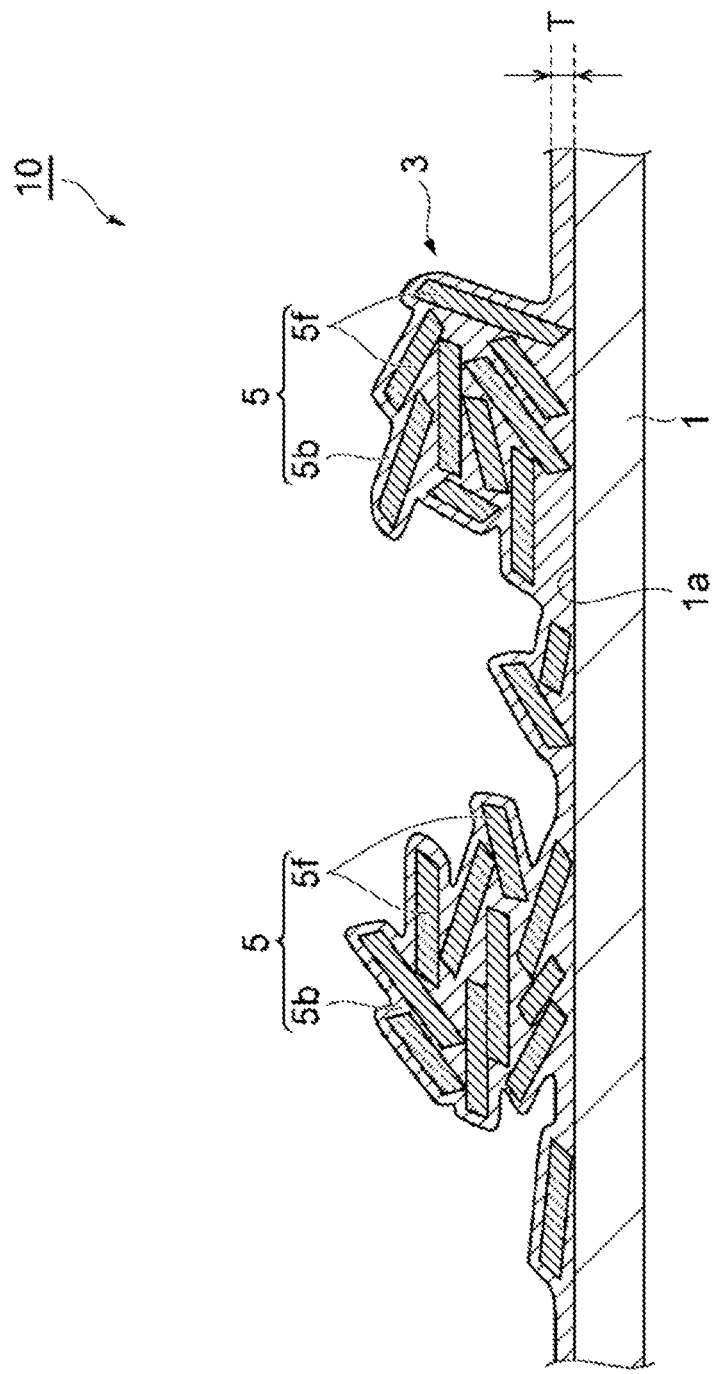
FIG. 1 is a schematic cross-sectional view illustrating an embodiment of a liquid-repellent structure according to the present disclosure.

FIG. 1 is a schematic sectional view of a liquid-repellent structure according to the present embodiment. As shown in FIG. 1, the liquid-repellent structure 10 comprises a substrate 1 having a treatment surface 1a (surface to which liquid repellency is imparted), and a liquid-repellent layer 3 formed on the treatment surface 1a.

(Substrate)

The substrate 1 is not particularly limited as long as it has a major surface to which liquid repellency is to be imparted and serves as a support. For example, the substrate 1 may be a film-like substrate (thickness: about 10 to 200 μm) or a plate-like substrate (thickness: about 1 to 10 mm). Examples of film-like substrates include paper, resin films, metal foil, and the like. When the inner surface of a film wrapping material made of such a material is used as a treatment surface 1a, and a liquid-repellent layer 3 is formed thereon, it is possible to obtain a wrapping bag to which contents are less likely to adhere. Examples of plate-like substrates include paper, resin, metal, glass, and the like. When the inner surface of a container formed by molding such a material is used as a treatment surface 1a, and a liquid-repellent layer 3 is formed thereon, it is possible to obtain a container to which contents are less likely to adhere.

Examples of paper include high-quality paper, special high-quality paper, coated paper, art paper, cast-coated paper, imitation paper, kraft paper, and the like. Examples of resins include polyolefin, acid-modified polyolefin, polyester (e.g., polyethylene terephthalate (PET)), polyethylene (PE), polypropylene (PP), polyamide (PA), polyvinyl chloride (PVC), cellulose acetate, cellophane resin, and the like. Examples of metal include aluminum, nickel, and the like.

When the substrate 1 is in the form of a film, it is preferable that the substrate 1 is thermally fusible with the thermoplastic resin, which is a constituent component of the liquid-repellent layer 3. The melting point of the substrate 1 is preferably 170° C. or lower. As a result, when a wrapping bag is formed by heat sealing, the adhesion between the substrate 1 and the liquid-repellent layer 3 becomes stronger, so that the heat sealing properties are further improved. From such a viewpoint, the melting point of the substrate 1 is more preferably 150° C. or lower. The melting point of the substrate 1 can be measured by differential scanning calorimetry.

(Liquid-Repellent Layer)

The liquid-repellent layer 3 has liquid repellency and is formed to partially or completely cover the surface of the substrate 1. Liquid repellency is a concept including both water repellency and oil repellency, and is specifically a property of repelling liquid, semi-solid, or gel-like aqueous or oily materials. Examples of aqueous or oily materials include foods, such as water, oil, yogurt, curry, fresh cream, jelly, custard pudding, syrup, porridge, and soup; detergents, such as hand soap and shampoo; pharmaceuticals, cosmetics, chemicals, and the like. In the liquid-repellent structure 10, the liquid-repellent layer 3 forms the innermost layer or the outermost layer so as to come into direct contact with these materials.

The liquid-repellent layer 3 has aggregates 5 formed by many pieces of a scale-like filler 5f, as shown in FIG. 1. The aggregates 5 form asperities on the surface of the liquid-repellent layer 3. The aggregates 5 are composed of the scale-like filler 5f having an average particle size of 0.1 to 6 μm, and a binder resin 5b covering the scale-like filler 5f. The aggregates 5 form asperities on the surface of the liquid-repellent layer 3. The size of the asperities is, for example, nm order.

The scale-like filler 5f can be present in the form of primary particles, secondary aggregates, or tertiary aggregates thereof. The secondary aggregates are formed in such a manner that the primary particles of the scale-like filler 5f are oriented in parallel and stacked in layers. The tertiary aggregates of the scale-like filler 5f are formed by crystal growth in each direction due to the irregular stacking of the primary particles and the secondary aggregates.

The average particle size (hereinafter, sometimes referred to as the "average primary particle size"; the same applies to other types of fillers) of the scale-like filler 5f is 0.1 to 6 μm, as described above, and may be 0.1 to 4 μm or 4 to 6 μm. The aggregates 5 are easily formed when the average particle size of the scale-like filler 5f is 0.1 μm or more, whereas liquid repellency derived from the complex and fine shape of the scale-like filler 5f is sufficiently exhibited when the average particle size of the scale-like filler 5f is 6 μm or less. The average particle size of the scale-like filler means the average of the values obtained by measuring the major axis length and minor axis length of 10 randomly selected pieces of the scale-like filler in the SEM field of view, and dividing the sum by 2.

Figure 2A:
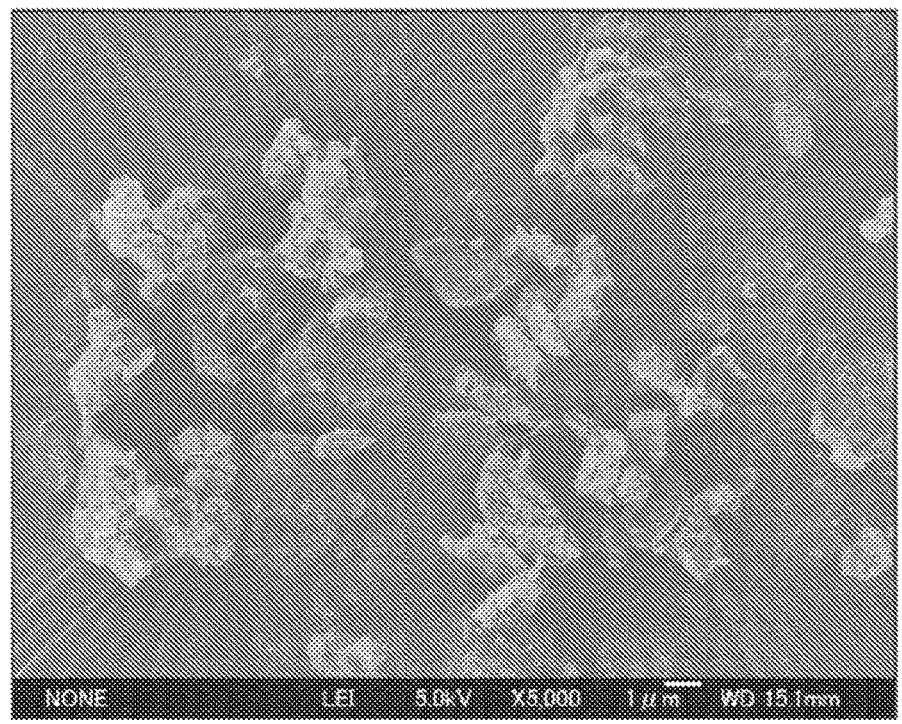
FIG. 2 (a) is an SEM image of a commercially available scale-like silica filler (Sunlovely, produced by AGC Si-Tech Co., Ltd.), and FIG. 2 (b) is an SEM image taken at a higher magnification than FIG. 2 (a).
Figure 2B:
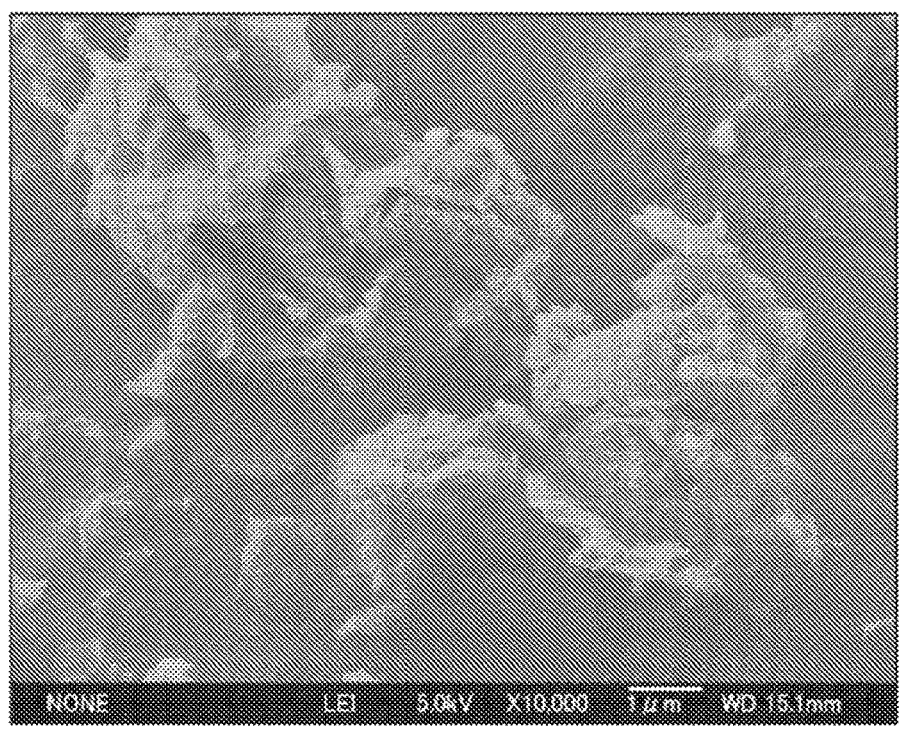

Examples of the material constituting the scale-like filler 5f include silica, talc, mica, titanium oxide, calcium carbonate, barium sulfate, zinc oxide, smectite, zeolite, aluminum oxide, and the like. Examples of commercial products of scale-like silica include Sunlovely produced by AGC Si-Tech Co., Ltd. Examples of commercial products of scale-like mica include Repco Mica produced by Repco Inc. Examples of commercial products of scale-like aluminum oxide include Cerasur produced by Kawai Lime Industry Co., Ltd. FIG. 2 (a) is an SEM image of a commercially available scale-like silica filler (Sunlovely produced by AGC Si-Tech Co., Ltd.), and FIG. 2 (b) is an SEM image taken at a higher magnification than FIG. 2 (a). The scale-like filler 5f may not be subjected to hydrophobic treatment or liquid repellency treatment.

The binder resin 5b contains a thermoplastic resin and a fluorine compound having liquid repellency. As stated above, the binder resin 5b forms aggregates 5 together with the scale-like filler 5f. The content ratio of the thermoplastic resin in the binder resin 5b (relative to the mass of the binder resin 5b) is, for example, 50 to 95 mass %, and may be 60 to 95 mass % or 70 to 90 mass %. When the content ratio of the thermoplastic resin in the binder resin 5b is 50 mass % or more, it is possible to sufficiently prevent the scale-like filler 5f from detaching from the liquid-repellent layer 3. On the other hand, when the content ratio of the thermoplastic resin is 95 mass % or less, the content ratio of the fluorine compound can be sufficiently secured, and the liquid-repellent layer 3 can easily exhibit improved or even excellent liquid repellency. The content ratio of the fluorine compound in the binder resin 5b (relative to the mass of the binder resin 5b) is, for example, 5 to 50 mass %, and may be 5 to 40 mass % or 10 to 30 mass %. When the content ratio of the fluorine compound in the binder resin 5b is 5 mass % or more, the liquid-repellent layer 3 can easily exhibit improved or even excellent liquid repellency. On the other hand, when the content ratio of the fluorine compound is 50 mass % or less, the content ratio of the thermoplastic resin can be sufficiently secured, and it is possible to sufficiently prevent the scale-like filler 5f from detaching from the liquid-repellent layer 3.

The thermoplastic resin is not particularly limited, and examples thereof include low density polyethylene, medium density polyethylene, high density polyethylene, ethylene-α olefin copolymer, homo, block, or random polypropylene, propylene-α olefin copolymer, ethylene-vinyl acetate copolymer, and the like. For example, in the case of an ethylene-α olefin copolymer, a block copolymer or random copolymer of propylene and a olefin can be used. Examples of the α-olefin component include ethylene, 1-butene, 1-pentene, 1-hexene, 1-heptene, 1-octene, 4-methyl-1-pentene, and the like.

The melting point of the thermoplastic resin is, for example, 50 to 135° C. When the melting point is 135° C. or lower, the fluorine compound can easily bleed out on the surface of the liquid-repellent layer 3. When the fluorine compound bleeds out on the surface, the surface free energy can be lowered, and the surface of the liquid-repellent layer 3 can thereby exhibit improved or even excellent liquid repellency. There is a method of drying at a high temperature to promote bleed out of the fluorine compound; however, if the melting point of the thermoplastic resin is too high, a correspondingly high temperature is required, which may cause problems, such as deformation of the substrate 1. On the other hand, when the melting point is 50° C. or higher, a certain degree of crystallinity is secured, and thus the occurrence of blocking due to softening is prevented. From such a viewpoint, the melting point of the thermoplastic resin is more preferably 60 to 120° C.

The thermoplastic resin may be a modified polyolefin modified with a predetermined acid. The modified polyolefin is obtained, for example, by graft-modifying a polyolefin with an unsaturated carboxylic acid derivative component derived from unsaturated carboxylic acid, an unsaturated carboxylic acid anhydride, or an unsaturated carboxylic acid ester. As the polyolefin, a modified polyolefin, such as hydroxyl group-modified polyolefin or acrylic-modified polyolefin, can also be used. Examples of the modified polyolefin resin include Auroren produced by Nippon Paper Industries Co., Ltd., Zaikthene produced by Sumitomo Seika Chemicals Co., Ltd., Unistole produced by Mitsui Chemicals, Inc., Arrowbase produced by Unitika Ltd., and the like.

The fluorine compound is not particularly limited, and a compound having a perfluoroalkyl, perfluoroalkenyl or perfluoropolyether structure or the like can be appropriately used. As the fluorine compound, a commercially available fluorine paint can be used. Examples of commercially available fluorine paints include AsahiGuard produced by AGC Inc., SFcoat produced by AGC Seimi Chemical Co., Ltd., Ftergent produced by Neos Co., Ltd., Fluorolink produced by Solvay, and Unidyne produced by Daikin Industries Ltd.

The fluorine compound may or may not contain a structural unit derived from pyrrolidone nor a derivative thereof (pyrrolidones), from the viewpoint of further improving the liquid repellency to highly viscous liquids containing surfactants etc. (e.g., hand soap, body soap, shampoo, rinse, creams, and cosmetics). Here, examples of pyrrolidones include N-vinyl-2-pyrrolidone, N-vinyl-3-methyl-2-pyrrolidone, N-vinyl-5-methyl-2-pyrrolidone, N-vinyl-3,3-dimethyl-2-pyrrolidone, and the like. Example of the fluorine compound that does not contain structural units derived from pyrrolidones include AsahiGuard AG-E060, AG-E070, and AG-E090 produced by AGC Inc., and Unidyne TG-8111 produced by Daikin Industries, Ltd.

The ratio $W_{S1}/(W_P+W_{FC})$ of the mass $W_{S1}$ of the scale-like filler 5f contained in the liquid-repellent layer 3 to the sum $(W_P+W_{FC})$ of the mass $W_P$ of the thermoplastic resin and the mass $W_{FC}$ of the fluorine compound contained in the liquid-repellent layer 3 is 0.1 to 10, and may be 0.5 to 10 or 1 to 5. When this value is within the above range, although the entire scale-like filler 5f is sufficiently covered with the binder resin 5b, the complex and fine shape of the scale-like filler 5f appears on the surface of the liquid-repellent layer 3. This prevents the scale-like filler 5f from detaching from the liquid-repellent layer 3, and both liquid repellency due to the scale-like filler 5f and liquid repellency due to the fluorine compound contained in the binder resin 5b can be obtained. Even if the liquid-repellent layer 3 is combusted, the mass of the inorganic scale-like filler 5f does not change substantially; thus, the value of $W_{S1}/(W_P+W_{FC})$ can be calculated by measuring changes in the mass of the liquid-repellent layer 3 due to combustion.

Figure 3A:
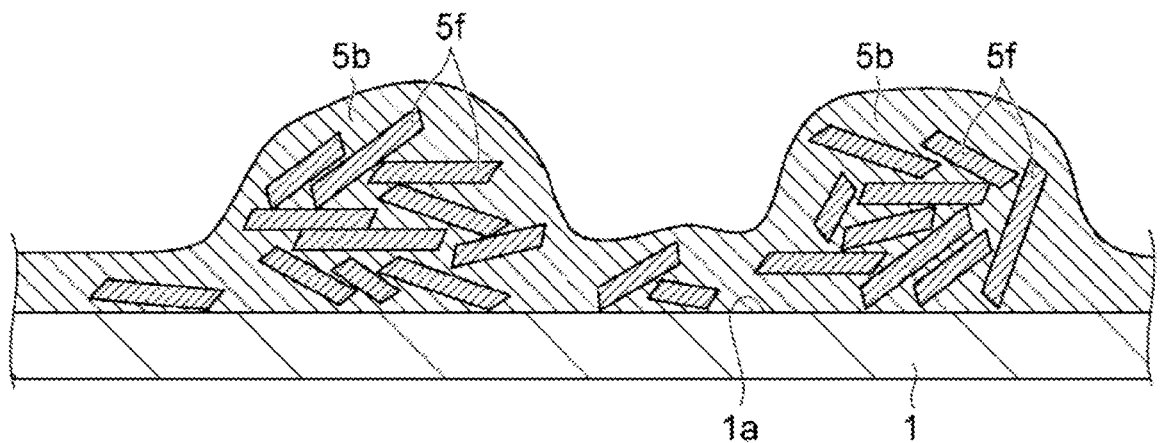
FIG. 3 (a) is a schematic cross-sectional view illustrating a liquid-repellent layer in which the ratio $W_{S1}/(W_P+W_{FC})$ is less than 1, and the content of scale-like filler is insufficient relative to the content of binder resin, and FIG. 3 (b) is a schematic cross-sectional view illustrating a liquid-repellent layer in which the ratio $W_{S1}/(W_P+W_{FC})$ is more than 10, and the content of binder resin is insufficient relative to the content of scale-like filler.
Figure 3B:
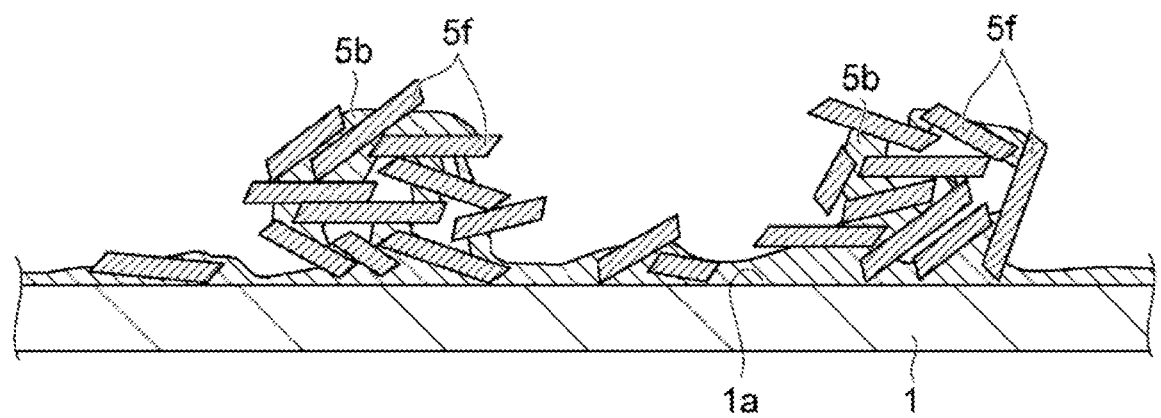

FIG. 3 (a) is a schematic cross-sectional view illustrating a liquid-repellent layer in which the ratio $W_{S1}/(W_P+W_{FC})$ is less than 0.1, and the content of the scale-like filler 5f is insufficient relative to the content of the binder resin 5b. Due to the content of the scale-like filler 5f being excessively low relative to the content of the binder resin 5b (excessive amount of the binder resin 5b), the complex and fine shape of the scale-like filler 5f is covered with the binder resin 5b, and the expression of liquid repellency due to this shape of the scale-like filler 5f is insufficient. On the other hand, FIG. 3 (b) is a schematic cross-sectional view illustrating a liquid-repellent layer in which the ratio $W_{S1}/(W_P+W_Fc)$ is more than 10, and the content of the binder resin 5b is insufficient relative to the content of the scale-like filler 5f. Due to the content of the scale-like filler 5f being excessively high relative to the content of the binder resin 5b (lack of the binder resin 5b), the scale-like filler 5f or aggregates thereof easily detach from the liquid-repellent layer. In addition, the scale-like filler 5f easily settles in the coating liquid used to form the liquid-repellent layer 3, and it tends to be difficult to stably form the liquid-repellent layer 3 by coating.

The aggregates 5 are a combination of many pieces of the scale-like filler 5f and the binder resin 5b (thermoplastic resin and fluorine compound). The aggregates 5 form asperities on the surface of the liquid-repellent layer 3. FIG. 4 (a) is an SEM image of the surface of the liquid-repellent layer 3, and FIG. 4 (b) is an SEM image taken at a higher magnification than FIG. 4 (a). According to the study by the present inventors, when the size ((major axis+minor axis)/2) of one aggregate 5 is 4 µm or more, the aggregates 5 contribute to the improvement of the liquid repellency of the liquid-repellent layer 3.

Figure 4A:
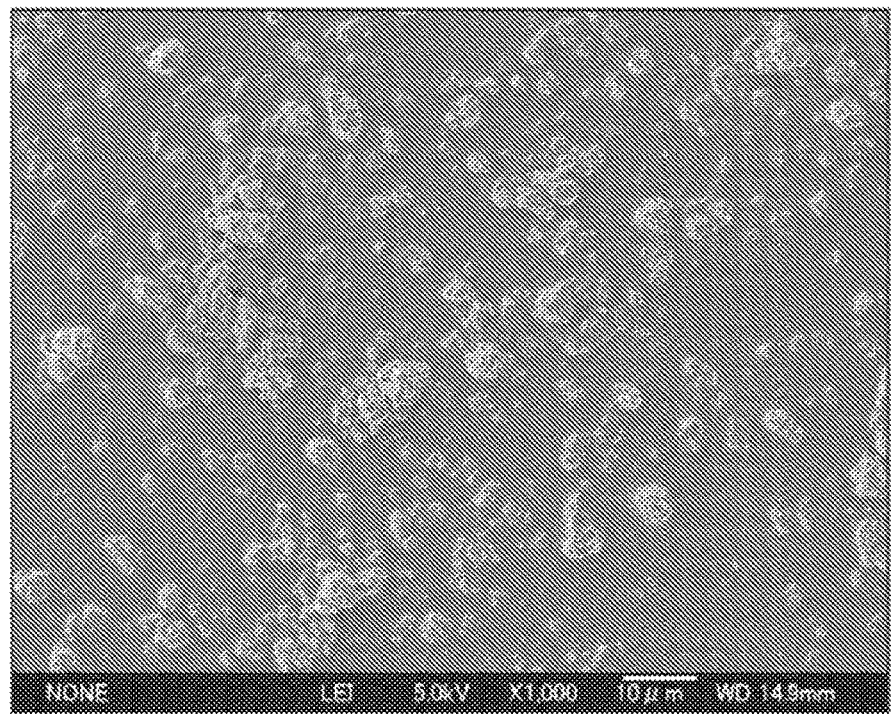
FIG. 4 (a) is an SEM image of the surface of a liquid-repellent layer, and FIG. 4 (b) is an SEM image taken at a higher magnification than FIG. 4 (a).
Figure 4B:
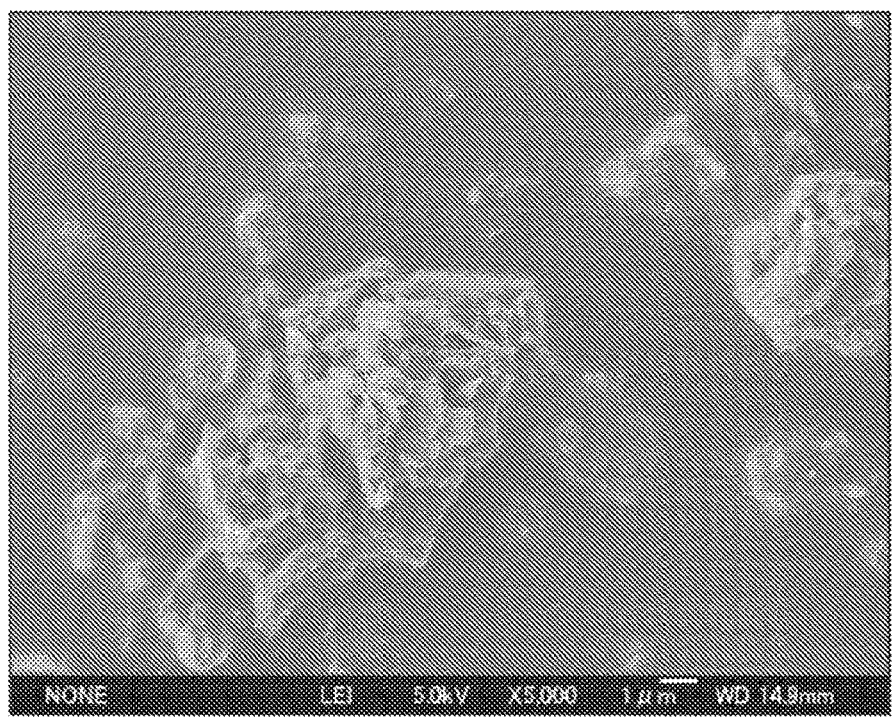
Figure 5A:
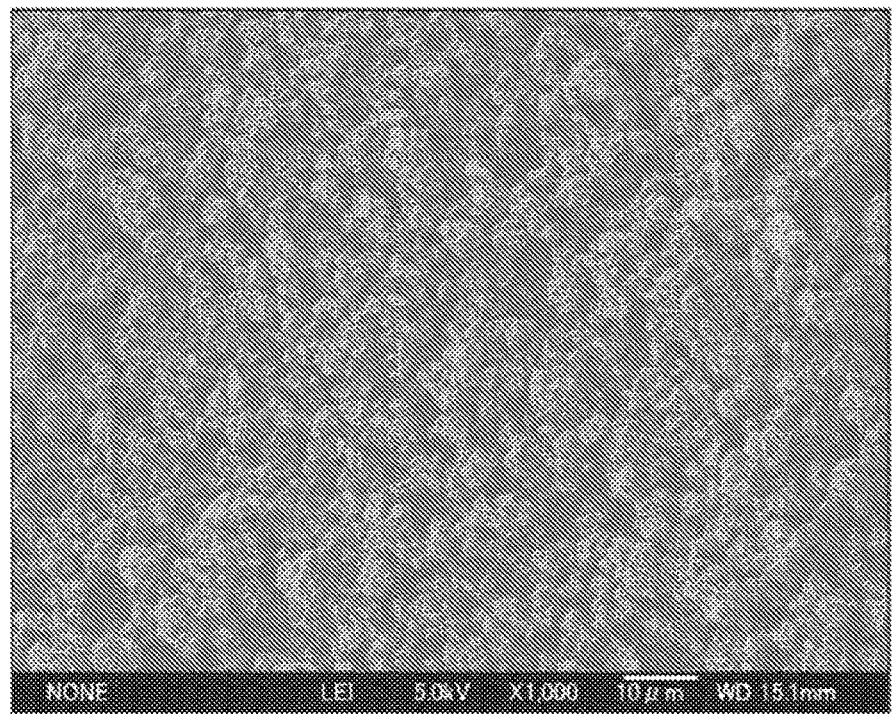
FIG. 5 (a) is an SEM image of the surface of a liquid-repellent layer, and FIG. 5 (b) is an SEM image taken at a higher magnification than FIG. 5 (a).
Figure 5B:
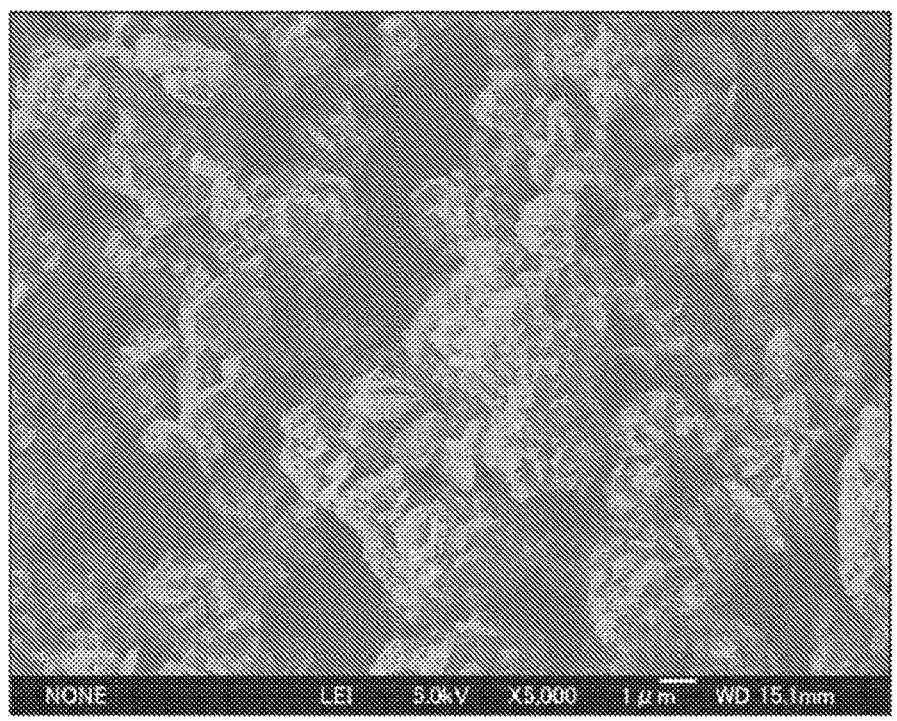

Although the liquid-repellent layer shown in the SEM image of FIGS. 5(a) and 5(b) was formed using the same coating liquid as for the liquid-repellent layer shown in the SEM image of FIGS. 4(a) and 4(b), it was formed with an increased coating amount about 5 times that of the liquid-repellent layer of FIGS. 4(a) and 4(b). The aggregates shown in FIG. 5 (a) are formed in layers on the substrate 1, although there are some gaps. The coating amount of the coating liquid can be adjusted by the concentration of the coating liquid, and the number of the wire bar used for coating.

As shown in FIG. 4 (a), a plurality of aggregates 5 may be placed apart from each other on the liquid-repellent layer 3. That is, the aggregates 5 may be arranged in the form of islands. Alternatively, as shown in FIG. 5 (a), many aggregates 5 may be formed continuously, and a porous layer of the aggregates 5 may be formed on the liquid-repellent layer 3. In addition, as shown in FIG. 4 (b) and FIG. 5 (b), the aggregates 5 have a complex shape derived from the complex and fine shape of the scale-like filler 5f. That is, the aggregates 5 have a pleated surface and voids formed by the pleats because a plurality of primary particles (average particle size: 0.1 to 6 μm) of the scale-like filler 5f are aggregated in random arrangement.

The thickness of the binder resin 5b in the liquid-repellent layer 3 (thickness T in FIG. 1) is, for example, 0.05 to 10 μm, and may be 0.5 to 10 μm or 1 to 5 μm. When the thickness of the binder resin 5b is 0.05 μm or more, it is possible to sufficiently prevent the scale-like filler 5f from detaching from the liquid-repellent layer 3, and improved or even excellent liquid repellency due to the fluorine compound can be achieved. On the other hand, when the thickness of the binder resin 5b is 10 μm or less, the complex and fine shape of the scale-like filler 5f is likely to appear on the surface of the liquid-repellent layer 3, and improved or even excellent liquid repellency due to the scale-like filler 5f can be achieved.

The liquid-repellent layer 3 may contain other additive as needed within a range that does not impair the liquid-repellent function. Examples of other additives include flame retardants, slip agents, anti-blocking agents, antioxidants, light stabilizers, tackifiers, and the like.

The liquid-repellent layer 3 may or may not contain structural units derived from pyrrolidones, from the viewpoint of further improving the liquid repellency to highly viscous liquids containing surfactants etc. That is, structural units derived from pyrrolidones may or may not be contained in the fluorine compound, and in any of the other components constituting the liquid-repellent layer 3. The presence of structural units derived from pyrrolidones in the liquid-repellent layer 3 can be determined by infrared spectroscopy, nuclear magnetic resonance spectroscopy, pyrolysis GC-MS, or the like.

<Method for Producing Liquid-Repellent Structure>

The method for producing the liquid-repellent structure 10 will be described. The production method according to the present embodiment comprises the steps of: preparing a coating liquid containing a scale-like filler having an average particle size of 0.1 to 6 μm, a thermoplastic resin, a fluorine compound, and a solvent; forming a coating film of the coating liquid on a treatment surface 1a of a substrate 1; and drying the coating film to form a liquid-repellent layer having aggregates of the scale-like filler. By adjusting the composition of the coating liquid, the formed liquid-repellent layer 3 satisfies the condition of $0.1 \leq W_{Sl}/(W_P+W_{FC}) \leq 10$. Each step will be described below.

First, a coating liquid containing a scale-like filler 5f, a thermoplastic resin, a fluorine compound, and a solvent is prepared. Examples of solvents include water, alcohol, organic solvents, and the like. The content (solid content) of each component in the coating liquid may be appropriately adjusted so that the content of each component in the liquid-repellent layer 3 is as described above. The thermoplastic resin may be in the form of an emulsion dispersed in water, alcohol, or the like. Such a polyolefin emulsion may be prepared by a method of emulsifying a polymer produced by a polymerization reaction of a corresponding monomer, or may be prepared by emulsion polymerization of a corresponding monomer.

The obtained coating liquid is applied to the substrate 1. As the coating method, a known method can be used without particular limitation. Examples thereof include an immersion method (dipping method), or methods that use a sprayer, a coater, a printer, a brush, or the like. In addition, examples of the types of coaters and printers used in these methods, and the coating methods thereof may include a gravure coater, a reverse-roll coater, a micro gravure coater, a combined chamber and doctor coater, an air-knife coater, a dip coater, a bar coater, a comma coater, a die coater, and the like for a direct gravure method, a reverse gravure method, a kiss reverse gravure method, an offset gravure method, and the like. The coating amount of the coating liquid can be appropriately adjusted so that the resulting liquid-repellent layer 3 has the above-mentioned thickness.

The coating film formed on the substrate 1 is dried by heating. As a result, a liquid-repellent structure 10 comprising a substrate 1 and a liquid-repellent layer 3 provided on the substrate 1 can be obtained. The heating conditions are not limited as long as the solvent can be evaporated. For example, heating can be carried out at 60° C. to 100° C. for 0.5 to 5 minutes.

<Wrapping Material>

The wrapping material according to the present embodiment has the liquid-repellent structure 10 on the side in contact with a substance. The wrapping material according to the present embodiment can be applied to substances containing water (e.g., water, beverages, and yogurt) and substances containing oil (e.g., curry, fresh cream), and can also be applied to substances that are at least one member selected from the group consisting of hand soap, body soap, shampoo, rinse, creams, and cosmetics. Specific examples of the wrapping material include retort pouches for curry or pasta sauces, containers and lids for yogurt and custard pudding, containers or refill pouches for toiletries such as hand soap, shampoo, and rinse, and tubes for toothpaste and pharmaceuticals.

<Separation Sheet>

The separation sheet according to the present embodiment comprises the liquid-repellent structure 10 on the side in contact with a substance. The separation sheet according to the present embodiment can be applied to substances containing water and substances containing oil, and can also be applied to substances that are at least one member selected from the group consisting of hand soap, body soap, shampoo, rinse, creams, and cosmetics. More specifically, the separation sheet is placed between a lunch box lid and foodstuffs, and is used to prevent viscous materials (e.g., mayonnaise, tartar sauce, or ketchup) from adhering to the lunch box lid. The separation sheet is, for example, placed on the inner surface of the lid of a container containing creams or cosmetics, and is also used to prevent viscous materials (e.g., hair wax, moisturizing cream, or skin cream) from adhering to the lid of the container.

The first embodiment of the present disclosure has been described in detail so far, but the present invention is not limited to the embodiment described above. For example, the above embodiment shows an example of the liquid-repellent layer 3 containing the scale-like filler 5f alone as a filler; however, the liquid-repellent layer 3 may further contain at least one of a filler of a size smaller than the scale-like filler 5f (second filler) and a filler of a size larger than the scale-like filler 5f (third filler).

Figure 6:
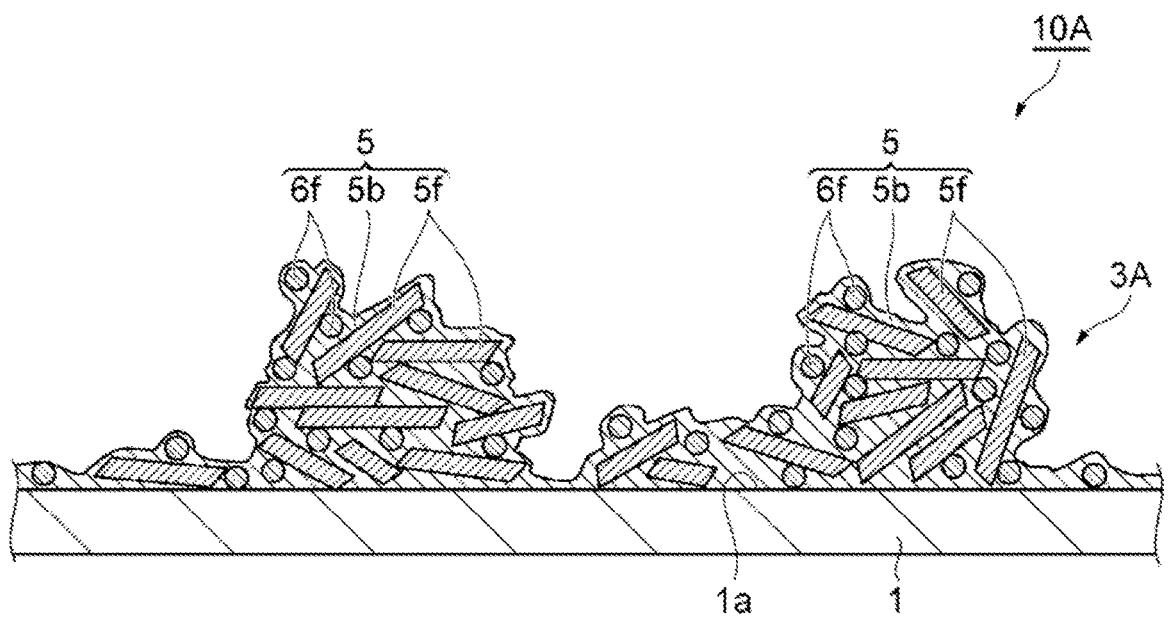
FIG. 6 is a schematic cross-sectional view illustrating a modification of the liquid-repellent structure according to the present disclosure.

The liquid-repellent structure 10A shown in FIG. 6 comprises a liquid-repellent layer 3A further containing a filler 6f (second filler) of a size smaller than the scale-like filler 5f. The filler 6f is, for example, spherical, and has an average particle size of 5 to 1000 nm. When an appropriate amount of the filler 6f is mixed in the liquid-repellent layer-forming coating liquid, the filler 6f can be interposed between the primary particles of the scale-like filler 5f (see FIG. 6). This can prevent the formation of excessively large aggregates due to excessive stacking (aggregation) of the primary particles of the scale-like filler 5f.

The ratio $(W_{S1}+W_{S2})/(W_P+W_{FC})$ of the sum $(W_{S1}+W_{S2})$ of the mass $W_{S1}$ of the scale-like filler and the mass $W_{S2}$ of the second filler (filler 6f) contained in the liquid-repellent layer 3A to the sum $(W_P+W_{FC})$ of the mass $W_P$ of the thermoplastic resin and the mass $W_{FC}$ of the fluorine compound contained in the liquid-repellent layer 3A is, for example, 0.1 to 10, and may be 0.5 to 10 or 1 to 5. When the ratio $(W_{S1}+W_{S2})/(W_P+W_{FC})$ is within the above range, although the entire scale-like filler 5f and the entire second filler (filler 6f) are sufficiently covered with the binder resin 5b, the shape of the aggregates containing the scale-like filler 5f and the second filler (filler 6f) is likely to appear on the surface of the liquid-repellent layer 3. This prevents the scale-like filler 5f and the second filler (filler 6f) from detaching from the liquid-repellent layer 3, and both liquid repellency due to the scale-like filler 5f and the second filler (filler 6f), and liquid repellency due to the fluorine compound contained in the binder resin 5b can be obtained.

The content of the second filler (filler 6f) in the liquid-repellent layer 3A is, for example, 5 to 300 parts by mass, and may be 10 to 250 parts by mass or 20 to 200 parts by mass, relative to 100 parts by mass of the scale-like filler 5f. When the content of the second filler (filler 6f) is within the above range, it is possible to more sufficiently prevent the formation of excessively large aggregates due to excessive stacking (aggregation) of the primary particles of the scale-like filler 5f, and improved or even excellent liquid repellency due to the scale-like filler 5f and the second filler (filler 6f) can be easily obtained.

Examples of the material constituting the filler 6 include silica, talc, mica, titanium oxide, calcium carbonate, barium sulfate, zinc oxide, smectite, zeolite, aluminum oxide, and the like. As the filler 6f, for example, the following commercial products can be used. Examples of commercial products of silica fillers include Aerosil produced by Nippon Aerosil Co., Ltd., Seahostar produced by Nippon Shokubai Co., Ltd., and Silica Spherical Fine Particles QSG and QCB produced by Shin-Etsu Chemical Co., Ltd. Examples of commercial products of titanium oxide fillers include AEROXIDE TiO2 produced by Evonik Degussa. Examples of commercial products of aluminum oxide fillers include AEROXIDE Alu produced by Evonik Degussa.

Figure 7:
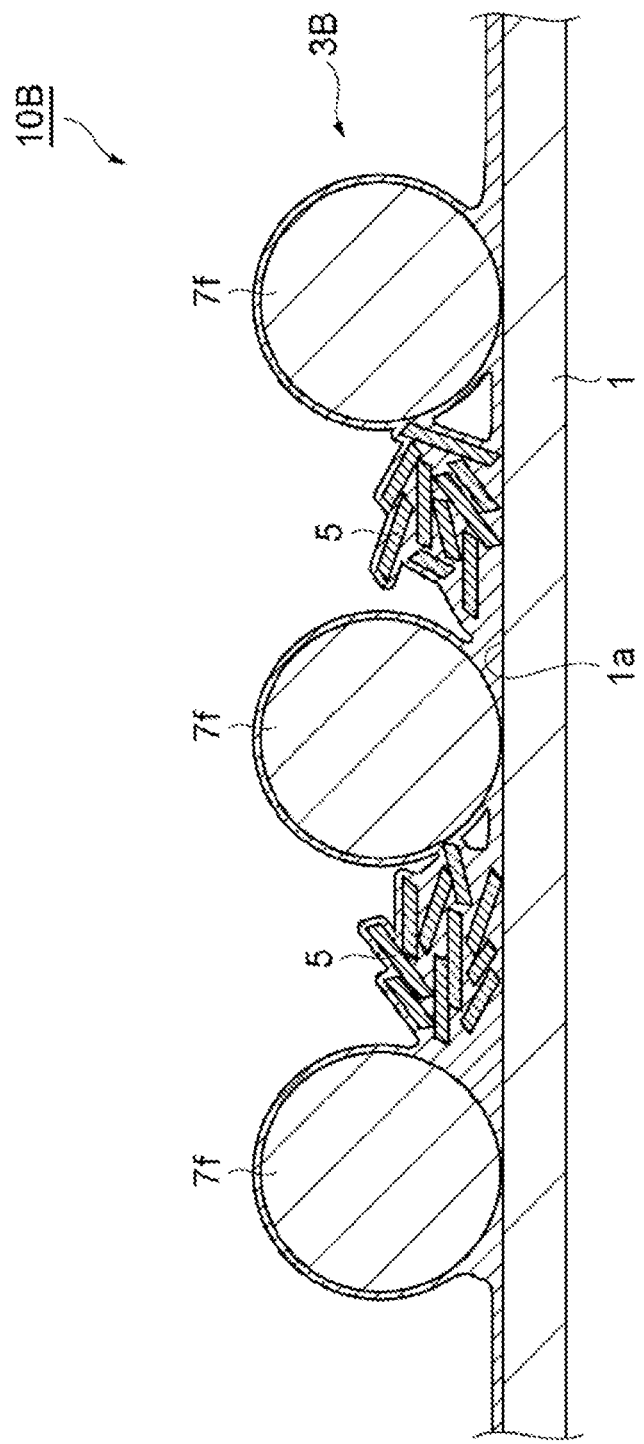
FIG. 7 is a schematic cross-sectional view illustrating a modification of the liquid-repellent structure according to the present disclosure.

The liquid-repellent structure 10B shown in FIG. 7 comprises a liquid-repellent layer 3B further containing a filler 7f of a size larger than the scale-like filler 5f. The filler 7f is, for example, spherical, and has an average particle size of 10 to 100 μm. Asperities rougher than the asperities due to the aggregates 5 composed of the scale-like filler 5f are formed on the surface of the liquid-repellent layer 3B containing the filler 7f of this size. The liquid-repellent layer 3B thereby also has particularly improved or even excellent liquid repellency to highly viscous liquids containing surfactants etc. (e.g., hand soap, body soap, shampoo, rinse, creams, and cosmetics). The filler 7f may be a filler having liquid repellency.

The ratio $(W_{S1}+W_{S3})/(W_P+W_{FC})$ of the sum $(W_{S1}+W_{S3})$ of the mass $W_{S1}$ of the scale-like filler and the mass $W_{S3}$ of the third filler (filler 7f) contained in the liquid-repellent layer 3B to the sum $(W_P+W_{FC})$ of the mass $W_P$ of the thermoplastic resin and the mass $W_{FC}$ of the fluorine compound contained in the liquid-repellent layer 3B is, for example, 0.1 to 10, and may be 0.5 to 10 or 1 to 5. When the ratio $(W_{S1}+W_{S3})/(W_P+W_{FC})$ is within the above range, although the entire scale-like filler 5f and the entire third filler (filler 7f) are sufficiently covered with the binder resin 5b, the shape of the aggregates containing the scale-like filler 5f and the third filler (filler 7f) is likely to appear on the surface of the liquid-repellent layer 3. This prevents the scale-like filler 5f and the third filler (filler 7f) from detaching from the liquid-repellent layer 3, and both liquid repellency due to the scale-like filler 5f and the third filler (filler 7f), and liquid repellency due to the fluorine compound contained in the binder resin 5b can be obtained.

The content of the third filler (filler 7f) in the liquid-repellent layer 3B may be, for example, 50 to 5000 parts by mass, 100 to 2000 parts by mass, 80 to 1000 parts by mass, or 100 to 400 parts by mass, relative to 100 parts by mass of the scale-like filler 5f. When the content of the third filler (filler 7f) is within the above range, the third filler (filler 7f) appropriately forms asperities rougher than the asperities due to the aggregates 5 composed of the scale-like filler 5f. As a result, the liquid-repellent layer 3B can easily obtain more improved or even excellent liquid repellency even to highly viscous liquids containing surfactants etc.

The average particle size of these fillers means the average of the values obtained by measuring the major axis length and minor axis length of 10 randomly selected filler pieces in the SEM field of view, and dividing the sum by 2.

Examples of the material constituting the filler 7f include silica, talc, mica, titanium oxide, calcium carbonate, barium sulfate, zinc oxide, smectite, zeolite, aluminum oxide, silicone, acrylic resin, urethane resin, and the like. As the filler 7f, for example, the following commercial products can be used. Examples of commercial products of silica fillers include Sunsphere produced by AGC Si-Tech Co., Ltd. Examples of commercial products of silicone fillers include Silicone Powder KMP produced by Shin-Etsu Chemical Co., Ltd. Examples of commercial products of acrylic resin fillers include Ganz Pearl produced by AICA Kogyo Co., Ltd., and Art Pearl (crosslinked acrylic beads) produced by Negami Chemical Industrial Co., Ltd. Examples of commercial products of urethane resin fillers include Art Pearl (crosslinked urethane beads) produced by Negami Chemical Industrial Co., Ltd.

Figure 8:
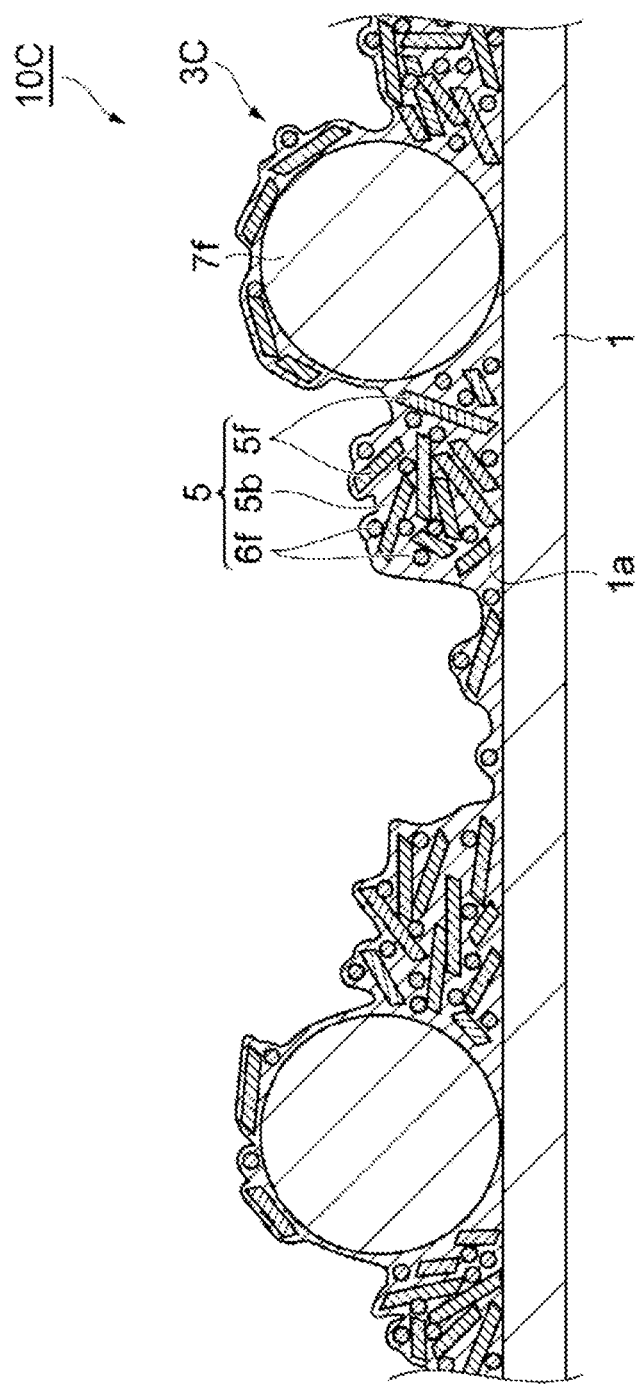
FIG. 8 is a schematic cross-sectional view illustrating a modification of the liquid-repellent structure according to the present disclosure.

The liquid-repellent layer may further contain, together with the scale-like filler 5f, both the second filler (filler 6f) and the third filler (filler 7f) described above. The liquid-repellent structure 10C shown in FIG. 8 comprises a liquid-repellent layer 3C containing the scale-like filler 5f, the filler 6f, and the filler 7f. Asperities due to aggregates 5 composed of the binder resin 5b, the scale-like filler 5f, and the filler 6f, and rough asperities due to the filler 7f are formed on the surface of the liquid-repellent layer 3C. The liquid-repellent layer 3C thereby also has particularly improved or even excellent liquid repellency to highly viscous liquids containing surfactants etc. (e.g., hand soap, body soap, shampoo, rinse, creams, and cosmetics).

The ratio $(W_{S1}+W_{S2}+W_{S3})/(W_P+W_{FC})$ of the sum $(W_{S1}+W_{S2}+W_{S3})$ of the mass $W_{S1}$ of the scale-like filler, the mass $W_{S2}$ of the second filler (filler 6f), and the mass $W_{S3}$ of the third filler (filler 7f) contained in the liquid-repellent layer 3C to the sum $(W_P+W_{FC})$ of the mass $W_P$ of the thermoplastic resin and the mass $W_{FC}$ of the fluorine compound contained in the liquid-repellent layer is, for example, 0.1 to 10, and may be 0.3 to 10, 0.5 to 10, or 1 to 5. The content of the second filler (filler 6f) in the liquid-repellent layer 3C is, for example, 5 to 300 parts by mass, and may be 10 to 250 parts by mass or 20 to 200 parts by mass, relative to 100 parts by mass of the scale-like filler 5f. The content of the third filler (filler 7f) in the liquid-repellent layer 3C may be, for example, 50 to 5000 parts by mass, 100 to 2000 parts by mass, 80 to 1000 parts by mass, or 100 to 400 parts by mass, relative to 100 parts by mass of the scale-like filler 5f.

The binder resin 5b contains a thermoplastic resin and a fluorine compound having liquid repellency. The binder resin 5b forms aggregates 5 together with the scale-like filler 5f. The binder resin 5b binds the filler 7f. The content ratio of the thermoplastic resin in the binder resin 5b (relative to the mass of the binder resin 5b) is, for example, 50 to 95 mass %, and may be 60 to 95 mass % or 70 to 90 mass %. When the content ratio of the thermoplastic resin in the binder resin 5b is 50 mass % or more, it is possible to sufficiently prevent the scale-like filler 5f or the filler 7f from detaching from the liquid-repellent layer 3. On the other hand, when the content ratio of the thermoplastic resin is 95 mass % or less, the content ratio of the fluorine compound can be sufficiently secured, and the liquid-repellent layer 3 can easily exhibit improved or even excellent liquid repellency.

The above embodiment shows an example in which the liquid-repellent layer 3 is directly formed on the treatment surface 1a of the substrate 1; however, the liquid-repellent layer 3 may be formed on a foundation layer that is formed on the treatment surface 1a of the substrate 1. The foundation layer will be described below.

(Foundation Layer)

The foundation layer is arranged between the substrate 1 and the liquid-repellent layer 3, and is formed to partially or completely cover the surface of the substrate 1 (the treatment surface 1a). Because the foundation layer is interposed between the substrate 1 and the liquid-repellent layer 3, the adhesion between the substrate 1 and the liquid-repellent layer 3 can be enhanced. Further, the liquid repellency of the liquid-repellent structure can be further improved by providing the foundation layer. When the foundation layer is interposed between the substrate 1 and the liquid-repellent layer 3, it is preferable that the substrate 1 is thermally fusible with the foundation layer.

The foundation layer contains at least a thermoplastic resin, and may contain a filler. The thermoplastic resin used herein may be the same as the thermoplastic resin used in the liquid-repellent layer 3. Further, the filler used herein may be the same as the filler 7f (average particle size: 10 to 100 μm) used in the liquid-repellent layer 3. The average primary particle size of the filler contained in the foundation layer may be 5 to 30μ or 10 to 20 μm, from the viewpoint of improved or even excellent liquid repellency.

The foundation layer may contain the scale-like filler 5f used in the liquid-repellent layer 3, but may not contain it from the viewpoint of efficiently forming asperities. Further, the foundation layer may contain the second filler (filler 6f) used in the liquid-repellent layer 3, but may not contain it from the viewpoint of efficiently forming asperities.

When the foundation layer contains a filler, the ratio $W_{S5}/W_P$ of the mass $W_{S5}$ of the filler (fifth filler) contained in the foundation layer to the mass $W_P$ of the thermoplastic resin contained in the foundation layer may be 0.5 to 10, 1 to 7.5, or 3 to 5. When this value is within the above range, asperities tend to be efficiently formed in the liquid-repellent structure.

The thickness of the foundation layer is, for example, 0.1 to 10 μm, and may be 0.5 to 5 μm or 1 to 3 μm. When the thickness of the foundation layer is 0.1 μm or more, the adhesion to the liquid-repellent layer tends to increase. On the other hand, when the thickness of the foundation layer is 10 μm or less, asperities tend to be formed efficiently when the foundation layer contains a filler. When the foundation layer contains a filler, the thickness of the foundation layer refers to the thickness of the thermoplastic resin (thickness of the portion without the filler), as with the thickness (thickness T in FIG. 1) of the binder resin 5b in the liquid-repellent layer 3.

The mass per unit area of the foundation layer is, for example, 1.0 to 30.0 g/m², and may be 3 to 10 g/m² or 4 to 8 g/m². When the mass per unit area of the foundation layer is 1.0 g/m2 or more, the adhesion to the liquid-repellent layer tends to increase. On the other hand, when the mass per unit area of the foundation layer is 30 g/m² or less, asperities and adhesion to the liquid-repellent layer can be efficiently obtained when the foundation layer contains a filler.

The foundation layer may contain other additives as needed. Examples of other additives include flame retardants, slip agents, anti-blocking agents, antioxidants, light stabilizers, tackifiers, and the like.

The method for forming the foundation layer is the same as the method for forming the liquid-repellent layer 3. Specifically, the foundation layer can be formed by preparing a coating liquid containing a thermoplastic resin, a filler and other additive to be added as needed, and a solvent, applying the coating liquid to the substrate 1 to form a coating film, and drying the coating film. The solvent used for the coating liquid, the coating liquid coating method, and the coating film drying method are the same as those for forming the liquid-repellent layer 3.

Figure 9:
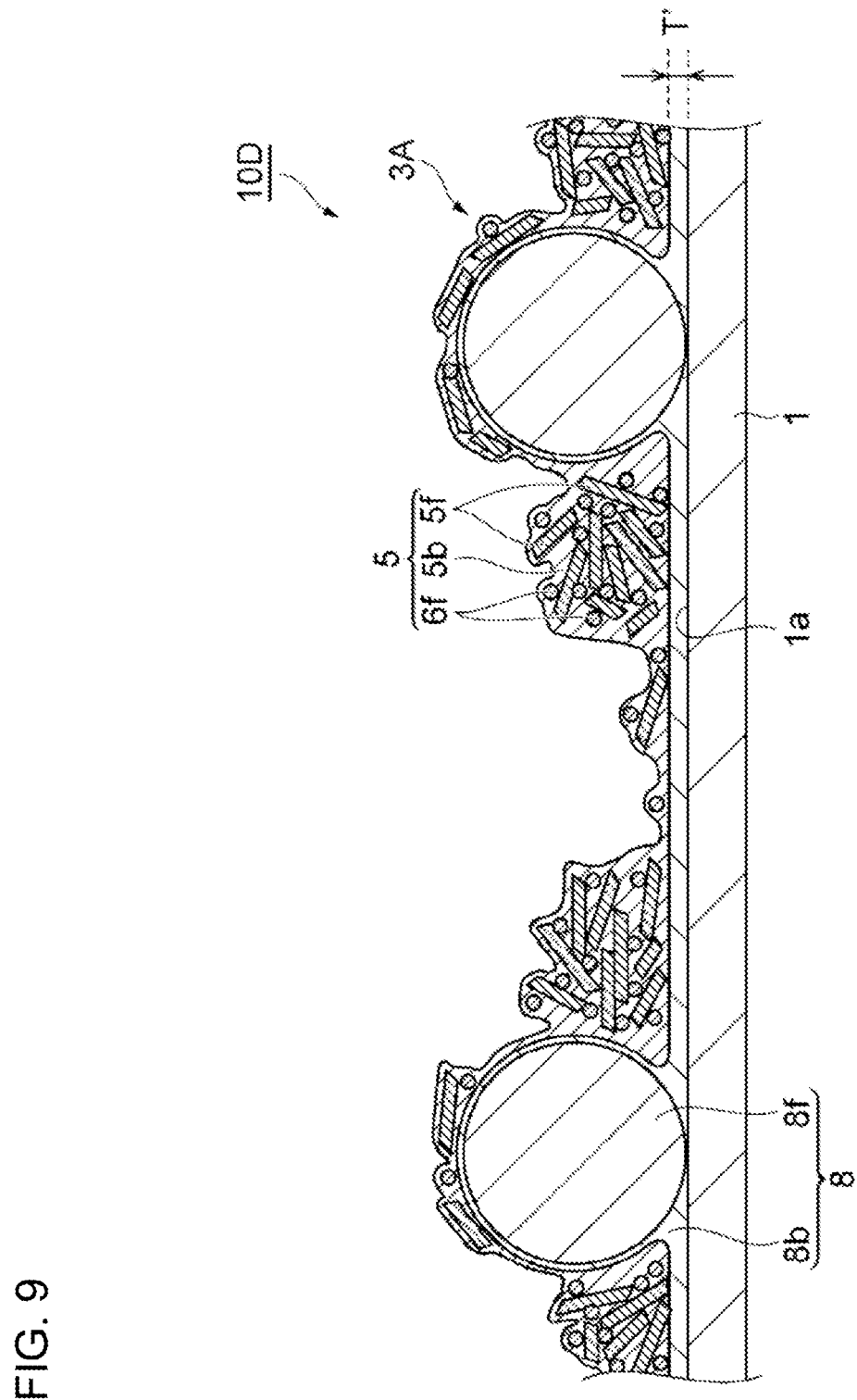
FIG. 9 is a schematic cross-sectional view illustrating a modification of the liquid-repellent structure according to the present disclosure.

FIG. 9 is a schematic cross-sectional view illustrating an example of a liquid-repellent structure having a foundation layer. The liquid-repellent structure 10D shown in FIG. 9 comprises a foundation layer 8 formed on a treatment surface 1a of a substrate 1, and a liquid-repellent layer 3A formed on the foundation layer 8. In the liquid-repellent structure 10D, the foundation layer 8 is made of a thermoplastic resin 8b and a filler 8f. As described above, the thickness T' of the foundation layer refers to the thickness of the thermoplastic resin 8b (thickness of the portion without the filler 8f). Further, in the liquid-repellent structure 10D, the liquid-repellent layer 3A has the same configuration as that of the liquid-repellent layer 3A in the liquid-repellent structure 10A shown in FIG. 6. However, the configuration of the liquid-repellent layer formed on the foundation layer 8 is not limited thereto. As shown in FIG. 9, when the foundation layer 8 is interposed between the substrate 1 and the liquid-repellent layer 3A, the adhesion between the substrate 1 and the liquid-repellent layer 3A can be further enhanced. Further, when the liquid-repellent layer 3A is provided on the foundation layer 8 containing the filler 8f, rough and complex asperities can be formed on the surface of the liquid-repellent layer 3A, and the liquid repellency of the liquid-repellent structure can be further improved.

Second Embodiment

The liquid-repellent structure 20 according to the second embodiment comprises a treatment surface 1a, and a liquid-repellent layer 3D formed on the treatment surface 1a; wherein the liquid-repellent layer 3D contains a scale-like filler 5f having an average particle size of 0.1 to a filler 7f (coarse filler) having an average particle size of 10 to 100 μm, a thermoplastic resin, and a fluorine compound, and has aggregates 5 containing the scale-like filler 5f; and when the liquid-repellent layer 3D is viewed perpendicular to the treatment surface 1a, the ratio of the area occupied by the filler 7f to the area of the liquid-repellent layer is 0.25 to 0.95.

The components contained in the liquid-repellent layer 3D, the content ratios thereof, and the like may be the same as those of the first embodiment and modifications thereof. Regarding the second embodiment, the matters different from those of the above embodiment etc. will be mainly described below.

The liquid-repellent layer 3D contains a scale-like filler 5f and a filler 7f of a size larger than the scale-like filler 5f. The filler 7f is, for example, spherical, and has an average particle size of 10 to 100 Because the filler 7f of this size is contained, the surface of the liquid-repellent layer 3D has μm-order asperities rougher than the asperities of the surface of the aggregates 5 composed of the scale-like filler 5f, and the recessed portions serve as voids 9. The liquid-repellent layer 3 thereby also has particularly improved or even excellent liquid repellency to highly viscous liquids containing surfactants etc. (e.g., hand soap, body soap, shampoo, rinse, creams, and cosmetics). The filler 7f may be a filler having liquid repellency.

The ratio $(W_{S1}+W_{S3})/(W_P+W_{FC})$ of the sum $(W_{S1}+W_{S3})$ of the mass $W_{S1}$ of the scale-like filler 5f and the mass $W_{S3}$ of the filler 7f contained in the liquid-repellent layer 3, to the sum $(W_P+W_{FC})$ of the mass $W_P$ of the thermoplastic resin and the mass $W_{FC}$ of the fluorine compound contained in the liquid-repellent layer 3 is, for example, 0.1 to 10, and may be 0.5 to 10 or 1 to 5. The ratio $W_{S3}/W_{S1}$ of the mass $W_{S3}$ of the filler 7f to the mass $W_{S1}$ of the scale-like filler 5f in the liquid-repellent layer 3 may be, for example, 1.0 to 20.0.

Figure 10:
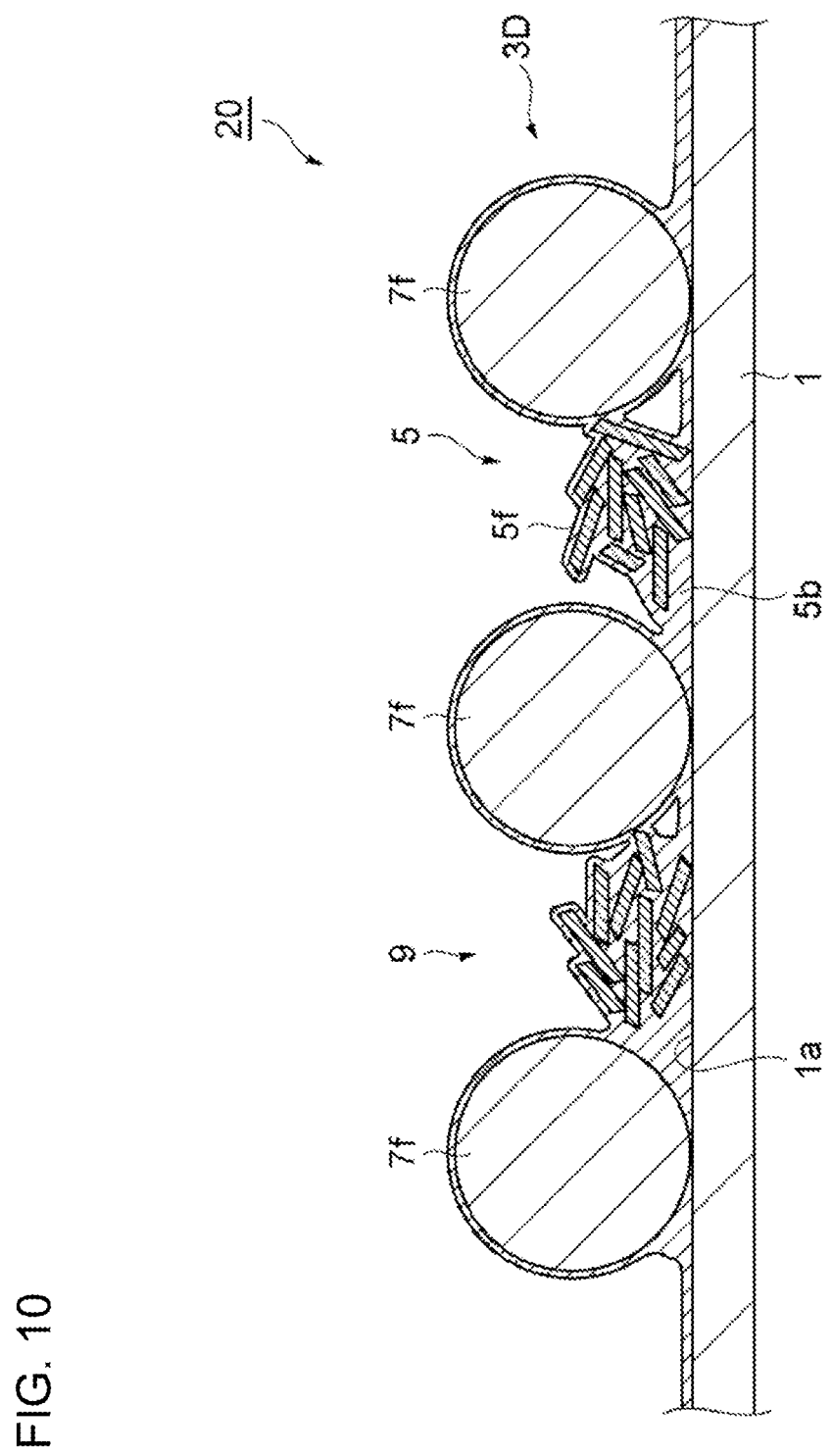
FIG. 10 is a schematic cross-sectional view illustrating a liquid-repellent structure according to a second embodiment.
Figure 11:
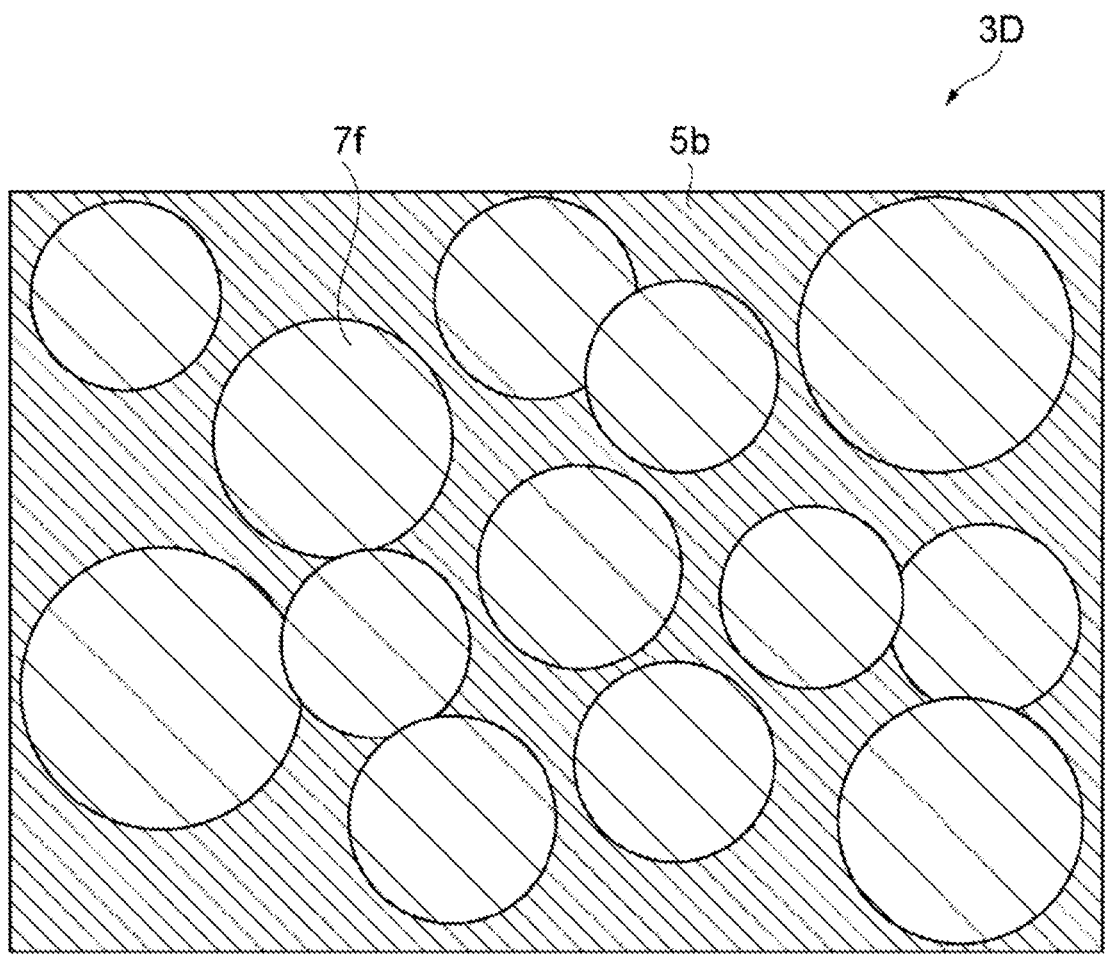
FIG. 11 is a schematic plan view illustrating the liquid-repellent structure according to the second embodiment.

FIG. 11 is a view of the liquid-repellent layer 3D viewed perpendicular to the treatment surface 1a, and the liquid-repellent layer 3D is partially occupied by the filler 7f. In the portions not occupied by the filler 7f, aggregates 5 (not shown in FIG. 11) of the scale-like filler are formed, as shown in FIG. 10. When the liquid-repellent layer 3D is viewed perpendicular to the treatment surface 1a, the ratio $A_3/A$ of the area $A_3$ (circled portion) occupied by the filler 7f to the area A of the entire liquid-repellent layer 3D is 0.25 to 0.95. Since this ratio is 0.25 or more, μm-order rough asperities are sufficiently formed, and droplets of the liquid can be retained on the filler 7f, resulting in improved or even excellent liquid repellency. Since this ratio is 0.95 or less, the liquid-repellent layer 3D can be prevented from being completely filled and smoothed by the filler 7f, and sufficient voids are formed to retain the droplets away from the liquid-repellent layer 3D, resulting in improved or even excellent liquid repellency.

The ratio $(W_{S1}+W_{S3})/(W_P+W_{FC})$ of the sum $(W_{S1}+W_{S3})$ of the mass $W_{S1}$ of the scale-like filler 5f and the mass $W_{S3}$ of the filler 7f contained in the liquid-repellent layer 3D, to the sum $(W_P+W_{FC})$ of the mass $W_P$ of the thermoplastic resin and the mass $W_{FC}$ of the fluorine compound contained in the liquid-repellent layer 3D is 0.1 to 10, and may be 0.5 to 10 or 1 to 5. When this value is within the above range, although the entire scale-like filler 5f and the entire filler 7f are sufficiently covered with the binder resin 5b, the complex and fine shape of the scale-like filler 5f appears on the surface of the liquid-repellent layer 3D. This prevents the scale-like filler 5f and the filler 7f from detaching from the liquid-repellent layer 3D, and both liquid repellency due to the scale-like filler 5f and the filler 7f, and liquid repellency due to the fluorine compound contained in the binder resin 5b can be obtained. Even if the liquid-repellent layer 3D is combusted, the masses of the inorganic scale-like filler 5f and filler 7f do not change substantially; thus, the value of $(W_{S1}+W_{S3})/(W_P+W_{FC})$ can be calculated by measuring changes in the mass of the liquid-repellent layer 3D due to combustion.

Figure 12A:
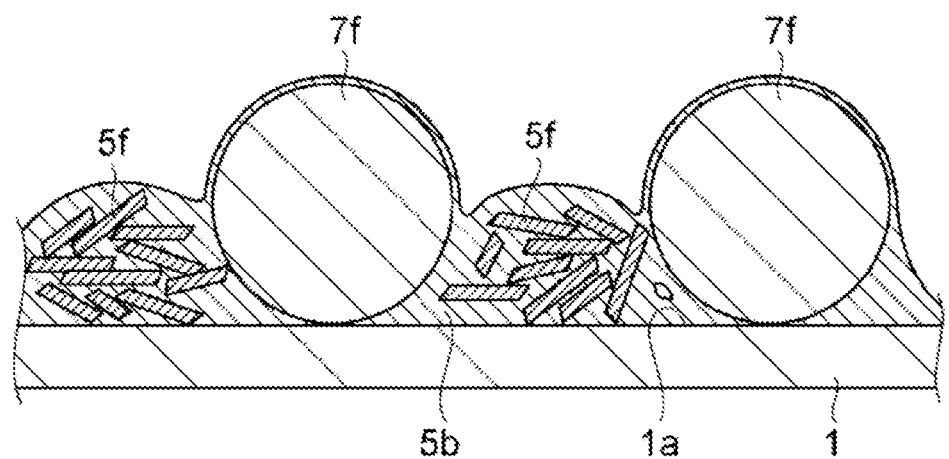
FIG. 12 (a) is a schematic cross-sectional view illustrating a liquid-repellent layer in which the ratio $(W_{S1}+W_{S3})/(W_P+W_{FC})$ is less than 1, and the content of scale-like filler is insufficient relative to the content of binder resin, and FIG. 12 (b) is a schematic cross-sectional view illustrating a liquid-repellent layer in which the ratio $(W_{S1}+W_{S3})/(W_P+W_{FC})$ is more than 10, and the content of binder resin is insufficient relative to the content of scale-like filler and course filler.
Figure 12B:
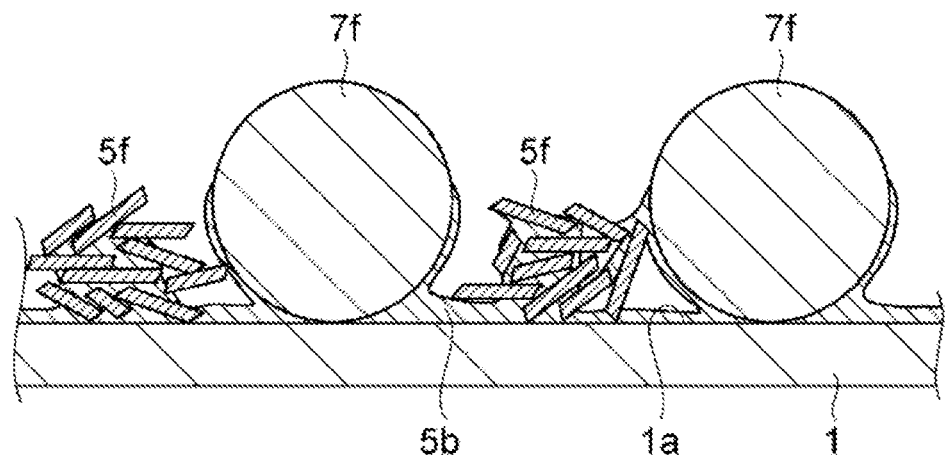

FIG. 12 (a) is a schematic cross-sectional view illustrating a liquid-repellent layer in which the ratio $(W_{S1}+W_{S3})/(W_P+W_{FC})$ is less than 0.1, and the content of the binder resin 5b is excessive relative to the content of the scale-like filler 5f. Due to the content of the scale-like filler 5f being excessively low relative to the content of the binder resin 5b, the complex and fine shape of the scale-like filler 5f is covered with the binder resin 5b, and the expression of liquid repellency due to this shape of the scale-like filler 5f may be insufficient. On the other hand, FIG. 12 (b) is a schematic cross-sectional view illustrating a liquid-repellent layer in which the ratio $(W_{S1}+W_{S3})/(W_P+W)$ is more than 10, and the content of the binder resin 5b is insufficient relative to the contents of the scale-like filler 5f and the scale-like filler 7f. Due to the contents of the scale-like filler 5f and the filler 7f being excessively high relative to the content of the binder resin 5b, the scale-like filler 5f or aggregates thereof and the filler 7f easily detach from the liquid-repellent layer. In addition, the scale-like filler 5f easily settles in the coating liquid used to form the liquid-repellent layer, and it tends to be difficult to stably form the liquid-repellent layer by coating.

The aggregates 5 are a combination of many pieces of the scale-like filler 5f and the binder resin 5b (thermoplastic resin and fluorine compound). The aggregates 5 form μm-order asperities on the surface of the liquid-repellent layer 3D. According to the study by the present inventors, when the size ((major axis+minor axis)/2) of one aggregate 5 is 4 μm or more, the aggregates 5 contribute to the improvement of the liquid repellency of the liquid-repellent layer. The filler 7f is fixed to the liquid-repellent layer by the binder resin 5b. The filler 7f forms μm-order asperities, and the voids 9 are formed in the aggregates 5, whereby droplets of the liquid can be retained away, contributing to the improvement of liquid repellency.

The thickness of the binder resin 5b in the liquid-repellent layer 3D (thickness T in FIG. 10) is, for example, 0.05 to 10 μm, and may be 0.5 to 10 μm or 1 to 5 μm. When the thickness of the binder resin 5b is 0.05 μm or more, it is possible to sufficiently prevent the scale-like filler 5f and the filler 7f from detaching from the liquid-repellent layer 3, and improved or even excellent liquid repellency due to the fluorine compound can be achieved. On the other hand, when the thickness of the binder resin 5b is 10 μm or less, the complex and fine shape of the scale-like filler 5f is likely to appear on the surface of the liquid-repellent layer 3, and improved or even excellent liquid repellency due to the scale-like filler 5f can be achieved.

The method for producing the liquid-repellent structure according to the second embodiment comprises the steps of: preparing a coating liquid containing a scale-like filler 5f having an average particle size of 0.1 to 6 μm, a filler 7f having an average particle size of 10 to 100 μm, a thermoplastic resin, and a fluorine compound, and a solvent; forming a coating film of the coating liquid on a treatment surface 1a; and drying the coating film to form a liquid-repellent layer 3D having aggregates 5 of the scale-like filler 5*f* and the filler 7*f*. This makes it possible to collectively form nm-order asperities and μm-order asperities. By collectively forming these asperities, it is possible to form them efficiently without the μm-order asperities being buried, unlike when a water repellent is separately over-coated.

The second embodiment of the present disclosure has been described in detail so far, but the present invention is not limited to the embodiment described above. For example, the above embodiment shows the liquid-repellent layer 3D containing the scale-like filler 5*f* and the filler 7*f* as fillers; however, the liquid-repellent layer 3D may further contain a filler 6*f* of a smaller size, as with the liquid-repellent layer 3C shown in FIG. 8. Further, a foundation layer 8 may be provided between the treatment surface 1*a* and the liquid-repellent layer 3D (see FIG. 9).

Third Embodiment

The liquid-repellent structure according to the third embodiment comprises a treatment surface 1*a*, and a liquid-repellent layer formed on the treatment surface 1*a*; wherein the liquid-repellent layer contains a cured product of a liquid-repellent layer-forming composition containing a filler, a fluorine compound, and a crosslinking agent having a functional group that reacts with the fluorine compound. The components contained in the liquid-repellent layer according to the third embodiment, the content ratios thereof, and the like may be the same as those of the first embodiment and modifications thereof, as well as the second embodiment. Regarding the third embodiment, the matters different from those of the above embodiment etc. will be mainly described below.

The average primary particle size of the filler contained in the liquid-repellent layer may be, for example, 5 nm to 30 μm. The filler may contain a scale-like filler 5*f* having an average primary particle size of 0.1 to 6 μm, a filler 6*f* having an average primary particle size of 5 to 1000 nm, and a fourth filler having an average primary particle size of 5 to 30 μm. That is, the filler may contain at least one filler selected from the group consisting of the scale-like filler 5*f* having an average primary particle size of 0.1 to 6 μm, the filler 6*f* having an average primary particle size of 5 to 1000 nm, and the fourth filler having an average primary particle size of 5 to 30 μm. When the filler contains the scale-like filler 5*f*, the liquid-repellent layer may contain aggregates 5 of the scale-like filler 5*f*. Due to the inclusion of these fillers, asperities can be more efficiently formed on the surface of the liquid-repellent layer, and more improved or even excellent liquid repellency to water and oil or oil-containing liquids etc., can be easily exhibited.

Further, when the filler contains two or more fillers, preferable examples of the combination of fillers include a combination of the scale-like filler and the second filler, a combination of the scale-like filler and the fourth filler, and a combination of the scale-like filler, the second filler, and the fourth filler. When two or more fillers with different particle sizes or shapes are used in combination, it is possible to form complex asperities on the surface of the liquid-repellent layer that cannot be formed by a single filler, and liquid repellency can be further improved. In this case, when at least a scale-like (plate-like) filler is used, it is possible to more efficiently form complex asperities, and liquid repellency is more likely to be improved.

The binder resin 5*b* is a cured product of a composition comprising, of a liquid-repellent layer-forming composition containing a filler, a fluorine compound having liquid repellency, a crosslinking agent having a functional group that reacts with the fluorine compound, and optionally used components (e.g., a thermoplastic resin), the components other than the filler (hereinafter, sometimes referred to as the "binder composition"). The binder resin 5*b* forms aggregates 5 together with the scale-like filler 5*f*. The aggregates 5 are a combination of many pieces of the scale-like filler 5*f* and the binder resin 5*b*. The aggregates 5 form asperities on the surface of the liquid-repellent layer (see FIG. 1).

The content ratio of the fluorine compound in the binder composition (relative to the mass of the solid content of the binder composition) is, for example, 5 to 99 mass %, and may be 15 to 75 mass % or 20 to 50 mass %. When the content ratio of the fluorine compound in the binder composition is 5 mass % or more, the liquid-repellent layer is likely to exhibit improved or even excellent liquid repellency. On the other hand, when the content ratio of the fluorine compound is 99 mass % or less, the content ratio of the crosslinking agent and an optionally used thermoplastic resin can be sufficiently secured, it is possible to sufficiently prevent the scale-like filler 5*f* from detaching from the liquid-repellent layer, and the durability of the liquid-repellent layer can be sufficiently enhanced.

The content ratio of the thermoplastic resin in the binder composition (relative to the mass of the solid content of the binder composition) is, for example, 5 to 90 mass %, and may be 10 to 50 mass % or 20 to 30 mass %. When the content ratio of the thermoplastic resin in the binder composition is 5 mass % or more, it is possible to sufficiently prevent the scale-like filler 5*f* from detaching from the liquid-repellent layer. On the other hand, when the content ratio of the thermoplastic resin is 90 mass % or less, the content ratios of the fluorine compound and the crosslinking agent can be sufficiently secured, and the liquid-repellent layer easily exhibits improved or even excellent liquid repellency and durability.

The ratio $W_C/W_{FC}$ of the mass $W_C$ of the crosslinking agent contained in the binder composition to the mass $W_{FC}$ of the fluorine compound contained in the binder composition is, for example, 0.01 to 0.5, and may be 0.05 to 0.3 or 0.1 to 0.2. When the ratio $W_C/W_{FC}$ is 0.01 or more, it is possible to sufficiently prevent the scale-like filler 5*f* from detaching from the liquid-repellent layer, and the durability of the liquid-repellent layer can be sufficiently enhanced. On the other hand, when the ratio $W_C/W_{FC}$ is 0.5 or less, the content of the fluorine compound can be sufficiently secured, and the fluorine compound can easily bleed out sufficiently on the surface of the liquid-repellent layer; thus, improved or even excellent liquid repellency can be exhibited.

When the binder composition contains a thermoplastic resin, the ratio $W_C/(W_P+W_{FC})$ of the mass $W_C$ of the crosslinking agent contained in the binder composition to the sum $(W_P+W_{FC})$ of the mass $W_P$ of the thermoplastic resin and the mass $W_{FC}$ of the fluorine compound contained in the binder composition is, for example, 0.01 to 0.5, and may be 0.05 to 0.3 or 0.1 to 0.2. When the ratio $W_C/(W_P+W_{FC})$ is 0.01 or more, it is possible to sufficiently prevent the scale-like filler 5*f* from detaching from the liquid-repellent layer, and the durability of the liquid-repellent layer can be sufficiently enhanced. On the other hand, when the ratio $W_C/(W_P+W_Fc)$ is 0.5 or less, the contents of the fluorine compound and the thermoplastic resin can be sufficiently secured, and the fluorine compound can easily bleed out sufficiently on the surface of the liquid-repellent layer; thus, improved or even excellent liquid repellency can be exhibited. In addition, it is possible to sufficiently obtain the effect of preventing the scale-like filler 5*f* from detaching from the liquid-repellent layer 3 due to the thermoplastic resin.

Fluorine compounds are generally used as aqueous dispersions dispersed in water. Therefore, many fluorine compounds have hydrophilic groups, such as hydroxyl groups and amino groups, in order to enhance the affinity with water. These functional groups contained in the fluorine compound react with the functional groups contained in the crosslinking agent to form a crosslinked structure in the liquid-repellent layer 3. Further, these functional groups of the fluorine compound are reduced by reaction with the crosslinking agent; thus, the functional groups remaining in the liquid-repellent layer are reduced. Accordingly, even if the liquid-repellent layer is in contact with a liquid for a long period of time, it is possible to prevent the decrease in liquid repellency and to maintain improved or even excellent liquid repellency for a long period of time. When the fluorine compound is used as a dispersion dispersed in a solvent other than water, the fluorine compound may have a structure for enhancing its affinity with the solvent used (e.g., a hydrocarbon chain).

The crosslinking agent is not particularly limited as long as it has a functional group that reacts with the fluorine compound. For example, it is possible to use a crosslinking agent having a functional group, such as an aziridine group, an isocyanate group, a carbodiimide group, or an amino group. Examples of commercially available crosslinking agents include Chemitite produced by Nippon Shokubai Co., Ltd., Takenate produced by Mitsui Chemicals, Inc., Carbodilite produced by Nisshinbo Chemical Inc., Meikanate produced by Meisei Chemical Works, Ltd., and Cymel produced by Cytec Industries Japan LLC.

When the binder composition contains a thermoplastic resin, the thermoplastic resin may be a modified polyolefin modified with a predetermined acid. Modified polyolefins are preferable from the viewpoint that since a functional group is introduced, a crosslinked structure can be easily formed by reaction with the crosslinking agent. Examples of the functional group include a carboxyl group, a hydroxyl group, a (meth)acryloyl group, an amino group, and the like. Due to the use of a modified polyolefin having such a functional group, a crosslinked structure comprising a thermoplastic resin, a fluorine compound, and a crosslinking agent can be formed in the liquid-repellent layer, and more improved or even excellent durability can be imparted to the liquid-repellent layer.

The ratio $W_{S1}/(W_{FC}+W_C)$ of the mass $W_{S1}$ of the scale-like filler $5f$ contained in the liquid-repellent layer-forming composition to the sum $(W_{FC}+W_C)$ of the mass $W_{FC}$ of the fluorine compound and the mass $W_C$ of the crosslinking agent contained in the liquid-repellent layer-forming composition, or the ratio $W_{S1}/(W_P+W_{FC}+W_C)$ of the mass $W_{S1}$ to the sum $(W_P+W_{FC}+W_C)$ of the mass $W_P$ of the thermoplastic resin, the mass $W_{FC}$ of the fluorine compound, and the mass $W_C$ of the crosslinking agent contained in the liquid-repellent layer-forming composition, may be 0.3 to 10, 0.5 to 10, or 1 to 5. When this value is within the above range, although the entire scale-like filler $5f$ is sufficiently covered with the binder resin $5b$, the complex and fine shape of the scale-like filler $5f$ is likely to appear on the surface of the liquid-repellent layer. This prevents the scale-like filler $5f$ from detaching from the liquid-repellent layer, and both liquid repellency due to the scale-like filler $5f$ and liquid repellency due to the fluorine compound contained in the binder resin $5b$ can be obtained.

The mass ratio of the scale-like filler $5f$, the fluorine compound, the thermoplastic resin, and the crosslinking agent contained in the liquid-repellent layer-forming composition is substantially the same as the mass ratio of the components contained in the liquid-repellent layer. Even if the liquid-repellent layer is combusted, the mass of the inorganic scale-like filler $5f$ does not change substantially; thus, the value of the ratio $W_{S1}/(W_{FC}+W_C)$ or the ratio $W_{S1}/(W_P+W_{FC}+W_C)$ can be calculated by measuring changes in the mass of the liquid-repellent layer due to combustion.

The method for producing the liquid-repellent structure according to the third embodiment comprises the steps of: preparing a coating liquid containing a filler, a fluorine compound, and a crosslinking agent having a functional group that reacts with the fluorine compound, and a solvent; forming a coating film of the coating liquid on a treatment surface; and drying and curing the coating film to thereby form a liquid-repellent layer. A liquid-repellent structure having the above effects can be produced by this method.

The third embodiment of the present disclosure has been described in detail so far, but the present invention is not limited to the embodiment described above. For example, a foundation layer 8 may be provided between the treatment surface $1a$ and the liquid-repellent layer (see FIG. 9).

Fourth Embodiment

The liquid-repellent structure according to the fourth embodiment comprises a treatment surface $1a$, and a liquid-repellent layer formed on the treatment surface $1a$; wherein the liquid-repellent layer contains a binder resin containing a fluorine-containing resin, and a filler dispersed in the binder resin; and the ratio $W_F/W_S$ of the mass $W_F$ of fluorine contained in the fluorine-containing resin to the mass $W_S$ of the filler is 0.06 to 0.90. The components contained in the liquid-repellent layer according to the fourth embodiment, the content ratio thereof, and the like may be the same as those of the first embodiment and modifications thereof, as well as the second embodiment and the third embodiment. Regarding the fourth embodiment, matters different from those of the above embodiment etc. will be mainly described below.

The binder resin contains at least a fluorine-containing resin. The fluorine-containing resin is not particularly limited, and a resin having a perfluoroalkyl, perfluoroalkenyl or perfluoropolyether structure or the like can be used as appropriate. The fluorine-containing resin preferably contains a fluorine-acrylic copolymer, from the viewpoint of further improving the liquid repellency of the liquid-repellent layer 3. The fluorine-acrylic copolymer is a copolymer composed of a fluorine-containing monomer and an acrylic monomer. The fluorine-acrylic copolymer may be a block copolymer or a random copolymer. The use of the fluorine-acrylic copolymer makes it possible to improve the weather resistance, water resistance, chemical resistance, and film-forming properties of the liquid-repellent layer 3.

The fluorine content of the fluorine-containing resin is, for example, 30 to 60 mass %, and may be 40 to 50 mass %. The fluorine content means the ratio of the mass of fluorine atoms to the total mass of the atoms constituting the fluorine-containing resin.

As the fluorine-containing resin, a commercially available fluorine paint can be used. Examples of commercially available fluorine paints include AsahiGuard produced by AGC Inc., SFcoat produced by AGC Seimi Chemical Co., Ltd., Ftergent produced by Neos Co., Ltd., Fluorolink produced by Solvay, Unidyne produced by Daikin Industries Ltd., the H-3539 series produced by DKS Co. Ltd., the Modiper F series produced by NOF Corporation, and the like.

As described above, in the liquid-repellent layer, the ratio $W_F/W_S$ of the mass $W_F$ of fluorine contained in the fluorine-containing resin to the mass $W_S$ of the filler is 0.06 to 0.90. Here, the mass $W_S$ of the filler means the total amount of fillers when two or more fillers are used. For example, in the liquid-repellent layer 3 shown in FIG. 1, the mass $W_{S1}$ of the scale-like filler 5f corresponds to the mass $W_S$ of the filler. When the ratio $W_F/W_S$ is 0.06 or more, a sufficient amount of fluorine can be efficiently arranged on the surface of the filler, and the surface free energy of the liquid-repellent layer can be efficiently lowered. Therefore, the liquid-repellent layer can achieve improved or even excellent liquid repellency. From the viewpoint of obtaining such effects more sufficiently, the ratio $W_F/W_S$ may be 0.10 or more, 0.15 or more, or 0.21 or more. In particular, when the ratio $W_F/W_S$ is 0.21 or more, the amount of fluorine present on the surface of the liquid-repellent layer increases; thus, the liquid repellency is further improved. Further, when a fluorine-acrylic copolymer is used as the fluorine-containing resin, if the ratio $W_F/W_S$ is 0.21 or more, the amount of the acrylic component also increases; thus, the strength of the coating film is improved, and the detaching of the filler can be prevented. On the other hand, when the ratio $W_F/W_S$ is 0.90 or less, the filler is not buried in the fluorine-containing resin, asperities are efficiently formed on the surface of the liquid-repellent layer, and the liquid-repellent layer can achieve improved or even excellent liquid repellency. From the viewpoint of obtaining such effects more sufficiently, the ratio $W_F/W_S$ may be 0.80 or less, 0.70 or less, 0.60 or less, or 0.50 or less. The ratio $W_F/W_S$ can be measured, for example, by pyrolysis GC-MS, a combustion IC method, or the like. In addition, the ratio $W_F/W_S$ can be calculated from the mixing amount of each component that constitutes the liquid-repellent layer when their mixing amounts are known. The units of the mass $W_F$ and the mass $W_S$ are the same.

The content ratio of the fluorine-containing resin in the binder resin 5b (relative to the mass of the binder resin 5b) is, for example, 5 mass % or more, and may be 15 mass % or more or 50 mass % or more. The content ratio of the fluorine-containing resin in the binder resin 5b may be 100 mass %; however, when the binder resin 5b contains a thermoplastic resin and a crosslinking agent, the content ratio of the fluorine-containing resin may be 99 mass % or less, or 75 mass % or less. When the content ratio of the fluorine-containing resin in the binder resin 5b is 5 mass % or more, the liquid-repellent layer is likely to exhibit improved or even excellent liquid repellency. On the other hand, when the content ratio of the fluorine-containing resin is 99 mass % or less, the content ratios of the thermoplastic resin and the crosslinking agent can be sufficiently secured, it is possible to sufficiently prevent the filler from detaching from the liquid-repellent layer, and the durability of the liquid-repellent layer can be sufficiently enhanced.

The content ratio of the thermoplastic resin in the binder resin 5b (relative to the mass of the binder resin 5b) is, for example, 5 to 90 mass %, and may be 10 to 50 mass % or 20 to 30 mass %. When the content ratio of the thermoplastic resin in the binder resin 5b is 5 mass % or more, it is possible to sufficiently prevent the filler from detaching from the liquid-repellent layer. On the other hand, when the content ratio of the thermoplastic resin is 90 mass % or less, the content ratios of the fluorine-containing resin and the crosslinking agent can be sufficiently secured, and the liquid-repellent layer can easily exhibit improved or even excellent liquid repellency and durability.

The ratio $W_C/W_J$ of the mass $W_C$ of the crosslinking agent contained in the binder resin 5b to the mass $W_J$ of the fluorine-containing resin contained in the binder resin 5b is, for example, 0.01 to 0.5, and may be 0.05 to 0.3 or 0.1 to 0.2. When the ratio $W_C/W_J$ is 0.01 or more, it is possible to sufficiently prevent the filler from detaching from the liquid-repellent layer, and the durability of the liquid-repellent layer can be sufficiently enhanced. On the other hand, when the ratio $W_C/W_J$ is 0.5 or less, the content of the fluorine-containing resin can be sufficiently secured, and the fluorine-containing resin can bleed out sufficiently on the surface of the liquid-repellent layer; thus, improved or even excellent liquid repellency can be exhibited.

When the binder resin 5b contains a thermoplastic resin and a crosslinking agent, the ratio $W_C/(W_P+W_J)$ of the mass $W_C$ of the crosslinking agent contained in the binder resin 5b to the sum $(W_P+W_J)$ of the mass $W_P$ of the thermoplastic resin and the mass $W_J$ of the fluorine-containing resin contained in the binder resin 5b is, for example, 0.01 to 0.5, and may be 0.05 to 0.3 or 0.07 to 0.2. When the ratio $W_C/(W_P+W_J)$ is 0.01 or more, it is possible to sufficiently prevent the filler from detaching from the liquid-repellent layer, and the durability of the liquid-repellent layer can be sufficiently enhanced. On the other hand, when the ratio $W_C/(W_P+W_J)$ is 0.5 or less, the contents of the fluorine-containing resin and the thermoplastic resin can be sufficiently secured, and the fluorine-containing resin can bleed out sufficiently on the surface of the liquid-repellent layer; thus, improved or even excellent liquid repellency can be exhibited. In addition, it is possible to sufficiently obtain the effect of preventing the filler from detaching from the liquid-repellent layer due to the thermoplastic resin.

The ratio $WB/W_S$ of the mass WB of the binder resin 5b to the mass $W_S$ of the filler contained in the liquid-repellent layer may be 0.1 to 5, 0.2 to 2, or 0.3 to 1. Here, the mass WB of the binder resin 5b corresponds to the sum of the mass $W_J$ of the fluorine-containing resin, the mass $W_P$ of the thermoplastic resin, and the mass $W_C$ of the crosslinking agent. When the ratio $WB/W_S$ is within the above range, although the entire filler is sufficiently covered with the binder resin 5b, asperities due to the filler are likely to be formed on the surface of the liquid-repellent layer. This prevents the filler from detaching from the liquid-repellent layer, and both liquid repellency due to the filler and liquid repellency due to the fluorine-containing resin contained in the binder resin 5b can be obtained. Even if the liquid-repellent layer 3 is combusted, the mass $W_S$ of the filler does not change substantially; thus, the value of the ratio $WB/W_S$ can be calculated by measuring changes in the mass of the liquid-repellent layer due to combustion The aggregates 5 are a combination of many pieces of the scale-like filler 5f and the binder resin 5b (cured product of a fluorine-containing resin, a thermoplastic resin, a crosslinking agent, etc.). The aggregates 5 form asperities on the surface of the liquid-repellent layer 3 (see FIG. 1). According to the study by the present inventors, when the size ((major axis+minor axis)/2) of one aggregate 5 is 4 μm or more, the aggregates 5 greatly contribute to the improvement of the liquid repellency of the liquid-repellent layer 3.

The plural aggregates 5 may be placed apart from each other in the liquid-repellent layer 3. That is, the aggregates 5 may be arranged in the form of islands. Alternatively, a large number of aggregates 5 may be formed continuously, and a porous layer of the aggregates 5 may be formed on the liquid-repellent layer 3. In addition, the aggregates 5 have a complex shape derived from the complex and fine shape of the scale-like filler 5f. That is, the aggregates 5 have a pleated surface and voids formed by the pleats because a plurality of primary particles (e.g., particle having an average primary particle size of 0.1 to 6 µm) of the scale-like filler 5f are aggregated in random arrangement.

The mass per unit area of the liquid-repellent layer 3 is, for example, 0.3 to 10.0 g/m², and may be 1.0 to 3.0 g/m² or 1.5 to 2.5 g/m². When the mass per unit area of the liquid-repellent layer 3 is 0.3 g/m² or more, improved or even excellent liquid repellency due to the fluorine-containing resin can be achieved. On the other hand, when the mass per unit area of the liquid-repellent layer 3 is 10.0 g/m² or less, asperities and the liquid-repellent effect of the fluorine-containing resin can be efficiently obtained.

The fluorine-containing resin may or may not contain a structural unit derived from pyrrolidone or a derivative thereof (pyrrolidones), from the viewpoint of further improving the liquid repellency to highly viscous liquids containing surfactants etc. (e.g., hand soap, body soap, shampoo, rinse, creams, and cosmetics). Here, examples of pyrrolidones include N-vinyl-2-pyrrolidone, N-vinyl-3-methyl-2-pyrrolidone, N-vinyl-5-methyl-2-pyrrolidone, N-vinyl-3,3-dimethyl-2-pyrrolidone, and the like. Example of fluorine-containing resins that do not contain structural units derived from pyrrolidones include AsahiGuard AG-E060, AG-E070, and AG-E090 produced by AGC Inc., and Unidyne TG-8111 produced by Daikin Industries, Ltd.

The binder resin may further contain one or both of a thermoplastic resin and a crosslinking agent. With the binder resin containing a thermoplastic resin, it is possible to more sufficiently prevent the filler from detaching from the liquid-repellent layer, and to further improve the liquid repellency and durability of the liquid-repellent layer. The thermoplastic resin may be selected from those mentioned in the first embodiment. When the binder resin contains a crosslinking agent, the binder resin in the liquid-repellent layer may have a crosslinked structure in which the fluorine-containing resin and the thermoplastic resin are crosslinked through a crosslinking agent. When the liquid-repellent layer further contains a crosslinking agent, for example, the fluorine-containing resin reacts with the crosslinking agent to form a crosslinked structure in the liquid-repellent layer, which can further prevent the filler from detaching from the liquid-repellent layer. Moreover, when the crosslinking agent reacts with the fluorine-containing resin, the reaction sites (functional groups, such as hydroxyl groups) of the fluorine-containing resin can be reduced in number, and it is possible to reduce the affinity between the liquid-repellent layer and liquids (water, and oil or oil-containing liquids etc.) due to the above reaction sites. In addition, it is considered that the fluorine-containing resin and the crosslinking agent form a crosslinked structure, which makes it possible to make the orientation of fluorine-containing groups, such as perfluoroalkyl groups (Rf groups), of the fluorine-containing resin rigid, and that the liquid repellency can be prevented from being lowered by disordering of the orientation of the fluorine-containing groups when the liquid-repellent layer is in contact with a liquid for a long period of time. Due to these effects resulting from the addition of the crosslinking agent, the liquid-repellent layer can maintain improved or even excellent liquid repellency even when it is in contact with a liquid for a long period of time. The crosslinking agent may be selected from those mentioned in the third embodiment.

The method for producing the liquid-repellent structure according to the fourth embodiment comprises the steps of: preparing a coating liquid containing a binder resin containing a fluorine-containing resin, and a filler; forming a coating film of the coating liquid on a surface to which liquid repellency is to be imparted; and drying and curing the coating film to thereby form a liquid-repellent layer. In the coating liquid, the ratio $W_F/W_S$ of the mass $W_F$ of fluorine contained in the fluorine-containing resin to the mass $W_S$ of the filler is 0.06 to 0.90. The coating liquid contains, for example, the scale-like filler 5f, a fluorine-containing resin, a solvent, and optionally at least one of a thermoplastic resin and a crosslinking agent. When the coating liquid contains a crosslinking agent, the liquid-repellent layer 3 has a crosslinked structure composed of the fluorine-containing resin and an optionally used thermoplastic resin and crosslinking agent. The heating conditions are not limited as long as the solvent can be evaporated and a crosslinking reaction can occur. For example, heating can be carried out at 60° C. to 100° C. for 0.5 to 5 minutes. The liquid-repellent structure of the present disclosure having the above effects can be produced by this method.

Figure 13:
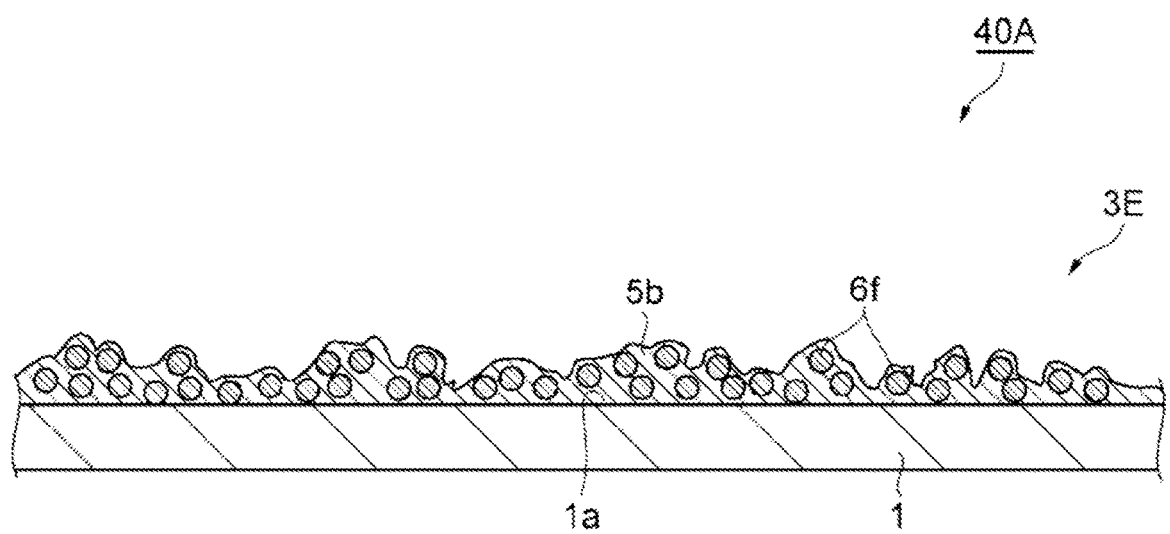
FIG. 13 is a schematic cross-sectional view illustrating a modification of a liquid-repellent structure according to a fourth embodiment.

The liquid-repellent layer 3 may be a layer containing a second filler alone instead of the scale-like filler 5f, or may be a layer containing a third filler alone instead of the scale-like filler 5f. The liquid-repellent structure 40A shown in FIG. 13 comprises a liquid-repellent layer 3E containing, as a filler, a second filler (filler 6f) of a size smaller than the scale-like filler 5f. The filler 6f is, for example, spherical, and has an average primary particle size of 5 to 1000 nm. When the ratio $W_F/W_S$ mentioned above is 0.06 to 0.90 in the liquid-repellent layer 3E, the liquid-repellent layer 3E can also obtain improved or even excellent liquid repellency. In the liquid-repellent layer 3E shown in FIG. 13, the mass $W_{S2}$ of the filler 6f corresponds to the mass $W_S$ of the filler. In this modification, the preferable range of the ratio $W_F/W_S$ and the effect thereof are the same as those described in the present embodiment.

As with the liquid-repellent layer 3A shown in FIG. 6, the liquid-repellent layer of the present embodiment may contain, as fillers, a scale-like filler 5f and a filler 6f of a size smaller than the scale-like filler 5f. When an appropriate amount of the filler 6f is mixed in the liquid-repellent layer-forming coating liquid, the filler 6f can be interposed between the primary particles of the scale-like filler 5f (see FIG. 6). This can prevent the formation of excessively large aggregates due to excessive stacking (aggregation) of the primary particles of the scale-like filler 5f. In this embodiment, when the ratio $W_F/W_S$ mentioned above is 0.06 to 0.90, the liquid-repellent layer can also obtain improved or even excellent liquid repellency. In this embodiment, the sum of the mass $W_{S1}$ of the scale-like filler 5f and the mass $W_{S2}$ of the filler 6f corresponds to the mass $W_S$ of the filler. The aggregates of this embodiment are composed of the scale-like filler 5f, the filler 6f, and the binder resin 5b covering these fillers. In this embodiment, the preferable range of the ratio $W_F/W_S$ and the effect thereof are the same as those described in the liquid-repellent structure 10. The configuration is the same as that described in the present embodiment, except that the filler contained in the liquid-repellent layer is different. The configuration is the same as that described in the liquid-repellent structure 10, except that the filler contained in the liquid-repellent layer is different.

The content of the filler 6f may be, for example, 5 to 300 parts by mass, 10 to 250 parts by mass, or 20 to 200 parts by mass, relative to 100 parts by mass of the scale-like filler 5f. When the content of the filler 6f is within the above range, it is possible to more sufficiently prevent the formation of excessively large aggregates due to excessive stacking (aggregation) of the primary particles of the scale-like filler 5f, and improved or even excellent liquid repellency due to the scale-like filler 5f and the filler 6f can be easily obtained.

As with the liquid-repellent layer 3B shown in FIG. 7, the liquid-repellent layer of the present embodiment may further contain, as fillers, a scale-like filler 5*f* and a filler 7*f* of a size larger than the scale-like filler 5*f*. The filler 7*f* is, for example, spherical, and has an average primary particle size of 5 to 30 µm. Asperities rougher than the asperities due to the aggregates composed of the scale-like filler 5*f* are formed on the surface of the liquid-repellent layer containing the filler 7*f* of this size. The liquid-repellent layer according to this embodiment thereby also has particularly improved or even excellent liquid repellency to highly viscous liquids containing surfactants etc. (e.g., hand soap, body soap, shampoo, rinse, creams, and cosmetics). The filler 7*f* may be a filler having liquid repellency.

When the ratio $W_F/W_S$ mentioned above is 0.06 to 0.90 in the liquid-repellent layer according to this embodiment, the liquid-repellent layer can also obtain improved or even excellent liquid repellency. In the liquid-repellent layer according to this embodiment, the sum of the mass $W_{S1}$ of the scale-like filler 5*f* and the mass $W_{S3}$ of the filler 7*f* corresponds to the mass $W_S$ of the filler. In this embodiment, the preferable range of the ratio $W_F/W_S$ and the effect thereof are the same as those described in the present embodiment. The configuration is the same as that described in the liquid-repellent structure 10, except that the filler contained in the liquid-repellent layer is different.

The liquid-repellent layer may further contain, together with the scale-like filler 5*f*, both the filler 6*f* and the filler 7*f* described above. The liquid-repellent structure 10D shown in FIG. 6 comprises a liquid-repellent layer 3D containing the scale-like filler 5*f*, the filler 6*f*, and the filler 7*f*. Asperities due to the aggregates 5 composed of the binder resin 5*b*, the scale-like filler 5*f*, and the filler 6*f*, and rough asperities due to the filler 7*f* are formed on the surface of the liquid-repellent layer 3D. The liquid-repellent layer 3D thereby also has particularly improved or even excellent liquid repellency to highly viscous liquids containing surfactants etc. (e.g., hand soap, body soap, shampoo, rinse, creams, and cosmetics).

When the ratio $W_F/W_S$ mentioned above is 0.06 to 0.90 in the liquid-repellent layer 3D, the liquid-repellent layer 3D can also obtain improved or even excellent liquid repellency. In the liquid-repellent layer 3D shown in FIG. 6, the sum of the mass $W_{S1}$ of the scale-like filler 5*f*, the mass $W_{S2}$ of the filler 6*f*, and the mass $W_{S3}$ of the filler 7*f* corresponds to the mass $W_S$ of the filler. In the present embodiment, the preferable range of the ratio $W_F/W_S$ and the effect thereof are the same as those described in the liquid-repellent structure 10. The configuration is the same as that described in the liquid-repellent structure 10, except that the filler contained in the liquid-repellent layer is different.

The fillers used in the liquid-repellent layer are not limited to those in the embodiment described above, and can be appropriately selected. For example, the fillers contained in the liquid-repellent layer may contain fillers other than the scale-like filler 5*f*, the filler 6*f*, and the filler 7*f*. From the viewpoint of imparting more improved or even excellent liquid repellency to the liquid-repellent layer, the liquid-repellent layer preferably contains at least one member selected from the group consisting of the scale-like filler 5*f*, the filler 6*f*, and the filler 7*f*; more preferably contains at least the scale-like filler 5*f*; even more preferably contains the scale-like filler 5*f* and at least one of the filler 6*f* and the filler 7*f*; and particularly preferably contains all of the scale-like filler 5*f*, the filler 6*f*, and the filler 7*f*.

The fourth embodiment of the present disclosure has been described in detail so far, but the present invention is not limited to the embodiment described above. For example, a foundation layer may be provided between the treatment surface 1*a* and the liquid-repellent layer (see FIG. 9).

EXAMPLES

The present disclosure will be described in more detail with reference to the following examples; however, the present invention is not limited to these examples.

The following materials were prepared to produce liquid-repellent structures according to the first embodiment and liquid-repellent structures according to comparative examples.

(Substrate)
Polyethylene terephthalate (PET) film
(Thermoplastic Resin)
Modified polyolefin: Auroren AE-301 (trade name, produced by Nippon Paper Industries Co., Ltd., melting point: 60 to 70° C.)
(Fluorine Compound)
Fluorine paint a: AsahiGuard AG-E060 (trade name, produced by AGC Inc., a compound that does not have structural units derived from pyrrolidones, a cationic water-based material)
Fluorine paint b: AsahiGuard AG-E070 (trade name, produced by AGC Inc., a compound that does not have structural units derived from pyrrolidones, a cationic water-based material)
Fluorine paint c: AsahiGuard AG-E090 (trade name, produced by AGC Inc., a compound that does not have structural units derived from pyrrolidones, an anionic water-based material)
Fluorine paint d: Unidyne TG-8111 (trade name, produced by Daikin Industries, Ltd., a compound that does not have structural units derived from pyrrolidones, an anionic water-based material)
Fluorine paint e: Unidyne TG-8811 (trade name, produced by Daikin Industries, Ltd., a compound that has a structural unit derived from a pyrrolidone, a cationic water-based material)
(Scale-Like Filler)
Scale-like silica a: Sunlovely (trade name, produced by AGC Si-Tech Co., Ltd., average particle size: 4 to 6 µm)
Scale-like silica b: Sunlovely (trade name, produced by AGC Si-Tech Co., Ltd., average particle size: 0.1 µm)
Scale-like mica: Repco Mica (trade name, produced by Repco Inc., average particle size: 4 µm)
(Second Filler)
Silica particles a: AEROSIL (trade name, produced by Nippon Aerosil Co., Ltd., average particle size: 7 nm)
Silica particles b: AEROSIL (trade name, produced by Nippon Aerosil Co., Ltd., average particle size: 30 nm)
Silica particles c: Seahostar (trade name, produced by Nippon Shokubai Co., Ltd., average particle size: 500 nm)
Silica particles d: Seahostar (trade name, produced by Nippon Shokubai Co., Ltd., average particle size: 1000 nm)
(Third Filler and Fifth Filler)
Silica particles e: Sunsphere (trade name, produced by AGC Si-Tech Co., Ltd., average particle size: 10 µm)
Silica particles f: Sunsphere (trade name, produced by AGC Si-Tech Co., Ltd., average particle size: 20 µm)
Acrylic beads a: Art Pearl (trade name, produced by Negami Chemical Industrial Co., Ltd., average particle size: 90 µm)

Acrylic beads b: Art Pearl (trade name, produced by Negami Chemical Industrial Co., Ltd., average particle size: 10 μm)

Silica particles g: HS-304 (trade name, produced by Nippon Steel Chemical & Material Co., Ltd., average particle size: 28 μm)

Silica particles h: Sunsphere (trade name, produced by AGC Si-Tech Co., Ltd., average particle size: 5 μm)

Silica particles i: Sunsphere (trade name, produced by AGC Si-Tech Co., Ltd., average particle size: 12 μm)

Polyethylene particles: Flo-Beads (trade name, produced by Sumitomo Seika Chemicals Co., Ltd., average particle size: 11 μm)

(Solvent)

Alcoholic solvent (2-propanol)

Production of Liquid-Repellent Structure

Examples 1a to 12a

Among the thermoplastic resin, fluorine paints (fluorine compounds), scale-like fillers, second fillers, and third fillers, components to be used were added to a solvent so that the mass ratio (solid content) of each component in the liquid-repellent layer was as shown in Examples 1a to 12a of Tables 1 to 3. The resulting mixture was sufficiently stirred to prepare a liquid-repellent layer-forming coating liquid, and the coating liquid was applied with a bar coater to a PET film as a substrate. Subsequently, the applied coating liquid was dried by heating at 80° C. for 1 minute to form a liquid-repellent layer on the substrate. The coating amount was adjusted so that the thickness (thickness T in FIG. 1) of the binder layer in the liquid-repellent layer was 0.5 μm.

Examples 13a, 22a to 25a, and 28a

Among the thermoplastic resin, fluorine paints (fluorine compounds), scale-like fillers, second fillers, and third fillers, components to be used were added to a solvent so that the mass ratio (solid content) of each component in the liquid-repellent layer was as shown in Examples 13a, 22a to 25a, and 28a of Tables 4 and 5. The resulting mixture was sufficiently stirred to prepare a liquid-repellent layer-forming coating liquid, and the coating liquid was applied with a bar coater to a PET film as a substrate. Subsequently, the applied coating liquid was dried by heating at 80° C. for 1 minute to form a liquid-repellent layer on the substrate. The coating amount was adjusted so that the thickness (thickness T in FIG. 1) of the binder layer in the liquid-repellent layer was 0.5 μm.

Examples 14a to 21a, 26a, and 27a

The thermoplastic resin and optionally the fifth filler were added so that the mass ratio (solid content) of each component in the foundation layer was as shown in Examples 14a to 21a, 26A, and 27A of Tables 4 and 5, respectively. The resulting mixture was added to solvent and sufficiently stirred to prepare a foundation layer-forming coating liquid, and the coating liquid was applied with a bar coater to a PET film as a substrate. Subsequently, the applied coating liquid was dried by heating at 80° C. for 1 minute to form a foundation layer on the substrate. The coating amount was adjusted so that the thickness (thickness T' in FIG. 9) of the thermoplastic resin layer in the foundation layer was 0.5 μm.

Next, among the thermoplastic resin, fluorine paints (fluorine compounds), scale-like fillers, second fillers, and third fillers, components to be used were added to a solvent so that the mass ratio (solid content) of each component in the liquid-repellent layer was as shown in Examples 14a to 21a, 26a, and 27a of Tables 4 and 5. The resulting mixture was sufficiently stirred to prepare a liquid-repellent layer-forming coating liquid, and the coating liquid was applied with a bar coater to the foundation layer. Subsequently, the applied coating liquid was dried by heating at 80° C. for 1 minute to form a liquid-repellent layer on the foundation layer. The coating amount was adjusted so that the thickness (thickness T in FIG. 1) of the binder layer in the liquid-repellent layer was 0.5 μm.

Examples 29a to 37a

The thermoplastic resin and the fifth filler were added to a solvent so that the mass ratio (solid content) of each component in the foundation layer was as shown in Examples 29a to 37a of Tables 6 and 7. The resulting mixture was sufficiently stirred to prepare a foundation layer-forming coating liquid, and the coating liquid was applied with a bar coater to a PET film as a substrate. Subsequently, the applied coating liquid was dried by heating at 80° C. for 1 minute to form a foundation layer on the substrate. The coating amount was adjusted so that the thickness (thickness T' in FIG. 9) of the thermoplastic resin layer in the foundation layer was 0.5 μm.

Next, among the thermoplastic resin, fluorine paints (fluorine compounds), scale-like fillers, second fillers, and third fillers, components to be used were added to a solvent so that the mass ratio (solid content) of each component in the liquid-repellent layer was as shown in Examples 29a to 37a of Table 6. The resulting mixture was sufficiently stirred to prepare a liquid-repellent layer-forming coating liquid, and the coating liquid was applied with a bar coater to the foundation layer. Subsequently, the applied coating liquid was dried by heating at 80° C. for 1 minute to form a liquid-repellent layer on the foundation layer. The coating amount was adjusted so that the thickness (thickness T in FIG. 1) of the binder layer in the liquid-repellent layer was 0.5

TABLE 1

| | | Example | | | | |
| --- | --- | --- | --- | --- | --- | --- |
| | | 1a | 2a | 3a | 4a | 5a |
| Thermoplastic resin $W_P$ (parts by mass) | Modified polyolefin | 75 | 75 | 75 | 75 | 75 |
| Fluorine compound $W_{FC}$ (parts by mass) | Fluorine paint a | 25 | 25 | 25 | 25 | 25 |
| Scale-like filler $W_{S1}$ (parts by mass) | Scale-like filler a | 100 | 500 | 1000 | — | — |
| | Scale-like filler b | — | — | — | 500 | — |
| | Scale-like mica | — | — | — | — | 500 |
| $W_{S1}/(W_P + W_{FC})$ | | 1 | 5 | 10 | 5 | 5 |

TABLE 2

|  |  | Example | | | |
|---|---|---|---|---|---|
|  |  | 6a | 7a | 8a | 9a |
| Thermoplastic resin $W_P$ (parts by mass) | Modified polyolefin | 75 | 75 | 75 | 75 |
| Fluorine compound $W_{FC}$ (parts by mass) | Fluorine paint a | 25 | 25 | 25 | 25 |
| Scale-like filler $W_{S1}$ (parts by mass) | Scale-like filler a | 400 | 400 | 400 | 400 |
|  | Scale-like filler b | — | — | — | — |
|  | Scale-like mica | — | — | — | — |

TABLE 2-continued

|  |  | Example | | | |
|---|---|---|---|---|---|
|  |  | 6a | 7a | 8a | 9a |
| Second filler $W_{S2}$ (parts by mass) | Silica particles a | 100 | — | — | — |
|  | Silica particles b | — | 100 | — | — |
|  | Silica particles c | — | — | 100 | — |
|  | Silica particles d | — | — | — | 100 |
| $W_{S1}/(W_P + W_{FC})$ |  | 4 | 4 | 4 | 4 |
| $(W_{S1} + W_{S2})/(W_P + W_{FC})$ |  | 5 | 5 | 5 | 5 |

TABLE 3

|  |  | Example | | |
|---|---|---|---|---|
|  |  | 10a | 11a | 12a |
| Thermoplastic resin $W_P$ (parts by mass) | Modified polyolefin | 75 | 75 | 75 |
| Fluorine compound $W_{FC}$ (parts by mass) | Fluorine paint a | 25 | 25 | 25 |
| Scale-like filler $W_{S1}$ (parts by mass) | Scale-like filler a | 225 | 225 | 225 |
|  | Scale-like filler b | — | — | — |
|  | Scale-like mica | — | — | — |
| Second filler $W_{S2}$ (parts by mass) | Silica particles a | — | — | — |
|  | Silica particles b | — | — | — |
|  | Silica particles c | 50 | 50 | 50 |
|  | Silica particles d | — | — | — |
| Third filler $W_{S3}$ (parts by mass) | Silica particles e | 225 | — | — |
|  | Silica particles f | — | 225 | — |
|  | Acrylic beads | — | — | 225 |
| $W_{S1}/(W_P + W_{FC})$ |  | 2.25 | 2.25 | 2.25 |
| $(W_{S1} + W_{S2})/(W_P + W_{FC})$ |  | 2.75 | 2.75 | 2.75 |
| $(W_{S1} + W_{S2} + W_{S3})/(W_P + W_{FC})$ |  | 5 | 5 | 5 |

TABLE 4

|  |  |  | Example | | | | | | | |
|---|---|---|---|---|---|---|---|---|---|---|
|  |  |  | 13a | 14a | 15a | 16a | 17a | 18a | 19a | 20a |
| Liquid-repellent layer | Thermoplastic resin $W_P$ (parts by mass) | Modified polyolefin | 75 | 75 | 75 | 75 | 75 | 75 | 75 | 75 |
|  | Fluorine compound $W_{FC}$ (parts by mass) | Fluorine paint a | 25 | 25 | 25 | 25 | 25 | 25 | 25 | 25 |
|  | Scale-like filler $W_{S1}$ (parts by mass) | Scale-like filler a | 250 | 500 | 400 | 225 | 250 | 500 | 400 | 225 |
|  | Second filler $W_{S2}$ (parts by mass) | Silica particles b | — | — | 100 | 50 | — | — | 100 | 50 |
|  | Third filler $W_{S3}$ (parts by mass) | Silica particles f | 250 | — | — | 225 | 250 | — | — | 225 |
| Foundation layer | Thermoplastic resin (parts by mass) | Modified polyolefin | — | 100 | 100 | 100 | 100 | 100 | 100 | 100 |
|  | Fifth filler (parts by mass) | Silica particles f | — | — | — | — | 500 | 500 | 500 | 300 |
| $W_{S1}/(W_P + W_{FC})$ |  |  | 2.5 | 5 | 4 | 2.25 | 2.5 | 5 | 4 | 2.25 |
| $(W_{S1} + W_{S2})/(W_P + W_{FC})$ |  |  | 2.5 | 5 | 5 | 2.75 | 2.5 | 5 | 5 | 2.75 |
| $(W_{S1} + W_{S3})/(W_P + W_{FC})$ |  |  | 5 | 5 | 4 | 4.5 | 5 | 5 | 4 | 4.5 |
| $(W_{S1} + W_{S2} + W_{S3})/(W_P + W_{FC})$ |  |  | 5 | 5 | 5 | 5 | 5 | 5 | 5 | 5 |

TABLE 5

|  |  |  | Example | | | | | | | |
|---|---|---|---|---|---|---|---|---|---|---|
|  |  |  | 21a | 22a | 23a | 24a | 25a | 26a | 27a | 28a |
| Liquid-repellent layer | Thermoplastic resin $W_P$ (parts by mass) | Modified polyolefin | 75 | 75 | 75 | 75 | 75 | 75 | 75 | 75 |
|  | Fluorine compound $W_{FC}$ (parts by mass) | Fluorine paint a | 25 | 25 | — | — | — | 25 | 25 | — |
|  |  | Fluorine paint b | — | — | 25 | — | — | — | — | — |
|  |  | Fluorine paint c | — | — | — | 25 | — | — | — | — |

TABLE 5-continued

|  |  |  | Example |  |  |  |  |  |  |  |
|---|---|---|---|---|---|---|---|---|---|---|
|  |  |  | 21a | 22a | 23a | 24a | 25a | 26a | 27a | 28a |
|  |  | Fluorine paint d | — | — | — | — | 25 | — | — | — |
|  |  | Fluorine paint e | — | — | — | — | — | — | — | 25 |
|  | Scale-like filler $W_{S1}$ (parts by mass) | Scale-like filler a | 250 | 75 | 75 | 75 | 75 | 75 | 75 | 75 |
|  | Second filler $W_{S2}$ (parts by mass) | Silica particles b | — | 150 | 150 | 150 | 150 | 150 | 150 | 150 |
|  | Third filler $W_{S3}$ (parts by mass) | Silica particles f | 250 | 275 | 275 | 275 | 275 | 275 | 275 | 275 |
| Foundation layer | Thermoplastic resin (parts by mass) | Modified polyolefin | 100 | — | — | — | — | 100 | 100 | — |
|  | Fifth filler (parts by mass) | Silica particles f | 300 | — | — | — | — | — | 300 | — |
| $W_{S1}/(W_P + W_{FC})$ |  |  | 2.5 | 0.75 | 0.75 | 0.75 | 0.75 | 0.75 | 0.75 | 0.75 |
| $(W_{S1} + W_{S2})/(W_P + W_{FC})$ |  |  | 2.5 | 2.25 | 2.25 | 2.25 | 2.25 | 2.25 | 2.25 | 2.25 |
| $(W_{S1} + W_{S3})/(W_P + W_{FC})$ |  |  | 5 | 3.5 | 3.5 | 3.5 | 3.5 | 3.5 | 3.5 | 3.5 |
| $(W_{S1} + W_{S2} + W_{S3})/(W_P + W_{FC})$ |  |  | 5 | 5 | 5 | 5 | 5 | 5 | 5 | 5 |

TABLE 6

|  |  |  | Example |  |  |  |  |  |  |  |  |
|---|---|---|---|---|---|---|---|---|---|---|---|
|  |  |  | 29a | 30a | 31a | 32a | 33a | 34a | 35a | 36a | 37a |
| Liquid-repellent layer | Thermoplastic resin $W_P$ (parts by mass) | Modified polyolefin | 75 | 75 | 75 | 75 | 75 | 75 | 75 | 75 | 75 |
|  | Fluorine compound $W_{FC}$ (parts by mass) | Fluorine paint a | 25 | 25 | 25 | 25 | 25 | 25 | 25 | 25 | 25 |
|  | Scale-like filler $W_{S1}$ (parts by mass) | Scale-like filler a | 500 | 400 | 225 | 250 | 75 | 500 | 400 | 250 | 75 |
|  | Second filler $W_{S2}$ (parts by mass) | Silica particles b | — | 100 | 50 | — | 150 | — | 100 | — | 150 |
|  | Third filler $W_{S3}$ (parts by mass) | Silica particles f | — | — | 225 | 250 | 275 | — | — | 250 | 275 |
| Foundation layer | Thermoplastic resin (parts by mass) | Modified polyolefin | 100 | 100 | 100 | 100 | 100 | 100 | 100 | 100 | 100 |
|  | Fifth filler (parts by mass) | Acrylic beads a | 500 | — | 300 | — | 300 | — | — | — | — |
|  |  | Silica particles g | — | 500 | — | 300 | — | — | — | — | — |
|  |  | Silica particles i | — | — | — | — | — | 500 | — | — | — |
|  |  | Polyethylene particles | — | — | — | — | — | — | 500 | — | — |
|  |  | Acrylic beads b | — | — | — | — | — | — | — | 300 | — |
|  |  | Silica particles e | — | — | — | — | — | — | — | — | 300 |
|  | Average particle size of fifth filler (μm) |  | 90 | 28 | 90 | 28 | 90 | 12 | 11 | 10 | 10 |
| $W_{S1}/(W_P + W_{FC})$ |  |  | 5 | 4 | 2.25 | 2.5 | 0.75 | 5 | 4 | 2.5 | 0.75 |
| $(W_{S1} + W_{S2})/(W_P + W_{FC})$ |  |  | 5 | 5 | 2.75 | 2.5 | 2.25 | 5 | 5 | 2.5 | 2.25 |
| $(W_{S1} + W_{S3})/(W_P + W_{FC})$ |  |  | 5 | 4 | 4.5 | 5 | 3.5 | 5 | 4 | 5 | 3.5 |
| $(W_{S1} + W_{S2} + W_{S3})/(W_P + W_{FC})$ |  |  | 5 | 5 | 5 | 5 | 5 | 5 | 5 | 5 | 5 |

The following materials were prepared to produce liquid-repellent structures according to comparative examples.

(Substrate)

Polyethylene terephthalate (PET) film (Thermoplastic Resin)

Modified polyolefin: Auroren AE-301 (trade name, produced by Nippon Paper Industries Co., Ltd., melting point: 60 to 70° C.)

(Fluorine Compound)

Fluorine paint a: AsahiGuard AG-E060 (trade name, produced by AGC Inc., a compound that does not have structural units derived from pyrrolidones)

(Scale-Like Filler)

Scale-like silica a: Sunlovely (trade name, produced by AGC Si-Tech Co., Ltd., average particle size: 4 to 6 μm)

(Spherical Filler)

Spherical silica: Sunsphere (trade name, produced by AGC Si-Tech Co., Ltd., average particle size: 4 μm)

Production of Liquid-Repellent Structure

Comparative Example 1a

First, a layer containing a scale-like filler and a thermoplastic resin (hereinafter referred to as the "foundation layer") was formed on a substrate in the same manner as in Example 1a, except for using a coating liquid that did not contain a fluorine paint, as shown in Comparative Example 1a of Table 7. Subsequently, the fluorine paint used in Example 1a was applied to the surface of the foundation layer using a bar coater. The applied fluorine paint was dried by heating at 80° C. for 1 minute to form an overcoat layer on the surface of the foundation layer.

Figure 14A:
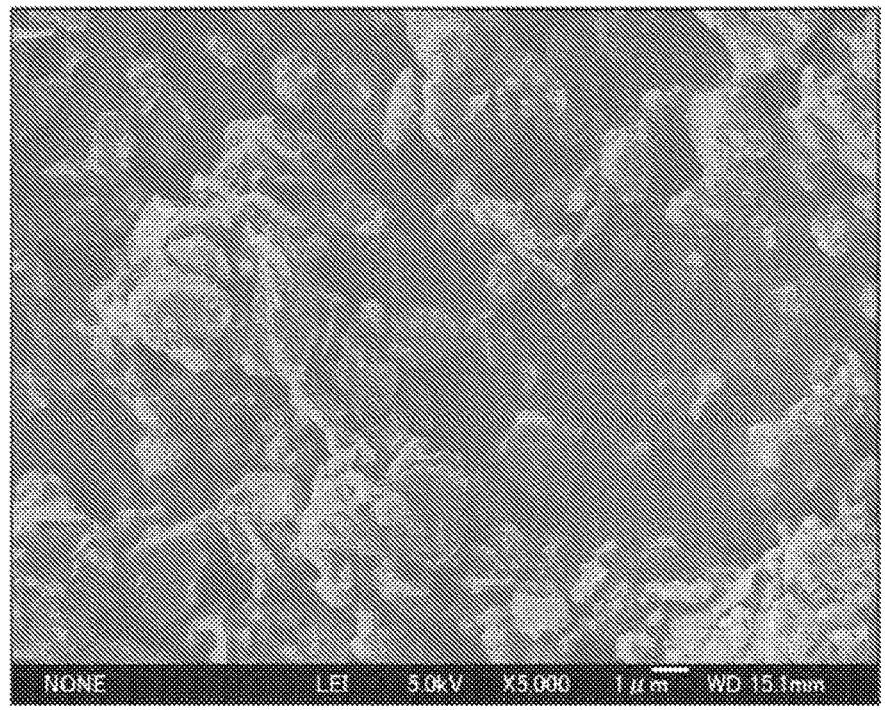
FIG. 14 (a) is an SEM image of a foundation layer containing a scale-like filler, and FIG. 14 (b) is an SEM image of a foundation layer containing a scale-like filler, and an overcoat layer covering the foundation layer.
Figure 14B:
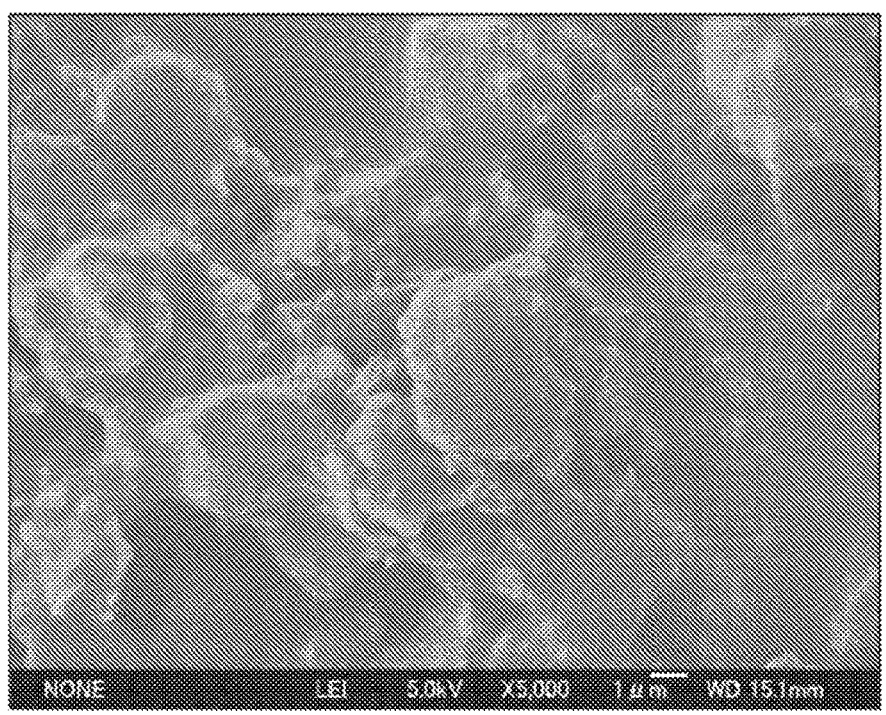

Although FIG. 14 (a) and FIG. 14 (b) are not photographs of the structure according to Comparative Example 1a, FIG.

14 (a) is an SEM image showing a foundation layer containing a scale-like filler, and FIG. 14 (b) is an SEM image showing a foundation layer containing a scale-like filler, and an overcoat layer that covers the foundation layer. These SEM images show that the fine asperities of the scale-like filler are buried in the overcoat layer.

Comparative Example 2a

A liquid-repellent layer containing a thermoplastic resin and a fluorine paint was formed on a substrate in the same manner as in Example 1a, except for using a coating liquid that did not contain a scale-like filler, as shown in Comparative Example 2a of Table 7.

Comparative Example 3a

A liquid-repellent layer was formed on a substrate in the same manner as in Example 1a, except for using a coating liquid containing a spherical filler in place of the scale-like filler, as shown in Comparative Example 3a of Table 7. The mass of the spherical silica was set as A, and the ratio $W_{S1}/(W_P+W_{FC})$ was calculated.

Comparative Examples 4a and 5a

A liquid-repellent layer was formed on a substrate in the same manner as in Example 1a, except that the mass ratio (solid content) of each component in the liquid-repellent layer was as shown in Comparative Examples 4a and 5a of Table 7.

[Liquids Used]
Pure water
Curry: Bon Curry Gold Medium Hot (Otsuka Foods)
Fresh cream: extracted from Strawberry Shortcake (Family Mart)
Yogurt: Meiji Bulgaria Yogurt L81 Low Sugar (Meiji)
Salad oil: Nisshin Salad Oil (Nisshin OilliO)
Hand soap: Kurashi-More Medicated Hand Soap (Nihon Soap)
Shampoo 1: Shokubutsu no megumi de kami ni yasashii shampoo (SEVEN-ELEVEN JAPAN)
Shampoo 2: Jihada made kokochiyoku arau shampoo (SEVEN-ELEVEN JAPAN)
Shampoo 3: Tsubaki Shining Shampoo (Shiseido)
Shampoo 4: Je l'aime Moist Repair Shampoo (Kose)
Shampoo 5: Je l'aime Relax Shampoo Soft & Moist (Kose)

[Evaluation Criteria]
A: The droplets rolled down from the surface of the liquid-repellent layer, or separated.
B: The liquid flowed down from the surface of the liquid-repellent layer, and no traces of liquid flow remained.
C: The liquid flowed down from the surface of the liquid-repellent layer, but traces of liquid flow remained in dots.
D: The liquid flowed down from the surface of the liquid-repellent layer, but traces of liquid flow remained in lines.
E: The liquid retained on the liquid-repellent layer and did not move, or soaked into the liquid-repellent layer.

TABLE 7

| | | Comparative Example | | | | |
|---|---|---|---|---|---|---|
| | | 1a | 2a | 3a | 4a | 5a |
| Thermoplastic resin $W_P$ (parts by mass) | Modified polyolefin | 100 | 75 | 75 | 75 | 75 |
| Fluorine compound $W_{FC}$ (parts by mass) | Fluorine paint a | — | 25 | 25 | 25 | 25 |
| Scale-like filler $W_{S1}$ (parts by mass) | Scale-like filler a | 100 | — | — | 5 | 1100 |
| Spherical filler $W_{S2}$ (parts by mass) | Spherical silica | — | — | 500 | — | — |
| $(W_{S1} + W_{SS})/(W_P + W_{FC})$ | | 1 | 0 | 5 | 0.05 | 11 |
| Formation of overcoat layer covering foundation layer | | Formed | Not formed | Not formed | Not formed | Not formed |

<Evaluation of Liquid-Repellent Structure>

The liquid-repellent structures were evaluated from the following viewpoints. The evaluation results are shown in Tables 8 to 17.

(Liquid Repellency Evaluation)

The liquid-repellent structure was placed flat so that the surface on the liquid-repellent layer side was face-up, and 2 µL of each of the following liquids (except for fresh cream) was dropped with a dropper on the liquid-repellent layer. Subsequently, the liquid-repellent structure was allowed to stand vertically and left in that state for 30 seconds. Then, the state of the dropped liquid was visually observed. Because the fresh cream could not be taken with a dropper, a small amount of mass was extracted with a medicine spoon and dropped on the liquid-repellent layer. Subsequently, the liquid-repellent structure was allowed to stand vertically and left in that state for 30 seconds. Then, the state of the fresh cream was visually observed.

(Adhesion Evaluation)

The adhesion to viscous materials was evaluated in the following manner. A polypropylene (PP) film was placed flat, and 2 g of each of the following viscous materials was extracted with a medicine spoon and dropped on the PP film. The liquid-repellent structure was arranged so that the surface on the liquid-repellent layer side faced the PP film. The liquid-repellent structure was pressed against the viscous material at a load of 50 g/25 cm², and left in that state for 10 seconds. Subsequently, the liquid-repellent structure was peeled off, and the state of adhesion of the viscous material to the contact surface of the liquid-repellent layer in contact with the viscous material was visually observed. The adhesion was evaluated from the observation results based on the following evaluation criteria. It can be said that there is no practical problem if the evaluation results are A to D. It is desirable that the evaluation results are A to C.

[Viscous Materials Used]
Viscous material 1: Kewpie Mayonnaise (Kewpie)

Viscous material 2: Uno Hybrid Hard (Shiseido)
Viscous material 3: Free Plus Moist Care Lotion (Kanebo Cosmetics)
Viscous material 4: Eaude Muge Medicated Skin Cream (Kobayashi Pharmaceutical)

[Evaluation Criteria]

A: No adhesion of the viscous material to the contact surface was observed.
B: Adhesion of the viscous material to less than 10% of the area of the contact surface was observed.
C: Adhesion of the viscous material to 10% or more and less than 30% of the area of the contact surface was observed.
D: Adhesion of the viscous material to 30% or more and less than 70% of the area of the contact surface was observed.
E: Adhesion of the viscous material to 70% or more of the area of the contact surface was observed.

TABLE 8

| | Example | | | | | | | | | | | |
|---|---|---|---|---|---|---|---|---|---|---|---|---|
| | 1a | 2a | 3a | 4a | 5a | 6a | 7a | 8a | 9a | 10a | 11a | 12a |
| Pure water | A | A | A | A | A | A | A | A | A | A | A | A |
| Curry | A | A | A | A | A | A | A | A | A | A | A | A |
| Fresh cream | A | A | A | A | A | A | A | A | A | A | A | A |
| Yogurt | A | A | A | A | A | A | A | A | A | A | A | A |
| Salad oil | B | B | B | B | B | A | A | A | A | A | A | A |
| Hand soap | C | C | C | C | C | C | C | C | C | A | A | A |
| Shampoo 1 | D | D | D | D | D | D | D | D | D | C | C | C |
| Shampoo 2 | D | D | D | D | D | D | D | D | D | C | C | C |
| Shampoo 3 | D | D | D | D | D | D | D | D | D | C | C | C |
| Shampoo 4 | D | D | D | D | D | D | D | D | D | C | C | C |
| Shampoo 5 | D | D | D | D | D | D | D | D | D | C | C | C |

TABLE 9

| | Example | | | | | | | |
|---|---|---|---|---|---|---|---|---|
| | 13a | 14a | 15a | 16a | 17a | 18a | 19a | 20a |
| Pure water | A | A | A | A | A | A | A | A |
| Curry | A | A | A | A | A | A | A | A |
| Fresh cream | A | A | A | A | A | A | A | A |
| Yogurt | A | A | A | A | A | A | A | A |
| Salad oil | A | B | A | A | A | A | A | A |
| Hand soap | B | C | C | A | B | B | A | A |
| Shampoo 1 | C | C | C | C | C | C | B | B |
| Shampoo 2 | C | C | C | C | C | C | C | C |
| Shampoo 3 | C | C | C | C | C | C | C | C |
| Shampoo 4 | C | C | C | C | C | C | C | C |
| Shampoo 5 | C | C | C | C | C | C | C | C |

TABLE 10

| | Example | | | | | | | |
|---|---|---|---|---|---|---|---|---|
| | 21a | 22a | 23a | 24a | 25a | 26a | 27a | 28a |
| Pure water | A | A | A | A | A | A | A | A |
| Curry | A | A | A | A | A | A | A | A |
| Fresh cream | A | A | A | A | A | A | A | A |
| Yogurt | A | A | A | A | A | A | A | A |
| Salad oil | A | A | A | A | A | A | A | A |
| Hand soap | A | A | A | A | A | A | A | A |
| Shampoo 1 | C | B | B | B | B | B | B | B |
| Shampoo 2 | C | B | B | B | B | B | B | D |
| Shampoo 3 | C | B | B | B | B | B | B | D |
| Shampoo 4 | C | B | B | B | B | B | B | B |
| Shampoo 5 | C | B | B | B | B | B | B | B |

TABLE 11

| | Example | | | | | | | | |
|---|---|---|---|---|---|---|---|---|---|
| | 29a | 30a | 31a | 32a | 33a | 34a | 35a | 36a | 37a |
| Pure water | A | A | A | A | A | A | A | A | A |
| Curry | A | A | A | A | A | A | A | A | A |
| Fresh cream | A | A | A | A | A | A | A | A | A |
| Yogurt | A | A | A | A | A | A | A | A | A |
| Salad oil | A | A | A | A | A | A | A | A | A |
| Hand soap | B | A | A | A | A | B | A | A | A |
| Shampoo 1 | C | B | C | B | B | B | B | B | A |
| Shampoo 2 | C | C | C | C | B | B | B | B | B |
| Shampoo 3 | C | C | C | C | B | C | C | C | B |
| Shampoo 4 | C | C | C | C | B | C | C | C | B |
| Shampoo 5 | C | C | C | C | B | C | C | C | B |

TABLE 12

| | Comparative Example | | | | |
|---|---|---|---|---|---|
| | 1a | 2a | 3a | 4a | 5a |
| Pure water | B | B | B | B | — |
| Curry | E | E | E | E | — |
| Fresh cream | E | E | E | E | — |
| Yogurt | E | E | E | E | — |
| Salad oil | B | C | B | C | — |
| Hand soap | C | C | C | C | — |
| Shampoo 1 | D | D | D | D | — |
| Shampoo 2 | D | D | D | D | — |
| Shampoo 3 | D | D | D | D | — |
| Shampoo 4 | D | D | D | D | — |

TABLE 13

| | Example | | | | | | | | | | | |
|---|---|---|---|---|---|---|---|---|---|---|---|---|
| | 1a | 2a | 3a | 4a | 5a | 6a | 7a | 8a | 9a | 10a | 11a | 12a |
| Viscous material 1 | D | D | D | D | D | D | D | D | D | C | C | C |
| Viscous material 2 | D | D | D | D | D | D | D | D | D | C | C | C |
| Viscous material 3 | D | D | D | D | D | D | D | D | D | C | C | C |
| Viscous material 4 | D | D | D | D | D | D | D | D | D | C | C | C |

TABLE 14

| | Example | | | | | | | |
|---|---|---|---|---|---|---|---|---|
| | 13a | 14a | 15a | 16a | 17a | 18a | 19a | 20a |
| Viscous material 1 | C | D | D | C | C | A | A | A |
| Viscous material 2 | C | D | D | C | C | A | A | A |
| Viscous material 3 | C | D | D | C | C | A | A | A |
| Viscous material 4 | C | D | D | C | C | A | A | A |

TABLE 15

| | Example | | | | | | | |
|---|---|---|---|---|---|---|---|---|
| | 21a | 22a | 23a | 24a | 25a | 26a | 27a | 28a |
| Viscous material 1 | A | C | C | C | C | C | A | C |
| Viscous material 2 | A | C | C | C | C | C | A | C |
| Viscous material 3 | A | C | C | C | C | C | A | C |
| Viscous material 4 | A | C | C | C | C | C | A | C |

TABLE 16

| | Example | | | | | | | | |
|---|---|---|---|---|---|---|---|---|---|
| | 29a | 30a | 31a | 32a | 33a | 34a | 35a | 36a | 37a |
| Viscous material 1 | B | B | B | B | B | A | A | A | A |
| Viscous material 2 | B | B | B | B | B | A | A | A | A |
| Viscous material 3 | B | B | B | B | B | A | A | A | A |
| Viscous material 4 | B | B | B | B | B | A | A | A | A |

TABLE 17

| | Comparative Example | | | | |
|---|---|---|---|---|---|
| | 1a | 2a | 3a | 4a | 5a |
| Viscous material 1 | E | E | E | E | — |
| Viscous material 2 | E | E | E | E | — |
| Viscous material 3 | E | E | E | E | — |
| Viscous material 4 | E | E | E | E | — |

Since the filler detached from the liquid-repellent layer of Comparative Example 5a, the liquid repellency and adhesion could not be evaluated.

The following materials were prepared to produce liquid-repellent structures according to the second embodiment and liquid-repellent structures according to comparative examples.

(Substrate)
Polyethylene terephthalate (PET) film (Thermoplastic Resin)
Modified polyolefin: Auroren (trade name, produced by Nippon Paper Industries Co., Ltd., melting point: 60 to 70° C.)

(Fluorine Compound)
Fluorine paint: AsahiGuard (trade name, produced by AGC Inc.)

(Scale-Like Filler)
Scale-like silica a: Sunlovely (trade name, produced by AGC Si-Tech Co., Ltd., average particle size: 4 to 6 μm)
Scale-like silica b: Sunlovely (trade name, produced by AGC Si-Tech Co., Ltd., average particle size: 0.1 μm)
Scale-like mica: Repco Mica (trade name, produced by Repco Inc., average particle size: 4 μm)

(Coarse Filler)
Silica particles a: Sunsphere (trade name, produced by AGC Si-Tech Co., Ltd., average particle size: 10 μm)
Silica particles b: Sunsphere (trade name, produced by AGC Si-Tech Co., Ltd., average particle size: 20 μm)
Acrylic beads: Art Pearl (trade name, produced by Negami Chemical Industrial Co., Ltd., average particle size: 90 μm)

(Second Filler)
Silica particles c: AEROSIL (trade name, produced by Nippon Aerosil Co., Ltd., average particle size: 7 nm)
Silica particles d: AEROSIL (trade name, produced by Nippon Aerosil Co., Ltd., average particle size: 13 nm)
Silica particles e: AEROSIL (trade name, produced by Nippon Aerosil Co., Ltd., average particle size: 30 nm)
Silica particles f: Seahostar (trade name, produced by Nippon Shokubai Co., Ltd., average particle size: 500 nm)
Silica particles g: Seahostar (trade name, produced by Nippon Shokubai Co., Ltd., average particle size: 1000 nm)

(Overcoat Layer)

Fluorine paint: AsahiGuard (trade name, produced by AGC Inc.)

Production of Liquid-Repellent Structure

Examples 1b to 14b

The thermoplastic resin, fluorine compound, scale-like filler, and coarse filler were added to a solvent so that the mass ratio (solid content) of each component in the liquid-repellent layer was as shown in Examples 1b to 14b of Table 18. The resulting mixture was sufficiently stirred to prepare a liquid-repellent layer-forming coating liquid, and the coating liquid was applied with a bar coater to a PET film as a substrate. Subsequently, the applied coating liquid was dried by heating at 80° C. for 1 minute to form a liquid-repellent layer on the substrate. The coating amount was adjusted so that the thickness (thickness T in FIG. 1) of the binder layer in the liquid-repellent layer was 0.5

TABLE 18

| | Thermoplastic resin | Fluorine compound | Scale-like filler | Coarse filler (third filler) | Area ratio $A_3/A$ | Mass ratio $W_{S3}/W_{S1}$ | $(W_{S1} + W_{S3})/(W_P + W_{FC})$ |
|---|---|---|---|---|---|---|---|
| Example 1b | Modified polyolefin | Fluorine paint | Scale-like silica a | Silica particles a | 0.35 | 1 | 1 |
| Example 2b | | | | | 0.55 | 7 | 1 |
| Example 3b | | | | | 0.95 | 20 | 1 |
| Example 4b | | | | Acrylic beads | 0.25 | 1 | 1 |
| Example 5b | | | | | 0.36 | 7 | 1 |
| Example 6b | | | | | 0.40 | 20 | 1 |
| Example 7b | | | | Silica particles b | 0.28 | 1 | 1 |
| Example 8b | | | | | 0.40 | 7 | 1 |
| Example 9b | | | | | 0.70 | 20 | 1 |
| Example 10b | | | Scale-like silica b | | 0.58 | 7 | 1 |
| Example 11b | | | Scale-like mica | | 0.60 | 7 | 1 |
| Example 12b | | | Scale-like silica a | | 0.80 | 7 | 3 |
| Example 13b | | | | | 0.65 | 7 | 5 |
| Example 14b | | | | | 0.50 | 7 | 10 |

Examples 15b to 19b

The thermoplastic resin, fluorine compound, scale-like filler, coarse filler, and second filler were added to a solvent so that the mass ratio (solid content) of each component in the liquid-repellent layer was as shown in Examples 15b to 19b of Table 19. The resulting mixture was sufficiently stirred to prepare a liquid-repellent layer-forming coating liquid, and the coating liquid was applied with a bar coater to a PET film as a substrate. Subsequently, the applied coating liquid was dried by heating at 80° C. for 1 minute to form a liquid-repellent layer on the substrate. The coating amount was adjusted so that the thickness (thickness T in FIG. 1) of the binder layer in the liquid-repellent layer was 0.5 μm.

TABLE 19

| | Thermoplastic resin | Fluorine compound | Scale-like filler | Coarse filler (third filler) | Second filler | Area ratio $A_3/A$ | Mass ratio $W_{S3}/W_{S1}$ | $(W_{S1} + W_{S3})/(W_P + W_{FC})$ |
|---|---|---|---|---|---|---|---|---|
| Example 15b | Modified polyolefin | Fluorine paint | Scale-like silica a | Silica particles b | Silica particles c | 0.53 | 14 | 5 |
| Example 16b | | | | | Silica particles d | 0.56 | 14 | 5 |
| Example 17b | | | | | Silica particles e | 0.55 | 14 | 5 |
| Example 18b | | | | | Silica particles f | 0.58 | 14 | 5 |
| Example 19b | | | | | Silica particles g | 0.60 | 14 | 5 |

Comparative Example 1b

The scale-like filler and the thermoplastic resin were added to a solvent so that the mass ratio (solid content) of each component in the liquid-repellent layer was as shown in Comparative Example 1b of Table 20. The resulting mixture was sufficiently stirred to prepare a foundation layer-forming coating liquid, and the coating liquid was applied with a bar coater to a PET film as a substrate. Subsequently, the applied coating liquid was dried by heating at 80° C. for 1 minute to form a foundation layer on the substrate. The coating amount was adjusted so that the thickness of the foundation layer was 0.5 μm. Next, a coating liquid obtained by adding a fluorine compound to a solvent was applied with a bar coater to the surface of the foundation layer. Subsequently, the applied coating liquid was dried by heating at 80° C. for 1 minute to form an overcoat layer on the foundation layer.

Comparative Example 2b

A liquid-repellent layer containing a thermoplastic resin and a fluorine paint was formed on a substrate in the same manner as in Example 1b, except for using a coating liquid that contained a thermoplastic resin and a fluorine compound and did not contain a scale-like filler and a coarse filler, as shown in Comparative Example 2b of Table 20.

Comparative Examples 3b and 4b

A liquid-repellent layer containing a thermoplastic resin, a fluorine paint, a scale-like filler, and a coarse filler was formed on a substrate in the same manner as in Example 1b, except that the mass ratio was changed as shown in Comparative Examples 3b and 4b of Table 20.

Comparative Examples 5b and 6b

A liquid-repellent layer containing a thermoplastic resin and a fluorine paint was formed on a substrate in the same manner as in Example 1b, except for using a coating liquid that did not contain a scale-like filler and a coarse filler, but instead contained coating liquid with a second filler as shown in Comparative Example 5b or 6b of Table 20, for the liquid-repellent layer.

<Evaluation of Liquid-Repellent Structure>

The liquid-repellent structures were evaluated from the following viewpoints. The evaluation results are shown in Tables 21 to 23.

(Measurement of Area Ratio)

In a microscope (VHX-1000, produced by Keyence Corporation), the range of the visual field (82,872 μm$^2$) observable with a 1000 magnification lens was defined as the area A of the liquid-repellent layer, the area $A_3$ occupied by the detectable coarse filler was determined, and the area ratio $A_3/A$ was calculated.

(Liquid Repellency Evaluation)

The liquid-repellent structure was placed flat so that the surface on the liquid-repellent layer side was face-up, and 2 μL of each of the following liquids (except for fresh cream) was dropped with a dropper on the liquid-repellent layer. Subsequently, the liquid-repellent structure was allowed to stand vertically and left in that state for 30 seconds. Then, the state of the dropped liquid was visually observed. Because the fresh cream could not be taken with a dropper, a small amount of mass was extracted with a medicine spoon and dropped on the liquid-repellent layer. Subsequently, the liquid-repellent structure was allowed to stand vertically and left in that state for 30 seconds. Then, the state of the fresh cream was visually observed.

[Liquids Used]
Pure water
Curry: Bon Curry Gold Medium Hot (Otsuka Foods)
Fresh cream: extracted from Strawberry Shortcake (Family Mart)
Yogurt: Meiji Bulgaria Yogurt L81 Low Sugar (Meiji)
Salad oil: Nisshin Salad Oil (Nisshin OilliO)
Hand soap: Kurashi-More Medicated Hand Soap (Nihon Soap)
Shampoo: Shokubutsu no megumi de kami ni yasashii shampoo (SEVEN-ELEVEN JAPAN)

[Evaluation Criteria]
1: The liquid retained on the liquid-repellent layer and did not move, or soaked into the liquid-repellent layer.
2: The liquid flowed down from the surface of the liquid-repellent layer, but traces of liquid flow remained in lines.
3: The liquid flowed down from the surface of the liquid-repellent layer, but traces of liquid flow remained in dots.

TABLE 20

| | Thermoplastic resin | Fluorine compound | Scale-like filler | Coarse filler (third filler) | Second filler | Overcoat layer | Area ratio $A_3/A$ | Mass ratio $W_{S3}/W_{S1}$ | $(W_{S1}+W_{S3})/(W_P+W_{FC})$ |
|---|---|---|---|---|---|---|---|---|---|
| Comparative Example 1b | | — | Scale-like silica a | — | — | Fluorine paint | — | — | 1 |
| Comparative Example 2b | | | — | — | — | — | — | — | — |
| Comparative Example 3b | Modified polyolefin | | Scale-like silica a | Silica particles b | — | — | 0.98 | 25 | 1 |
| Comparative Example 4b | | Fluorine paint | | — | — | — | 0.10 | 0.5 | 0.05 |
| Comparative Example 5b | | | — | — | Silica particles d | — | — | — | — |
| Comparative Example 6b | | | — | — | Silica particles g | — | — | — | — |

4: The liquid flowed down from the surface of the liquid-repellent layer, and no traces of liquid flow remained.
5: The droplets rolled down from the surface of the liquid-repellent layer, or separated.
(5 is the best, and 1 is the worst.)

Although there is no practical problem if the evaluation is 2 or higher, 3 or higher is more desirable. As is clear from Tables 21 to 23, the liquid repellency of the liquid-repellent structures according to the second embodiment was practically satisfactory for all of the liquids. On the other hand, sufficient liquid repellency was not obtained in the comparative examples.

TABLE 21

| | Example | | | | | | | | | |
|---|---|---|---|---|---|---|---|---|---|---|
| | 1b | 2b | 3b | 4b | 5b | 6b | 7b | 8b | 9b | 10b |
| Pure water | 5 | 5 | 5 | 5 | 5 | 5 | 5 | 5 | 5 | 5 |
| Curry | 5 | 5 | 5 | 5 | 5 | 5 | 5 | 5 | 5 | 5 |
| Fresh cream | 5 | 5 | 5 | 5 | 5 | 5 | 5 | 5 | 5 | 5 |
| Yogurt | 5 | 5 | 5 | 5 | 5 | 5 | 5 | 5 | 5 | 5 |
| Salad oil | 4 | 5 | 4 | 4 | 4 | 5 | 4 | 5 | 5 | 5 |
| Hand soap | 3 | 3 | 3 | 3 | 3 | 3 | 3 | 3 | 3 | 3 |
| Shampoo | 2 | 2 | 2 | 2 | 2 | 2 | 2 | 2 | 2 | 2 |

TABLE 22

| | Example | | | | | | | | |
|---|---|---|---|---|---|---|---|---|---|
| | 11b | 12b | 13b | 14b | 15b | 16b | 17b | 18b | 19b |
| Pure water | 5 | 5 | 5 | 5 | 5 | 5 | 5 | 5 | 5 |
| Curry | 5 | 5 | 5 | 5 | 5 | 5 | 5 | 5 | 5 |
| Fresh cream | 5 | 5 | 5 | 5 | 5 | 5 | 5 | 5 | 5 |
| Yogurt | 5 | 5 | 5 | 5 | 5 | 5 | 5 | 5 | 5 |
| Salad oil | 5 | 5 | 5 | 5 | 5 | 5 | 5 | 5 | 5 |
| Hand soap | 3 | 4 | 4 | 4 | 5 | 5 | 5 | 5 | 5 |
| Shampoo | 2 | 2 | 3 | 3 | 4 | 4 | 4 | 3 | 3 |

TABLE 23

| | Comparative Example | | | | | |
|---|---|---|---|---|---|---|
| | 1b | 2b | 3b | 4b | 5b | 6b |
| Pure water | 4 | 4 | 4 | 4 | 5 | 5 |
| Curry | 1 | 1 | 3 | 2 | 1 | 1 |
| Fresh cream | 1 | 1 | 1 | 1 | 1 | 1 |
| Yogurt | 1 | 1 | 1 | 1 | 1 | 1 |
| Salad oil | 4 | 3 | 3 | 3 | 1 | 1 |
| Hand soap | 3 | 3 | 2 | 2 | 1 | 1 |
| Shampoo | 2 | 2 | 1 | 1 | 1 | 1 |

The following materials were prepared to produce liquid-repellent structures according to the third embodiment and liquid-repellent structures according to comparative examples.

(Substrate)

Polyethylene terephthalate (PET) film (Thermoplastic Resin)

Modified polyolefin: Auroren AE-301 (trade name, produced by Nippon Paper Industries Co., Ltd., melting point: 60 to 70° C.)

(Fluorine Compound)

Fluorine paint: AsahiGuard (trade name, produced by AGC Inc.)

(Scale-Like Filler)

Scale-like silica a: Sunlovely (trade name, produced by AGC Si-Tech Co., Ltd., average particle size: 4 to 6 μm)

Scale-like silica b: Sunlovely (trade name, produced by AGC Si-Tech Co., Ltd., average particle size: 0.1 μm)

Scale-like mica: Repco Mica (trade name, produced by Repco Inc., average particle size: 4 μm)

(Second Filler)

Silica particles a: AEROSIL (trade name, produced by Nippon Aerosil Co., Ltd., average particle size: 7 nm)

Silica particles b: AEROSIL (trade name, produced by Nippon Aerosil Co., Ltd., average particle size: 30 nm)

Silica particles c: Seahostar (trade name, produced by Nippon Shokubai Co., Ltd., average particle size: 500 nm)

Silica particles d: Seahostar (trade name, produced by Nippon Shokubai Co., Ltd., average particle size: 1000 nm)

(Third Filler and Fifth Filler)

Silica particles e: Sunsphere (trade name, produced by AGC Si-Tech Co., Ltd., average particle size: 10 μm)

Silica particles f: Sunsphere (trade name, produced by AGC Si-Tech Co., Ltd., average particle size: 20 μm)

Acrylic beads: Art Pearl (trade name, produced by Negami Chemical Industrial Co., Ltd., average particle size: 90 μm)

(Crosslinking Agent)

Crosslinking agent a: Takenate WD-725 (trade name, produced by Mitsui Chemicals, Inc., an isocyanate group-containing crosslinking agent)

Crosslinking agent b: Chemitite PZ-33 (trade name, produced by Nippon Shokubai Co., Ltd., an aziridine group-containing crosslinking agent)

Crosslinking agent c: Carbodilite V-02 (trade name, produced by Nisshinbo Chemical Inc., a carbodiimide group-containing crosslinking agent)

Crosslinking agent d: Meikanate CX (trade name, produced by Meisei Chemical Works, Ltd., a block isocyanate group-containing crosslinking agent)

Crosslinking agent e: Cymel 303 (trade name, produced by Cytec Industries Japan LLC., a melamine skeleton-containing crosslinking agent)

(Solvent)

Alcoholic solvent (2-propanol)

Production of Liquid-Repellent Structure

Examples 1c to 19c

Among the thermoplastic resin, fluorine paint (fluorine compound), scale-like fillers, second fillers, third fillers, and crosslinking agents, components to be used were added to a solvent so that the mass ratio (solid content) of each component in the liquid-repellent layer was as shown in Examples 1c to 19c of Tables 24 to 26. The resulting mixture was sufficiently stirred to prepare a liquid-repellent layer-forming coating liquid, and the coating liquid was applied with a bar coater to a PET film as a substrate. Subsequently, the applied coating liquid was dried and cured by heating at 80° C. for 1 minute to form a liquid-repellent layer on a substrate. The coating amount was adjusted so that the thickness (thickness T in FIG. 1) of the binder layer in the liquid-repellent layer was 0.5 μm.

Figure 15:
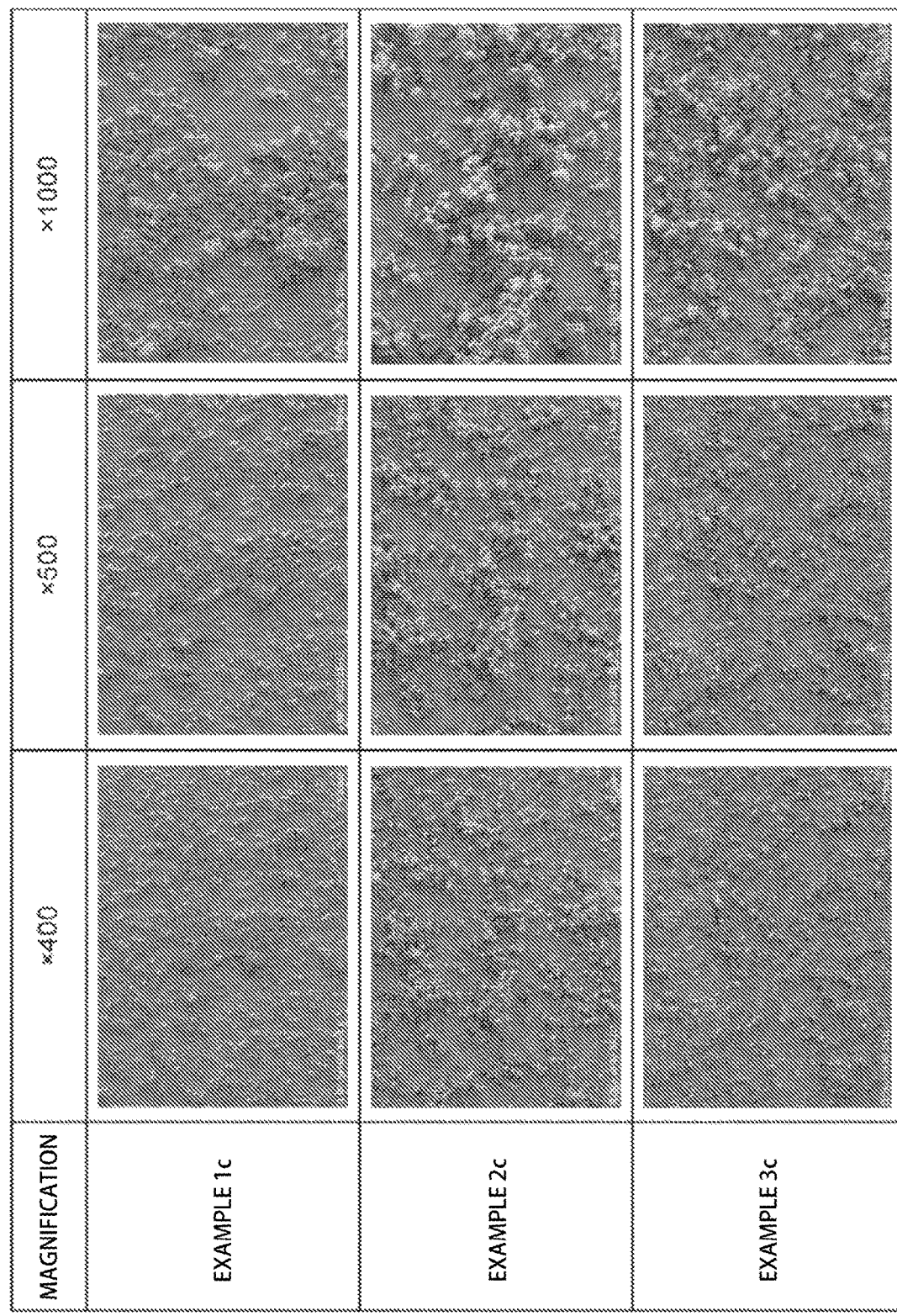
FIG. 15 is a table showing SEM images of the surfaces of liquid-repellent layers produced in Examples 1c to 3c taken at different magnifications.

FIGS. 15 and 16 are tables showing SEM images of the surfaces of the liquid-repellent layers produced in Examples 1c to 3c taken at different magnifications. The photographing magnifications are as shown in these tables. The SEM images shown in FIGS. 15 and 16 reveal that asperities due to aggregates of the scale-like filler are formed on the surfaces of the liquid-repellent layers.

Examples 20c to 22c

The thermoplastic resin and optionally the fifth filler were added to a solvent so that the mass ratio (solid content) of each component in the foundation layer was as shown in Examples 20c to 22c of Table 26. The resulting mixture was sufficiently stirred to prepare a foundation layer-forming coating liquid, and the coating liquid was applied with a bar coater to a PET film as a substrate. Subsequently, the applied coating liquid was dried by heating at 80° C. for 1 minute to form a foundation layer on the substrate. The coating amount was adjusted so that the thickness (thickness T' in FIG. 9) of the thermoplastic resin layer in the foundation layer was 0.5 μm.

Next, among the thermoplastic resin, fluorine paint (fluorine compound), scale-like fillers, second fillers, third fillers, and crosslinking agents, components to be used were added to a solvent so that the mass ratio (solid content) of each component in the liquid-repellent layer was as shown in Examples 20c to 22c of Table 26. The resulting mixture was sufficiently stirred to prepare a liquid-repellent layer-forming coating liquid, and the coating liquid was applied with a bar coater to the foundation layer. Subsequently, the applied coating liquid was dried and cured by heating at 80° C. for 1 minute to form a liquid-repellent layer on the foundation layer. The coating amount was adjusted so that the thickness (thickness T in FIG. 1) of the binder layer in the liquid-repellent layer was 0.5 μm.

Comparative Example 1c

As shown in Comparative Example 1c of Table 27, first, a layer containing a scale-like filler and a thermoplastic resin as a foundation layer (thickness T' of thermoplastic resin layer: 0.5 μm) was formed on a substrate. Subsequently, the fluorine paint used in Example 1c was applied to the surface of the foundation layer using a bar coater. The applied fluorine paint was dried by heating at 80° C. for 1 minute to form an overcoat layer on the surface of the foundation layer.

Comparative Example 2c

The same operation was carried out as in Comparative Example 1c, except that a coating liquid obtained by adding a crosslinking agent to a fluorine paint was used to form an overcoat layer on the surface of the foundation layer, as shown in Comparative Example 2c of Table 27.

Comparative Example 3c

A liquid-repellent layer containing a fluorine paint and a scale-like filler (thickness of binder layer: 0.5 μm) was formed on a substrate in the same manner as in Example 2c, except for using a coating liquid that did not contain a crosslinking agent, as shown in Comparative Example 3c of Table 27.

TABLE 24

| | | Example | | | | | | | | |
|---|---|---|---|---|---|---|---|---|---|---|
| | 1 | 1c | 2c | 3c | 4c | 5c | 6c | 7c | 8c | 9c |
| Fluorine compound $W_{FC}$ (parts by mass) | Fluorine paint | 100 | 100 | 100 | 100 | 100 | 100 | 100 | 100 | 100 |
| Scale-like filler $W_{S1}$ (parts by mass) | Scale-like filler a | 100 | 500 | 1000 | 500 | 500 | 500 | 500 | 500 | 500 |
| Crosslinking agent $W_C$ (parts by mass) | Crosslinking agent a | 10 | 10 | 10 | 5 | 3 | — | — | — | — |
| | Crosslinking agent b | — | — | — | — | — | 10 | — | — | — |
| | Crosslinking agent c | — | — | — | — | — | — | 10 | — | — |
| | Crosslinking agent d | — | — | — | — | — | — | — | 10 | — |
| | Crosslinking agent e | — | — | — | — | — | — | — | — | 10 |
| $W_{S1}/(W_{FC} + W_C)$ | | 0.91 | 4.55 | 9.09 | 4.76 | 4.85 | 4.55 | 4.55 | 4.55 | 4.55 |
| $W_C/W_{FC}$ | | 0.1 | 0.1 | 0.1 | 0.05 | 0.03 | 0.1 | 0.1 | 0.1 | 0.1 |

TABLE 25

| | | Example | | | | | | | | |
|---|---|---|---|---|---|---|---|---|---|---|
| | | 10c | 11c | 12c | 13c | 14c | 15c | 16c | 17c | 18c |
| Fluorine compound $W_{FC}$ (parts by mass) | Fluorine paint | 100 | 100 | 100 | 100 | 100 | 100 | 100 | 100 | 100 |
| Scale-like filler $W_{S1}$ (parts by mass) | Scale-like filler a | — | — | 167 | 167 | 167 | 167 | 75 | 75 | 75 |
| | Scale-like filler b | 500 | — | — | — | — | — | — | — | — |
| | Scale-like mica | — | 500 | — | — | — | — | — | — | — |
| Second filler $W_{S2}$ (parts by mass) | Silica particles a | — | — | 333 | — | — | — | — | — | — |
| | Silica particles b | — | — | — | 333 | — | — | — | — | — |

TABLE 25-continued

|  |  | Example | | | | | | | | |
|---|---|---|---|---|---|---|---|---|---|---|
|  |  | 10c | 11c | 12c | 13c | 14c | 15c | 16c | 17c | 18c |
| Third filler $W_{S3}$ (parts by mass) | Silica particles c | — | — | — | — | 333 | — | 150 | 150 | 150 |
|  | Silica particles d | — | — | — | — | — | 333 | — | — | — |
|  | Silica particles e | — | — | — | — | — | — | 275 | — | — |
|  | Silica particles f | — | — | — | — | — | — | — | 275 | — |
|  | Acrylic beads | — | — | — | — | — | — | — | — | 275 |
| Crosslinking agent $W_C$ (parts by mass) | Crosslinking agent a | 10 | 10 | 10 | 10 | 10 | 10 | 10 | 10 | 10 |
| $W_{S1}/(W_{FC} + W_C)$ |  | 4.55 | 4.55 | 1.52 | 1.52 | 1.52 | 1.52 | 0.68 | 0.68 | 0.68 |
| $(W_{S1} + W_{S2})/(W_{FC} + W_C)$ |  | 4.55 | 4.55 | 4.55 | 4.55 | 4.55 | 4.55 | 2.05 | 2.05 | 2.05 |
| $(W_{S1} + W_{S3})/(W_{FC} + W_C)$ |  | 4.55 | 4.55 | 1.52 | 1.52 | 1.52 | 1.52 | 3.18 | 3.18 | 3.18 |
| $(W_S + W_{S2} + W_{S3})/(W_{FC} + W_C)$ |  | 4.55 | 4.55 | 4.55 | 4.55 | 4.55 | 4.55 | 4.55 | 4.55 | 4.55 |
| $W_C/W_{FC}$ |  | 0.1 | 0.1 | 0.1 | 0.1 | 0.1 | 0.1 | 0.1 | 0.1 | 0.1 |

TABLE 26

|  |  |  | Example | | | |
|---|---|---|---|---|---|---|
|  |  |  | 19c | 20c | 21c | 22c |
| Liquid-repellent layer | Thermoplastic resin $W_P$ (parts by mass) | Modified polyolefin | 10 | 10 | 10 | 10 |
|  | Fluorine compound $W_{FC}$ (parts by mass) | Fluorine paint | 90 | 90 | 90 | 90 |
|  | Scale-like filler $W_{S1}$ (parts by mass) | Scale-like filler a | 75 | 75 | 150 | 167 |
|  | Second filler $W_{S2}$ (parts by mass) | Silica particles b | 150 | 150 | 300 | 333 |
|  | Third filler $W_{S3}$ (parts by mass) | Silica particles f | 275 | 275 | 50 | — |
|  | Crosslinking agent $W_C$ (parts by mass) | Crosslinking agent a | 10 | 10 | 10 | 10 |
| Foundation layer | Thermoplastic resin (parts by mass) | Modified polyolefin | — | 100 | 100 | 100 |
|  | Fifth filler (parts by mass) | Silica particles f | — | — | 500 | 500 |
| $W_{S1}/(W_P + W_{FC} + W_C)$ |  |  | 0.68 | 0.68 | 1.36 | 1.52 |
| $(W_{S1} + W_{S2})/(W_P + W_{FC} + W_C)$ |  |  | 2.05 | 2.05 | 4.09 | 4.55 |
| $(W_{S1} + W_{S3})/(W_P + W_{FC} + W_C)$ |  |  | 3.18 | 3.18 | 1.82 | 1.52 |
| $(W_{S1} + W_{S2} + W_{S3})/(W_P + W_{FC} + W_C)$ |  |  | 4.55 | 4.55 | 4.55 | 4.55 |
| $W_C/(W_P + W_{FC})$ |  |  | 0.1 | 0.1 | 0.1 | 0.1 |

TABLE 27

|  |  |  | Comparative Example | | |
|---|---|---|---|---|---|
|  |  |  | 1c | 2c | 3c |
| Overcoat layer | Fluorine compound (parts by mass) | Fluorine paint | 100 | 100 | — |
|  | Curing agent (parts by mass) | Crosslinking agent a | — | 10 | — |
| Liquid-repellent layer | Fluorine compound $W_{FC}$ (parts by mass) | Fluorine paint | — | — | 100 |
|  | Scale-like filler $W_{S1}$ (parts by mass) | Scale-like filler a | — | — | 500 |
| Foundation layer | Thermoplastic resin (parts by mass) | Modified polyolefin | 100 | 100 | — |
|  | Scale-like filler (parts by mass) | Scale-like filler a | 100 | 100 | — |
| WS1/(WFC + WC) |  |  | — | — | 5 |
| Formation of overcoat layer covering foundation layer |  |  | Formed | Formed | Not formed |

<Evaluation of Liquid-Repellent Structure>

The liquid-repellent structures were evaluated from the following viewpoints. The evaluation results are shown in Tables 28 and 29.

(Liquid Repellency Evaluation)

The liquid-repellent structure was placed flat so that the surface on the liquid-repellent layer side was face-up, and 2 µL of each of the following liquids (except for fresh cream) was dropped with a dropper on the liquid-repellent layer. Subsequently, the liquid-repellent structure was allowed to stand vertically and left in that state for 30 seconds. Then, the state of the dropped liquid was visually observed. Because the fresh cream could not be taken with a dropper, a small amount of mass was extracted with a medicine spoon and dropped on the liquid-repellent layer. Subsequently, the liquid-repellent structure was allowed to stand vertically and left in that state for 30 seconds. Then, the state of the fresh cream was visually observed.

[Liquids Used]
Pure water
Curry: Bon Curry Gold Medium Hot (Otsuka Foods)
Fresh cream: extracted from Strawberry Shortcake (Family Mart)
Yogurt: Meiji Bulgaria Yogurt L81 Low Sugar (Meiji)
Salad oil: Nisshin Salad Oil (Nisshin OilliO)
Hand soap: Kurashi-More Medicated Hand Soap (Nihon Soap)
Shampoo: Jihada made kokochiyoku arau shampoo (SEVEN-ELEVEN JAPAN)

[Evaluation Criteria]
A: The droplets rolled down from the surface of the liquid-repellent layer, or separated.
B: The liquid flowed down from the surface of the liquid-repellent layer, and no traces of liquid flow remained.
C: The liquid flowed down from the surface of the liquid-repellent layer, but traces of liquid flow remained in dots.
D: The liquid flowed down from the surface of the liquid-repellent layer, but traces of liquid flow remained in lines.
E: The liquid retained on the liquid-repellent layer and did not move, or soaked into the liquid-repellent layer.

(Durability Evaluation)
The liquid-repellent structure was cut into a size of a width of 50 mm and a length of 100 mm to prepare a test piece. 150 ml of each of the liquids (except for fresh cream) used in the liquid repellency evaluation was poured into a 200-ml beaker, and the test piece was dipped in the liquid to half of the length thereof and allowed to stand at room temperature (25° C.) for 30 days. After being allowed to stand, the test piece was pulled out from the liquid, and the state of adhesion of each liquid to the surface of the dipped portion of the liquid-repellent structure on the side on which the liquid-repellent layer was formed was visually observed. Then, the durability (liquid repellency after being in contact with each liquid for a long period of time) was evaluated based on the following evaluation criteria.

[Evaluation Criteria]
A: No adhesion of the liquid to the dipped portion was observed.
B: Adhesion of the liquid to less than 10% of the area of the dipped portion was observed.
C: Adhesion of the liquid to 10% or more and less than 30% of the area of the dipped portion was observed.
D: Adhesion of the liquid to 30% or more and less than 70% of the area of the dipped portion was observed.
E: Adhesion of the liquid to 70% or more of the area of the dipped portion was observed.

TABLE 28

| | | Example | | | | | | | | | | | |
|---|---|---|---|---|---|---|---|---|---|---|---|---|---|
| | | 1c | 2c | 3c | 4c | 5c | 6c | 7c | 8c | 9c | 10c | 11c | 12c |
| Liquid repellency | Pure water | A | A | A | A | A | A | A | A | A | A | A | A |
| | Curry | A | A | A | A | A | A | A | A | A | A | A | A |
| | Fresh cream | A | A | A | A | A | A | A | A | A | A | A | A |
| | Yogurt | A | A | A | A | A | A | A | A | A | A | A | A |
| | Salad oil | B | B | B | B | B | B | B | B | B | B | B | A |
| | Hand soap | C | C | C | C | C | C | C | C | C | C | C | C |
| | Shampoo | D | D | D | D | D | D | D | D | D | D | D | D |
| Durability | Pure water | C | B | C | C | C | B | B | C | C | B | B | A |
| | Curry | C | B | C | C | C | B | B | C | C | B | B | A |
| | Yogurt | C | B | C | C | C | B | B | C | C | B | B | A |
| | Salad oil | C | C | C | C | C | C | C | C | C | C | C | A |
| | Hand soap | D | D | D | D | D | D | D | D | D | D | D | D |
| | Shampoo | D | D | D | D | D | D | D | D | D | D | D | D |

TABLE 29

| | | Example | | | | | | | | | | Comparative Example | | |
|---|---|---|---|---|---|---|---|---|---|---|---|---|---|---|
| | | 13c | 14c | 15c | 16c | 17c | 18c | 19c | 20c | 21c | 22c | 1c | 2c | 3c |
| Liquid repellency | Pure water | A | A | A | A | A | A | A | A | A | A | B | B | A |
| | Curry | A | A | A | A | A | A | A | A | A | A | E | E | A |
| | Fresh cream | A | A | A | A | A | A | A | A | A | A | E | E | A |
| | Yogurt | A | A | A | A | A | A | A | A | A | A | E | E | A |
| | Salad oil | A | A | A | A | A | A | A | A | A | A | B | B | B |
| | Hand soap | C | C | C | A | A | A | A | A | A | A | C | C | C |
| | Shampoo | D | D | D | C | C | C | C | C | C | C | D | D | D |
| Durability | Pure water | A | A | A | A | A | A | A | A | A | A | E | C | E |
| | Curry | A | A | A | A | A | A | A | A | A | A | E | E | E |
| | Yogurt | A | A | A | A | A | A | A | A | A | A | E | E | E |
| | Salad oil | A | A | A | A | A | A | A | A | A | A | E | C | E |
| | Hand soap | D | D | D | B | B | B | B | B | B | B | E | D | E |
| | Shampoo | D | D | D | C | C | C | C | C | C | C | E | D | E |

The following materials were prepared to produce liquid-repellent structures according to the fourth embodiment and liquid-repellent structures according to comparative examples.

(Substrate)
Polyethylene terephthalate (PET) film
(Fluorine-Containing Resin)
Fluorine paint a: AsahiGuard AG-E060 (trade name, produced by AGC Inc., a fluorine-acrylic copolymer that does not have structural units derived from pyrrolidones, a cationic water-based material, fluorine content: 45 mass %)
Fluorine paint b: Unidyne TG-8811 (trade name, produced by Daikin Industries, Ltd., a fluorine-acrylic copolymer that has a structural unit derived from a pyrrolidone, a cationic water-based material, fluorine content: 44 mass %)
(Scale-Like Filler)
Scale-like silica a: Sunlovely (trade name, produced by AGC Si-Tech Co., Ltd., average primary particle size: 4 to 6 μm)
Scale-like silica b: Sunlovely (trade name, produced by AGC Si-Tech Co., Ltd., average primary particle size: 0.1 μm)
(Second Filler)
Silica particles a: AEROSIL 200 (trade name, produced by Nippon Aerosil Co., Ltd., average primary particle size: 12 nm)
Silica particles b: AEROSIL 300 (trade name, produced by Nippon Aerosil Co., Ltd., average primary particle size: 7 nm)
Silica particles c: AEROSIL 50 (trade name, produced by Nippon Aerosil Co., Ltd., average primary particle size: 30 nm)
(Third Filler)
Silica particles d: HS-304 (trade name, produced by Nippon Steel Chemical & Material Co., Ltd., average primary particle size: 28 μm)
(Third and Fifth Fillers)
Silica particles e: Sunsphere NP-100 (trade name, produced by AGC Si-Tech Co., Ltd., average primary particle size: 10 μm)
(Thermoplastic Resin)
Resin a: Sepolsion VA407 (trade name, produced by Sumitomo Seika Chemicals Co., Ltd., an ethylene-vinyl acetate copolymer, melting point: 70 to 80° C.)
Resin b: Auroren AE-301 (trade name, produced by Nippon Paper Industries Co., Ltd., modified polyolefin, melting point: 60 to 70° C.)
(Crosslinking Agent)
Crosslinking agent: Takenate WD-725 (trade name, produced by Mitsui Chemicals, Inc., an isocyanate group-containing crosslinking agent)

(Solvent)
Alcoholic solvent (2-propanol)

Production of Liquid-Repellent Structure

Examples 1d to 18d and Comparative Examples 1d and 2d

Among the fluorine paints (fluorine-containing resins), scale-like fillers, second fillers, and third fillers, components to be used were added to a solvent so that the mass ratio (solid content) of each component in the liquid-repellent layer was as shown in Examples 1d to 18d and Comparative Examples 1d and 2d of Tables 30 and 31. The resulting mixture was sufficiently stirred to prepare a liquid-repellent layer-forming coating liquid, and the coating liquid was applied with a bar coater to a PET film as a substrate. Subsequently, the applied coating liquid was dried and cured by heating at 80° C. for 1 minute to form a liquid-repellent layer on a substrate. The coating amount was adjusted so that the mass per unit area of the liquid-repellent layer was 2.0 g/m².

Examples 19d to 29d

The thermoplastic resin and optionally the fifth filler were added to a solvent so that the mass ratio (solid content) of each component in the foundation layer was as shown in Examples 19d to 29d of Table 32. The resulting mixture was sufficiently stirred to prepare a foundation layer-forming coating liquid, and the coating liquid was applied with a bar coater to a PET film as a substrate. Subsequently, the applied coating liquid was dried by heating at 80° C. for 1 minute to form a foundation layer on the substrate. The coating amount was adjusted so that the mass per unit area of the foundation layer was 5.0 g/m².

Next, among the fluorine paints (fluorine-containing resins), scale-like fillers, second fillers, third fillers, thermoplastic resins, and crosslinking agent, components to be used were added to a solvent so that the mass ratio (solid content) of each component in the liquid-repellent layer was as shown in Examples 19d to 29d of Table 32. The resulting mixture was sufficiently stirred to prepare a liquid-repellent layer-forming coating liquid, and the coating liquid was applied with a bar coater to the foundation layer. Subsequently, the applied coating liquid was dried and cured by heating at 80° C. for 1 minute to form a liquid-repellent layer on the foundation layer. The coating amount was adjusted so that the mass per unit area of the liquid-repellent layer was 2.0 g/m².

TABLE 30

| | | Example | | | | | | | | | |
| --- | --- | --- | --- | --- | --- | --- | --- | --- | --- | --- | --- |
| | | 1d | 2d | 3d | 4d | 5d | 6d | 7d | 8d | 9d | 10d |
| Fluorine-containing resin $W_J$ (parts by mass) | Fluorine paint a | 13 | 35 | 50 | 100 | 200 | 35 | 35 | 35 | 35 | 35 |
| Scale-like filler $W_{S1}$ (parts by mass) | Scale-like silica b | — | — | — | — | — | — | — | — | — | 100 |
| Second filler $W_{S2}$ (parts by mass) | Silica particles a | 100 | 100 | 100 | 100 | 100 | — | — | — | — | — |
| | Silica particles b | — | — | — | — | — | 100 | — | — | — | — |
| | Silica particles c | — | — | — | — | — | — | 100 | — | — | — |
| Third filler $W_{S3}$ (parts by mass) | Silica particles d | — | — | — | — | — | — | — | — | 100 | — |
| | Silica particles e | — | — | — | — | — | — | — | 100 | — | — |

TABLE 30-continued

|  | Example | | | | | | | | | |
|---|---|---|---|---|---|---|---|---|---|---|
|  | 1d | 2d | 3d | 4d | 5d | 6d | 7d | 8d | 9d | 10d |
| $W_F/W_S$ | 0.06 | 0.16 | 0.23 | 0.45 | 0.90 | 0.16 | 0.16 | 0.16 | 0.16 | 0.16 |
| $W_B/W_S$ | 0.13 | 0.35 | 0.50 | 1.00 | 2.00 | 0.35 | 0.35 | 0.35 | 0.35 | 0.35 |

TABLE 31

| | | | Example | | | | | | | | Comparative Example | |
|---|---|---|---|---|---|---|---|---|---|---|---|---|
| | | | 11d | 12d | 13d | 14d | 15d | 16d | 17d | 18d | 1d | 2d |
| Fluorine-containing resin $W_J$ (parts by mass) | Fluorine paint a | | 13 | 35 | 50 | 100 | 13 | 35 | 50 | 100 | 7 | 250 |
| Scale-like filler $W_{S1}$ (parts by mass) | Scale-like silica a | | 100 | 100 | 100 | 100 | 33 | 33 | 33 | 33 | — | — |
| Second filler $W_{S2}$ (parts by mass) | Silica particles a | | — | — | — | — | — | — | — | — | 100 | 100 |
| | Silica particles c | | — | — | — | — | 67 | 67 | 67 | 67 | — | — |
| $W_F/W_S$ | | | 0.06 | 0.16 | 0.23 | 0.45 | 0.06 | 0.16 | 0.23 | 0.45 | 0.03 | 1.13 |
| $W_B/W_S$ | | | 0.13 | 0.35 | 0.50 | 1.00 | 0.13 | 0.35 | 0.50 | 1.00 | 0.07 | 2.50 |

TABLE 32

| | | | Example | | | | | | | | | | | |
|---|---|---|---|---|---|---|---|---|---|---|---|---|---|---|
| | | | 19d | 20d | 21d | 22d | 23d | 24d | 25d | 26d | 27d | 28d | 29d |
| Liquid-repellent layer | Fluorine-containing resin $W_J$ (parts by mass) | Fluorine paint a | 13 | 35 | 50 | 100 | 13 | 35 | 50 | 100 | — | 35 | 35 |
| | | Fluorine paint b | — | — | — | — | — | — | — | — | 35 | — | — |
| | Scale-like filler $W_{S1}$ (parts by mass) | Scale-like silica a | 33 | 33 | 33 | 33 | 33 | 33 | 33 | 33 | 33 | 33 | 33 |
| | Second filler $W_{S2}$ (parts by mass) | Silica particles c | 67 | 67 | 67 | 67 | 67 | 67 | 67 | 67 | 67 | 67 | 67 |
| | Thermoplastic resin $W_P$ (parts by mass) | Resin a | — | — | — | — | — | — | — | — | — | 15 | 15 |
| | Crosslinking agent $W_C$ (parts by mass) | Crosslinking agent | — | — | — | — | — | — | — | — | — | — | 3.5 |
| Foundation layer | Thermoplastic resin (parts by mass) | Resin b | 30 | 30 | 30 | 30 | 30 | 30 | 30 | 30 | 30 | 30 | 30 |
| | Fifth filler (parts by mass) | Silica particles e | — | — | — | — | 150 | 150 | 150 | 150 | 150 | 150 | 150 |
| $W_F/W_S$ | | | 0.06 | 0.16 | 0.23 | 0.45 | 0.06 | 0.16 | 0.23 | 0.45 | 0.15 | 0.16 | 0.16 |
| $W_B/W_S$ | | | 0.13 | 0.35 | 0.50 | 1.00 | 0.13 | 0.35 | 0.50 | 1.00 | 0.35 | 0.50 | 0.54 |

<Evaluation of Liquid-Repellent Structure>

The liquid-repellent structures were evaluated from the following viewpoints. The evaluation results are shown in Tables 33 and 34.

(Liquid Repellency Evaluation)

The liquid-repellent structure was placed flat so that the surface on the liquid-repellent layer side was face-up, and 2 µL of each of the following liquids was dropped with a dropper on the liquid-repellent layer. Subsequently, the liquid-repellent structure was allowed to stand vertically and left in that state for 30 seconds. Then, the state of the dropped liquid was visually observed. The liquid repellency was evaluated from the observation results based on the following evaluation criteria. It can be said that there is no practical problem if the evaluation results are A to D. It is desirable that the evaluation results are A to C.

[Liquids Used]
Pure water
Yogurt: Meiji Bulgaria Yogurt L81 Low Sugar (Meiji)
Curry (ordinary temperature): Bon Curry Gold Medium Hot (Otsuka Foods)
Salad oil: Nisshin Salad Oil (Nisshin OilliO)
Hand soap: Kurashi-More Medicated Hand Soap (Nihon Soap)
Shampoo: Jihada made kokockyoku arau shampoo (SEVEN-ELEVEN JAPAN)

[Evaluation Criteria]
A: The droplets rolled down from the surface of the liquid-repellent layer, or separated.
B: The liquid flowed down from the surface of the liquid-repellent layer, and no traces of liquid flow remained.
C: The liquid flowed down from the surface of the liquid-repellent layer, but traces of liquid flow remained in dots.
D: The liquid flowed down from the surface of the liquid-repellent layer, but traces of liquid flow remained in lines.

E: The liquid retained on the liquid-repellent layer and did not move, or soaked into the liquid-repellent layer.

(Adhesion Evaluation)

The adhesion to viscous foods was evaluated in the following manner. A polypropylene (PP) film was placed flat, and 2 g of each of the following viscous foods was extracted with a medicine spoon and dropped on the PP film. The liquid-repellent structure was arranged so that the surface on the liquid-repellent layer side faced the PP film. The liquid-repellent structure was pressed against the viscous food at a load of 50 g/25 cm$^2$, and left in that state for 10 seconds. Subsequently, the liquid-repellent structure was peeled off, and the adhesion of the viscous food to the contact surface of the liquid-repellent layer in contact with the viscous food was visually observed. The adhesion was evaluated from the observation results based on the following evaluation criteria. It can be said that there is no practical problem if the evaluation results are A to D. It is desirable that the evaluation results are A to C.

[Viscous Foods Used]

Fresh cream: extracted from Strawberry Shortcake (Family Mart) Mayonnaise: Kewpie Mayonnaise (Kewpie)

[Evaluation Criteria]

A: No adhesion of the viscous food to the contact surface was observed.

B: Adhesion of the viscous food to less than 10% of the area of the contact surface was observed.

C: Adhesion of the viscous food to 10% or more and less than 30% of the area of the contact surface was observed.

D: Adhesion of the viscous food to 30% or more and less than 70% of the area of the contact surface was observed.

E: Adhesion of the viscous food to 70% or more of the area of the contact surface was observed.

(Durability Evaluation)

The liquid-repellent structure was cut into a size of a width of 50 mm and a length of 100 mm to prepare a test piece. Among the liquids used in the liquid repellency evaluation, purified water, salad oil, hand soap, and shampoo were each poured in an amount of 150 ml into a 200-ml beaker, and the test piece was dipped in the liquid to half of the length thereof and allowed to stand at room temperature (25° C.) for 30 days. After being allowed to stand, the test piece was pulled out from the liquid, and the state of adhesion of each liquid to the surface of the dipped portion of the liquid-repellent structure on the side on which the liquid-repellent layer was formed was visually observed. Then, the durability (liquid repellency after being in contact with each liquid for a long period of time) was evaluated based on the following evaluation criteria. It can be said that there is no practical problem if the evaluation results are A to D. It is desirable that the evaluation results are A to C.

[Evaluation Criteria]

A: No adhesion of the liquid to the dipped portion was observed.

B: Adhesion of the liquid to less than 10% of the area of the dipped portion was observed.

C: Adhesion of the liquid to 10% or more and less than 30% of the area of the dipped portion was observed.

D: Adhesion of the liquid to 30% or more and less than 70% of the area of the dipped portion was observed.

E: Adhesion of the liquid to 70% or more of the area of the dipped portion was observed.

TABLE 33

| | | Example | | | | | | | | | | | | | | | |
|---|---|---|---|---|---|---|---|---|---|---|---|---|---|---|---|---|---|
| | | 1d | 2d | 3d | 4d | 5d | 6d | 7d | 8d | 9d | 10d | 11d | 12d | 13d | 14d | 15d | 16d |
| Liquid repellency | Pure water | A | A | A | A | A | A | A | A | A | A | A | A | A | A | A | A |
| | Yogurt | B | B | B | B | C | B | B | C | C | B | B | B | B | B | B | B |
| | Curry | C | B | B | C | D | C | B | D | D | B | B | B | B | B | B | B |
| | Salad oil | D | D | D | D | D | D | D | D | D | D | C | C | C | D | C | B |
| | Hand soap | D | D | D | D | D | D | D | D | D | D | D | D | D | D | D | D |
| | Shampoo | D | D | D | D | D | D | D | D | D | D | D | D | D | D | D | D |
| Adhesion | Fresh cream | D | D | D | D | D | D | C | D | D | C | B | B | B | C | B | B |
| | Mayonnaise | D | D | D | D | D | D | D | D | D | D | D | D | D | D | D | D |
| Durability | Pure water | D | D | D | D | D | D | D | D | D | D | D | D | D | D | D | D |
| | Salad oil | D | D | D | D | D | D | D | D | D | D | D | D | D | D | C | C |
| | Hand soap | D | D | D | D | D | D | D | D | D | D | D | D | D | D | D | D |
| | Shampoo | D | D | D | D | D | D | D | D | D | D | D | D | D | D | D | D |

TABLE 34

| | | Example | | | | | | | | | | | | | Comparative Example | |
|---|---|---|---|---|---|---|---|---|---|---|---|---|---|---|---|---|
| | | 17d | 18d | 19d | 20d | 21d | 22d | 23d | 24d | 25d | 26d | 27d | 28d | 29d | 1d | 2d |
| Liquid repellency | Pure water | A | A | A | A | A | A | A | A | A | A | A | A | A | E | B |
| | Yogurt | B | B | B | B | B | B | B | B | B | B | B | B | B | E | E |
| | Curry | B | B | B | B | B | B | B | B | B | B | B | B | B | E | E |
| | Salad oil | B | C | C | C | B | C | B | B | B | B | B | B | B | E | D |
| | Hand soap | D | D | D | D | D | D | C | B | B | C | B | B | B | E | E |
| | Shampoo | D | D | D | D | D | D | C | B | C | D | B | B | B | E | E |
| Adhesion | Fresh cream | B | B | B | B | B | B | B | B | B | B | B | B | B | E | E |
| | Mayonnaise | D | D | C | C | C | C | B | B | B | B | B | B | B | E | E |
| Durability | Pure water | D | D | D | D | D | D | D | D | D | D | D | A | A | E | E |

TABLE 34-continued

| | Example | | | | | | | | | | | | | Comparative Example | |
|---|---|---|---|---|---|---|---|---|---|---|---|---|---|---|---|
| | 17d | 18d | 19d | 20d | 21d | 22d | 23d | 24d | 25d | 26d | 27d | 28d | 29d | 1d | 2d |
| Salad oil | C | C | C | B | B | C | B | B | B | B | B | B | B | E | E |
| Hand soap | D | D | D | D | D | D | D | D | D | D | D | C | B | E | E |
| Shampoo | D | D | D | D | D | D | D | D | D | D | D | C | B | E | E |

INDUSTRIAL APPLICABILITY

The present disclosure provides a liquid-repellent structure having improved or even excellent liquid repellency to water and also improved or even excellent liquid repellency to oil or oil-containing liquids etc., and a method for producing the same. Further, the present disclosure also provides a wrapping material and a separation sheet, both of which have the liquid-repellent structure on the side in contact with a substance.

REFERENCE SIGNS LIST

1 ... Substrate; 1a ... Treatment surface (surface to which liquid repellency is imparted); 3, 3A, 3B, 3C, 3D, 3E ... Liquid-repellent layer; 5 ... Aggregate; 5b Binder resin; 5f ... Scale-like filler; 6f ... Filler (second filler); 7f ... Filler (third filler); 8 ... Foundation layer; 8b ... Thermoplastic resin; 8f ... Filler (fifth filler); 9 ... Void; 10, 10A, 10B, 10C, 10D, 20, 40A ... Liquid-repellent structure.

What is claimed is:

1. A liquid-repellent structure, comprising:
a major surface to which liquid repellency is imparted, and
a liquid-repellent layer on the major surface; wherein
the liquid-repellent layer is a single layer;
the liquid-repellent layer contains a scale-like filler having an average particle size of 0.1 to 6 μm, inclusive, a thermoplastic resin, and a fluorine compound, and has aggregates containing the scale-like filler;
the thermoplastic resin is selected from the group consisting of low density polyethylene, medium density polyethylene, high density polyethylene, ethylene-α olefin copolymer, homo, block, or random polypropylene, propylene-α olefin copolymer, ethylene-vinyl acetate copolymer and an acid modified polyolefin,
the thermoplastic resin constitutes 50 mass % to 95 mass % of a combination of the thermoplastic resin and the fluorine compound, and
the ratio $W_{S1}/(W_P+W_{FC})$ of the mass $W_{S1}$ of the scale-like filler contained in the liquid-repellent layer to the sum $(W_P+W_{FC})$ of the mass $W_P$ of the thermoplastic resin and the mass $W_{FC}$ of the fluorine compound contained in the liquid-repellent layer is 0.1 to 10 inclusive.

2. The liquid-repellent structure of claim 1, wherein
the liquid-repellent layer further contains a second filler having an average particle size of 5 to 1000 nm, inclusive, and
the ratio $(W_{S1}+W_{S2})/(W_P+W_{FC})$ of the sum $(W_{S1}+W_{S2})$ of the mass $W_{S1}$ of the scale-like filler and the mass $W_{S2}$ of the second filler contained in the liquid-repellent layer to the sum $(W_P+W_{FC})$ of the mass $W_P$ of the thermoplastic resin and the mass $W_{FC}$ of the fluorine compound contained in the liquid-repellent layer is 0.1 to 10 inclusive.

3. The liquid-repellent structure of claim 2, wherein the liquid-repellent layer further contains a third filler having an average particle size of 10 to 100 μm, inclusive, and
the ratio $(W_{S1}+W_{S2}+W_{S3})/(W_P+W_{FC})$ of the sum $(W_{S1}+W_{S2}+W_{S3})$ of the mass $W_{S1}$ of the scale-like filler, the mass $W_{S2}$ of the second filler, and the mass $W_{S3}$ of the third filler contained in the liquid-repellent layer to the sum $(W_P+W_{FC})$ of the mass $W_P$ of the thermoplastic resin and the mass $W_{FC}$ of the fluorine compound contained in the liquid-repellent layer is 0.1 to 10 inclusive.

4. The liquid-repellent structure of claim 1, wherein the liquid-repellent layer further contains a third filler having an average particle size of 10 to 100 μm, inclusive, and
the ratio $(W_{S1}+W_{S3})/(W_P+W_{FC})$ of the sum $(W_{S1}+W_{S3})$ of the mass $W_{S1}$ of the scale-like filler and the mass $W_{S3}$ of the third filler contained in the liquid-repellent layer, to the sum $(W_P+W_{FC})$ of the mass $W_P$ of the thermoplastic resin and the mass $W_{FC}$ of the fluorine compound contained in the liquid-repellent layer is 0.1 to 10 inclusive.

5. The liquid-repellent structure of claim 4 wherein the ratio $W_{S3}/W_{S1}$ of the mass $W_{S1}$ of the scale-like filler and the mass $W_{S3}$ of the third filler contained in the liquid-repellent layer is 1.0 to 20.0 inclusive.

6. The liquid-repellent structure of claim 5, wherein the ratio $(W_{S1}+W_{S3})/(W_P+W_{FC})$ of the sum $(W_{S1}+W_{S3})$ of the mass $W_{S1}$ of the scale-like filler and the mass $W_{S3}$ of the third filler contained in the liquid-repellent layer, to the sum $(W_P+W_{FC})$ of the mass $W_P$ of the thermoplastic resin and the mass $W_{FC}$ of the fluorine compound contained in the liquid-repellent layer is 0.1 to 10.0 inclusive.

7. The liquid-repellent structure of claim 1, wherein the fluorine compound does not contain a structural unit derived from pyrrolidone nor a derivative thereof.

8. The liquid-repellent structure of claim 1, wherein the liquid-repellent layer does not contain a structural unit derived from pyrrolidone nor a derivative thereof.

9. The liquid-repellent structure of claim 1, further comprising a foundation layer containing a thermoplastic resin, the foundation layer being disposed between the major surface to which liquid repellency is imparted and the liquid-repellent layer.

10. The liquid-repellent structure of claim 9, wherein the foundation layer contains a fifth filler having an average primary particle size of 5 to 30 μm, inclusive.

11. The liquid-repellent structure of claim 10, wherein the fifth filler has an average primary particle size of 10 to 20 μm, inclusive.

12. A wrapping material having the liquid-repellent structure of claim 1 on a side in contact with a substance.

13. The wrapping material of claim 12, wherein the substance contains water.

14. The wrapping material of claim 12, wherein the substance contains oil.

15. The wrapping material of claim 12, wherein the substance contains a surfactant.

16. The wrapping material of claim 12, wherein the substance is one member selected from the group consisting of hand soap, body soap, shampoo, rinse, creams, and cosmetics.

17. A separation sheet having the liquid-repellent structure of claim 1 on a side in contact with a substance.

18. The separation sheet of claim 17, wherein the substance contains water.

19. The separation sheet of claim 17, wherein the substance contains oil.

20. The separation sheet of claim 17, wherein the substance contains a surfactant.

21. The separation sheet of claim 17, wherein the substance is one member selected from the group consisting of hand soap, body soap, shampoo, rinse, creams, and cosmetics.

22. The liquid-repellent structure of claim 1, wherein the thermoplastic resin constitutes 60 mass % to 95 mass % of the combination of the thermoplastic resin and the fluorine compound.

23. The liquid-repellent structure of claim 1, wherein the thermoplastic resin constitutes 70 mass % to 90 mass % of the combination of the thermoplastic resin and the fluorine compound.

24. The liquid-repellent structure of claim 1, wherein a melting point of the thermoplastic resin is 50 to 135° C.

\* \* \* \* \*